(12) United States Patent
Bridges et al.

(10) Patent No.: US 9,879,976 B2
(45) Date of Patent: Jan. 30, 2018

(54) ARTICULATED ARM COORDINATE MEASUREMENT MACHINE THAT USES A 2D CAMERA TO DETERMINE 3D COORDINATES OF SMOOTHLY CONTINUOUS EDGE FEATURES

(71) Applicant: FARO Technologies, Inc., Lake Mary, FL (US)

(72) Inventors: Robert E. Bridges, Kennett Square, PA (US); Joydeep Yadav, Exton, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 15/481,673

(22) Filed: Apr. 7, 2017

(65) Prior Publication Data
US 2017/0211927 A1    Jul. 27, 2017

Related U.S. Application Data

(63) Continuation-in-part of application No. 14/679,580, filed on Apr. 6, 2015, now Pat. No. 9,628,775, which
(Continued)

(51) Int. Cl.
G01B 11/03 (2006.01)
G01B 11/00 (2006.01)
(Continued)

(52) U.S. Cl.
CPC .......... *G01B 11/005* (2013.01); *G01B 5/008* (2013.01); *G01B 5/012* (2013.01); *G01B 11/2509* (2013.01); *G01B 11/2513* (2013.01); *G01B 21/047* (2013.01); *G05B 15/02* (2013.01); *G05B 19/401* (2013.01); *G06T 7/13* (2017.01); *H04N 5/2252* (2013.01); *H04N 13/0203* (2013.01); *H04N 13/0221* (2013.01); *G01B 2210/58* (2013.01); *G05B 2219/37193* (2013.01);
(Continued)

(58) Field of Classification Search
CPC ...................................................... G01B 11/005
USPC ........................................................... 33/503
See application file for complete search history.

(56) References Cited

U.S. PATENT DOCUMENTS 4,664,588 A    5/1987  Newell et al.
5,251,156 A   10/1993  Heier et al.
(Continued)

FOREIGN PATENT DOCUMENTS

CN    1812868 A    8/2006
CN  101371099 A    2/2009
(Continued)

OTHER PUBLICATIONS

German Examination Report for Application No. 11 2013 003 076.4 issued May 5, 2017; 6 pgs.
(Continued)

*Primary Examiner* — Christopher Fulton
(74) *Attorney, Agent, or Firm* — Cantor Colburn LLP

(57) ABSTRACT

A portable articulated arm coordinate measuring machine (AACMM) having an integrated camera captures 2D images of an object at three or more different poses. A processor determines 3D coordinates of a smoothly continuous edge point of the object based at least in part on the captured 2D images and pose data provided by the AACMM.

16 Claims, 46 Drawing Sheets

Related U.S. Application Data is a continuation-in-part of application No. 14/485,876, filed on Sep. 15, 2014, now Pat. No. 9,607,239, which is a continuation-in-part of application No. 13/491,176, filed on Jun. 7, 2012, now Pat. No. 8,832,954, which is a continuation-in-part of application No. 13/006,507, filed on Jan. 14, 2011, now Pat. No. 8,533,967.

(60) Provisional application No. 61/355,279, filed on Jun. 16, 2010, provisional application No. 61/351,347, filed on Jun. 4, 2010, provisional application No. 61/296,555, filed on Jan. 20, 2010.

(51) Int. Cl.

| | |
|---|---|
| H04N 13/02 | (2006.01) |
| G06T 7/13 | (2017.01) |
| G01B 5/008 | (2006.01) |
| G05B 15/02 | (2006.01) |
| G01B 21/04 | (2006.01) |
| G01B 5/012 | (2006.01) |
| G01B 11/25 | (2006.01) |
| G05B 19/401 | (2006.01) |
| H04N 5/225 | (2006.01) |

(52) U.S. Cl.
CPC .............. *G05B 2219/40233* (2013.01); *G05B 2219/45061* (2013.01)

(56) References Cited

U.S. PATENT DOCUMENTS

| | | |
|---|---|---|
| 5,402,582 A | 4/1995 | Raab |
| 5,611,147 A | 3/1997 | Raab |
| 5,805,289 A | 9/1998 | Corby, Jr. et al. |
| 5,856,874 A | 1/1999 | Tachibana et al. |
| 5,898,484 A | 4/1999 | Harris |
| 6,134,507 A | 10/2000 | Markey, Jr. et al. |
| 6,460,004 B2 | 10/2002 | Greer et al. |
| 6,920,697 B2 | 7/2005 | Raab et al. |
| 7,254,262 B2 | 8/2007 | Nehse et al. |
| 7,395,606 B2 | 7/2008 | Crampton |
| 7,441,341 B2 | 10/2008 | Eaton |
| 7,578,069 B2 | 8/2009 | Eaton |
| 7,742,634 B2 | 6/2010 | Fujieda et al. |
| 7,779,548 B2 | 8/2010 | Ferrari |
| 7,908,757 B2 | 3/2011 | Ferrari |
| 8,052,857 B2 | 11/2011 | Townsend |
| 8,099,877 B2 | 1/2012 | Champ |
| 8,352,212 B2 | 1/2013 | Fetter et al. |
| 8,533,967 B2 | 9/2013 | Bailey et al. |
| 8,537,374 B2 | 9/2013 | Briggs et al. |
| 8,619,265 B2 | 12/2013 | Steffey et al. |
| 8,677,643 B2 | 3/2014 | Bridges et al. |
| 8,683,709 B2 | 4/2014 | York |
| 8,832,954 B2 | 9/2014 | Atwell et al. |
| 9,163,922 B2 | 10/2015 | Bridges et al. |
| 9,228,816 B2 | 1/2016 | Grau |
| 9,607,239 B2 * | 3/2017 | Bridges ................ G06K 9/4604 |
| 9,628,775 B2 * | 4/2017 | Bridges ................ G01B 21/047 |
| 2003/0002055 A1 | 1/2003 | Kilthau et al. |
| 2005/0166413 A1 | 8/2005 | Crampton |
| 2006/0017720 A1 | 1/2006 | Li |
| 2006/0066836 A1 | 3/2006 | Bridges et al. |
| 2006/0129349 A1 | 6/2006 | Raab et al. |
| 2007/0142970 A1 | 6/2007 | Burbank et al. |
| 2007/0163134 A1 | 7/2007 | Eaton |
| 2007/0163136 A1 | 7/2007 | Eaton et al. |
| 2007/0294045 A1 | 12/2007 | Atwell et al. |
| 2009/0013548 A1 | 1/2009 | Ferrari |
| 2009/0187373 A1 | 7/2009 | Atwell |
| 2009/0322859 A1 | 12/2009 | Shelton et al. |
| 2010/0095542 A1 | 4/2010 | Ferrari |
| 2010/0312524 A1 | 12/2010 | Siercks et al. |
| 2010/0328682 A1 | 12/2010 | Kotake et al. |
| 2011/0001958 A1 | 1/2011 | Bridges et al. |
| 2011/0070534 A1 | 3/2011 | Hayashi et al. |
| 2011/0119025 A1 | 5/2011 | Fetter et al. |
| 2011/0164114 A1 | 7/2011 | Kobayashi et al. |
| 2011/0173827 A1 | 7/2011 | Bailey et al. |
| 2011/0178758 A1 | 7/2011 | Atwell et al. |
| 2012/0099100 A1 | 4/2012 | Cramer et al. |
| 2012/0224052 A1 | 9/2012 | Bae |
| 2012/0236320 A1 | 9/2012 | Steffey et al. |
| 2012/0260512 A1 | 10/2012 | Kretschmer et al. |
| 2013/0025143 A1 | 1/2013 | Bailey et al. |
| 2013/0025144 A1 | 1/2013 | Briggs et al. |
| 2013/0097882 A1 | 4/2013 | Bridges et al. |
| 2013/0125408 A1 | 5/2013 | Atwell et al. |
| 2013/0205606 A1 | 8/2013 | Briggs et al. |
| 2013/0222816 A1 | 8/2013 | Briggs et al. |
| 2013/0239424 A1 | 9/2013 | Tait |
| 2013/0293684 A1 | 11/2013 | Becker et al. |
| 2014/0002608 A1 | 1/2014 | Atwell et al. |
| 2014/0009582 A1 | 1/2014 | Suzuki |
| 2014/0012409 A1 | 1/2014 | McMurtry et al. |
| 2014/0028805 A1 | 1/2014 | Tohme |
| 2014/0152769 A1 | 6/2014 | Atwell et al. |
| 2014/0202016 A1 | 7/2014 | Bridges et al. |
| 2014/0259715 A1 | 9/2014 | Engel |
| 2014/0268108 A1 | 9/2014 | Grau |
| 2014/0293023 A1 | 10/2014 | Sherman et al. |
| 2015/0002659 A1 | 1/2015 | Atwell et al. |
| 2015/0130906 A1 | 5/2015 | Bridges |
| 2015/0185000 A1 | 7/2015 | Wilson et al. |

FOREIGN PATENT DOCUMENTS

| | | |
|---|---|---|
| CN | 101511529 A | 8/2009 |
| CN | 101542227 A | 9/2009 |
| CN | 101556137 A | 10/2009 |
| CN | 101806574 A | 8/2010 |
| CN | 101932952 A | 12/2010 |
| DE | 10219054 A1 | 11/2003 |
| DE | 102005060967 A1 | 6/2007 |
| DE | 102009001894 A1 | 9/2010 |
| DE | 102012104745 A1 | 12/2013 |
| EP | 1033556 A1 | 9/2000 |
| EP | 1189124 A1 | 3/2002 |
| EP | 2177868 A2 | 4/2010 |
| EP | 2344303 B1 | 7/2011 |
| EP | 2372302 A1 | 10/2011 |
| EP | 2400261 A1 | 12/2011 |
| GB | 2420241 A | 5/2006 |
| GB | 2510510 A | 8/2014 |
| JP | 2004163346 A | 6/2004 |
| JP | 2005517914 A | 6/2005 |
| JP | 2006519369 A | 8/2006 |
| JP | 2007228315 A | 9/2007 |
| JP | 2009524057 | 6/2009 |
| JP | 2009534969 A | 9/2009 |
| JP | 2009541758 A | 11/2009 |
| JP | 2010060304 A | 3/2010 |
| JP | 2010122209 A | 6/2010 |
| JP | 2010207990 A | 9/2010 |
| JP | 2011141174 A | 7/2011 |
| JP | 2013517508 A | 5/2013 |
| JP | 2013543970 A | 12/2013 |
| WO | 2008027588 A2 | 3/2008 |
| WO | 2009127526 A1 | 10/2009 |
| WO | 2010040742 A1 | 4/2010 |
| WO | 2011090892 A2 | 7/2011 |
| WO | 2011090903 A1 | 9/2011 |
| WO | 2012125671 A1 | 9/2012 |
| WO | 2013184340 A1 | 12/2013 |

OTHER PUBLICATIONS

Ben-Tzvi, P., et al., "Extraction of 3D images using pitch-actuated 2D laser range finder for robotic vision", Robotic and Sensors Environments (ROSE), 2010 IEEE International Workshop On,

(56) References Cited

OTHER PUBLICATIONS

IEEE, Pisataway, NJ, USA, Oct. 15, 2010 (Oct. 15, 2010), pp. 1-6, XP031840390.
Chinese Office Action for Application No. 201180004746.4 dated Sep. 30, 2014; 9 pages.
Chinese Office Action for Application No. 201180004746.4 dated Apr. 21, 2015; 5 pages.
Chinese Office Action for Application No. 201380029985.4 dated Aug. 7, 2015; 7 pages.
Chinese Office Action for Application No. 201380029985.4 dated Mar. 11, 2016; 8 pages.
Chinese Office Action for Application No. 201380030405.3 dated Sep. 20, 2016; 12 pages.
Chinese Office Action with Search Report for Application No. 201380005188.2 dated Mar. 3, 2015; 3 pages.
Cho, Yong K., et al. "Light-weight 3D ladar system for construction robotic operations" 26th International Symposium on Automation and Robotics in Construction (ISARC 2009), 2009, XP55068755, Retrieved from Internet: URL:http://www.iaarc.org/publications/full text/ Light-weight_3D_ladar_system_for_construction_robotic_operations.pdf [retrieved on Jun. 28, 2013].
Geng, J. "Structured-Light 3D Surface Imaging: A Tutorial," Advances in Optics and Photonics 3; Mar. 31, 2011, pp. 128-160; IEEE Intelligent Transportation System Society; 2011 Optical Society of America.
Geng, J., et al., "DLP-based structured light 3D imaging technologies and applications", Emerging Digitial Micromirror Device Based Systems and Applications III, Spie, vol. 7932, No. 1, Feb. 10, 2011 (Feb. 10, 2011).
German Examination Report Application No. 11 2013 003 076.4 dated Jul. 23, 2015; 1-7 pages.
German Examination Report for Application No. 10 201502050110.2 dated Feb. 25, 2016; pp. 5.
German Examination Report for Application No. 11 2013 002 824.7 dated Jul. 21, 2015; 1-6 pages.
German Examinaton Report for Application No. 112011100309.9 dated Sep. 23, 2014, 10 pages.
Great Britain Examination Report for Application No. GB121446.7 dated Oct. 6, 2014; 5 pages.
Great Britain Examination Report for Application No. GB1504825.9 dated May 28, 2015; 6 pages.
Great Britain Examination Report to Application No. GB1422105.5 dated Jan. 26, 2015, 4 pages.
Great Britain Examination Report to GB1418273.7 dated Oct. 24, 2014, 8 pages.
Great BritainExamination Report for Application No. GB1214426.7 dated Jan. 15, 2014; 5 pages.
PCT International Search Report and Written Opinion for International Application No. PCT/US2011021253 dated Sep. 25, 2011; 18 pages.
Japanese Office Action for Appliation No. 2015-516035 dated May 12, 2015; pp. 1-3.
Japanese Office Action for Application No. 2012-550045 dated Feb. 18, 2014; 2 pages.
Japanese Office Action for Application No. 2014-102495 dated Feb. 10, 2015; 2 pgs.
Japanese Office Action for Application No. 2014-561197 dated Sep. 1, 2015, 3 pgs.
Japanese Office Action for Application No. 2015-516023 dated Mar. 28, 2017; 4 pgs.
Japanese Office Action for Application No. 2015-049378 dated Apr. 7, 2015, 3 pages.
Lee, Min-Gu, et al., "Compact 3D lidar based on optically coupled horizontal and vertical scanning mechanism for the autonomous navigation of robots," Proceedings of SPIE, vol. 8037, May 10, 2011 (May 10, 2011), p. 80371H, XP055069052.
PCT International Search Report and Written Opinion for International Application No. PCT/US2013/040309 dated Jul. 15, 2013; 11 pages.
PCT International Search Report and Written Opinion for International Application No. PCT/US2013/040321 dated Jul. 15, 2013; 11 pages.
PCT International Search Report and Written Opinion for International Application No. PCT/US2013/041826 dated Jul. 29, 2013; 12 pages.
PCT International Search Report and Written Opinion for International Application No. PCT/US2015/049078 dated Nov. 23, 2015; 12 pages.
PCT International Search Report and Written Opinion for International Application No. PCT/US2015/060087 dated Feb. 17, 2016; 11 pages.
Trujilla-Pino, A., et al., "Accurate subpixel edge location based on partial area effect" Elsevier, Imaging and Vision Computing 31 (2013) pp. 72-90.
German Office Action for Application No. 11 2015 004 196.6 dated Jul. 31, 2017; 6 pgs.

\* cited by examiner

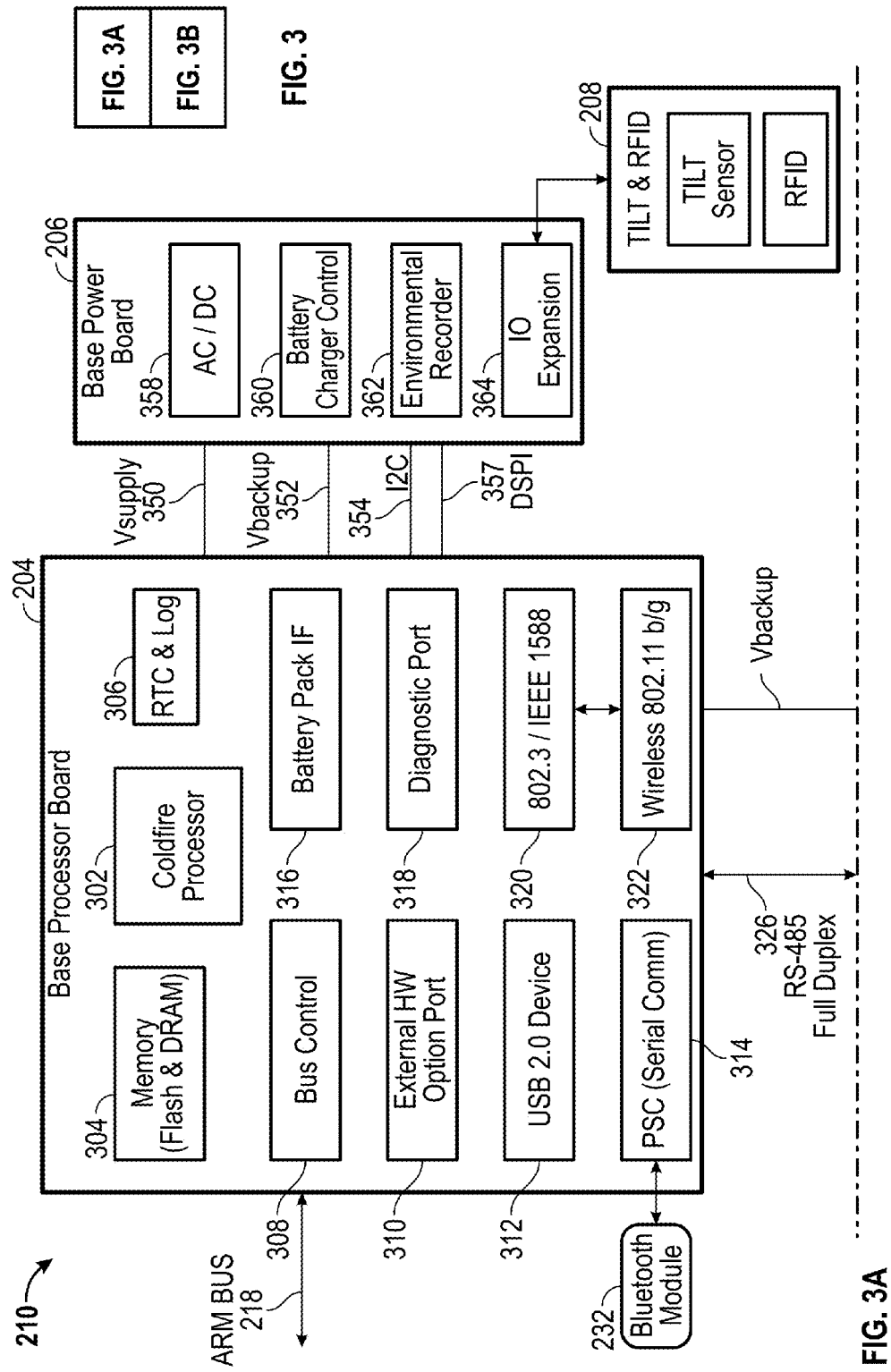

Gray Code Sequence
FIG. 17A
Sinusoidal Sequence - Three Periods
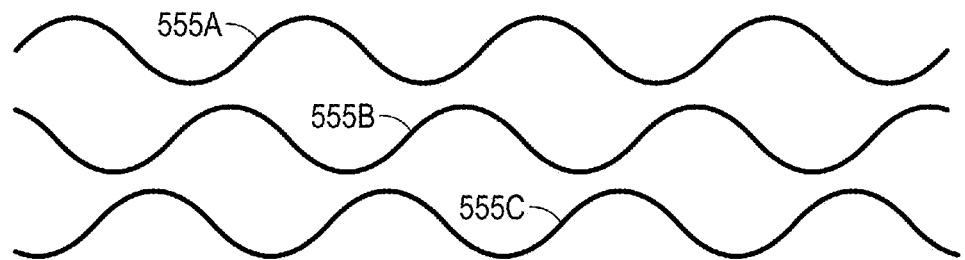
FIG. 17B
Sinusoidal Sequence - Four Periods
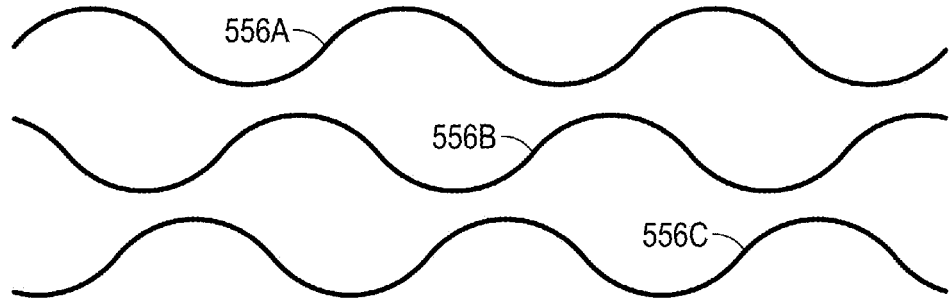
FIG. 17C

Lines of Red, Green, Violet

Blocks of Green, Violet, Red

Sinusoidal Pattern 1 (Standard Density)

730

Square Pattern

ARTICULATED ARM COORDINATE MEASUREMENT MACHINE THAT USES A 2D CAMERA TO DETERMINE 3D COORDINATES OF SMOOTHLY CONTINUOUS EDGE FEATURES

CROSS-REFERENCE TO RELATED APPLICATIONS

The present application is a continuation-in-part of U.S. patent application Ser. No. 14/679,580 filed on Apr. 6, 2015 now U.S. Pat. No. 9,628,775, which is a continuation-in-part of U.S. patent application Ser. No. 14/485,876 filed on Sep. 15, 2014 now U.S. Pat. No. 9,607,239, which is a continuation-in-part of U.S. patent application Ser. No. 13/491,176 filed Jun. 7, 2012 now U.S. Pat. No. 8,832,954, which is a continuation-in-part of U.S. patent application Ser. No. 13/006,507 filed Jan. 14, 2011, now U.S. Pat. No. 8,533,967, and claims the benefit of provisional application No. 61/296,555 filed Jan. 20, 2010, provisional application No. 61/355,279 filed Jun. 16, 2010, and provisional application No. 61/351,347 filed on Jun. 4, 2010. The contents of all of the above referenced patent applications and patents are hereby incorporated by reference herein.

BACKGROUND

The present disclosure relates to a coordinate measuring machine, and more particularly to a portable articulated arm coordinate measuring machine having a connector on a probe end of the coordinate measuring machine that allows accessory devices which use structured light for non-contact three dimensional measurement to be removably connected to the coordinate measuring machine.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

Three-dimensional surfaces may be measured using non-contact techniques as well. One type of non-contact device, sometimes referred to as a laser line probe (LLP) or laser line scanner, emits a laser light either on a spot, or along a line. An imaging device, such as a charge-coupled device (CCD) for example, is positioned adjacent the laser. The laser is arranged to emit a line of light which is reflected off of the surface. The surface of the object being measured causes a diffuse reflection which is captured by the imaging device. The image of the reflected line on the sensor will change as the distance between the sensor and the surface changes. By knowing the relationship between the imaging sensor and the laser and the position of the laser image on the sensor, triangulation methods may be used to measure three-dimensional coordinates of points on the surface.

It is sometimes desirable to measure 3D coordinates of smoothly continuous edge points using one or more cameras integrated into an AACMM without using additional probes. There is a need to obtain such 3D coordinates with relatively high accuracy and high density and without errors that may be introduced by 3D noncontact measuring devices such as an LLP or structured light scanner.

While existing CMM's are suitable for their intended purposes, what is needed is a portable AACMM that has certain features of embodiments of the present invention.

SUMMARY

In accordance with an embodiment of the invention, a method of determining three-dimensional (3D) coordinates of an edge point of an object is provided. The method comprises: providing an articulated arm coordinate measuring machine (AACMM) that includes a base, a manually positionable arm portion having an opposed first end and second end, the arm portion being rotationally coupled to the base, the arm portion including a plurality of connected arm segments, each arm segment including at least one position transducer for producing a position signal, a first camera assembly coupled to the first end, an electronic circuit that receives the position signal from each of the at least one position transducer and provides data corresponding to a pose of the first camera assembly; providing a processor; in a first instance: capturing with the first camera assembly in a first pose a first image of the object; obtaining from the electronic circuit first data corresponding to the first pose; in a second instance: capturing with the first camera assembly in a second pose a second image of the object; obtaining from the electronic circuit second data corresponding to the second pose; in a third instance: capturing with the first camera assembly in a third pose a third image of the object; obtaining from the electronic circuit third data corresponding to the third pose; determining with the processor the 3D coordinates of a first edge point, the first edge point being smoothly continuous within an interval of edge points, the 3D coordinates of the first edge point determined based at least in part on the first data, the second data, the third data, the first image, the second image, and the third image; and storing the determine 3D coordinates of the first edge point.

In accordance with a further embodiment of the invention, a method of determining three-dimensional (3D) coordinates of an edge point of an object is provided. The method comprises: providing an articulated arm coordinate measuring machine (AACMM) that includes a base, a manually positionable arm portion having an opposed first end and second end, the arm portion being rotationally coupled to the base, the arm portion including a plurality of connected arm segments, each arm segment including at least one position transducer for producing a position signal, a first camera assembly and a second camera assembly coupled to the first end, an electronic circuit that receives the position signal from each of the at least one position transducer and provides data corresponding to a pose of the first camera assembly and the second camera assembly; providing a processor; in a first instance: capturing with the first camera assembly in a first pose a first image of the object; obtaining from the electronic circuit first data corresponding to the first pose; capturing with the second camera assembly in a second pose a second image of the object; obtaining from the electronic circuit second data corresponding to the second pose; in a second instance: capturing with the first camera assembly in a third pose a third image of the object; obtaining from the electronic circuit third data corresponding to the third pose; determining with the processor the 3D coordinates of a first edge point, the first edge point being smoothly continuous within an interval of edge points, the 3D coordinates of the first edge point determined based at least in part on the first data, the second data, the third data, the first image, the second image, and the third image; and storing the determine 3D coordinates of the first edge point.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including

FIGS. 14A-14B, FIG. 15, FIG. 16 and FIGS. 17A-17C are sequential projections having an uncoded binary pattern that may be emitted by the structured light device of FIG. 10 or FIG. 12, in accordance with an embodiment of the present invention;

DETAILED DESCRIPTION

Figure 1A:
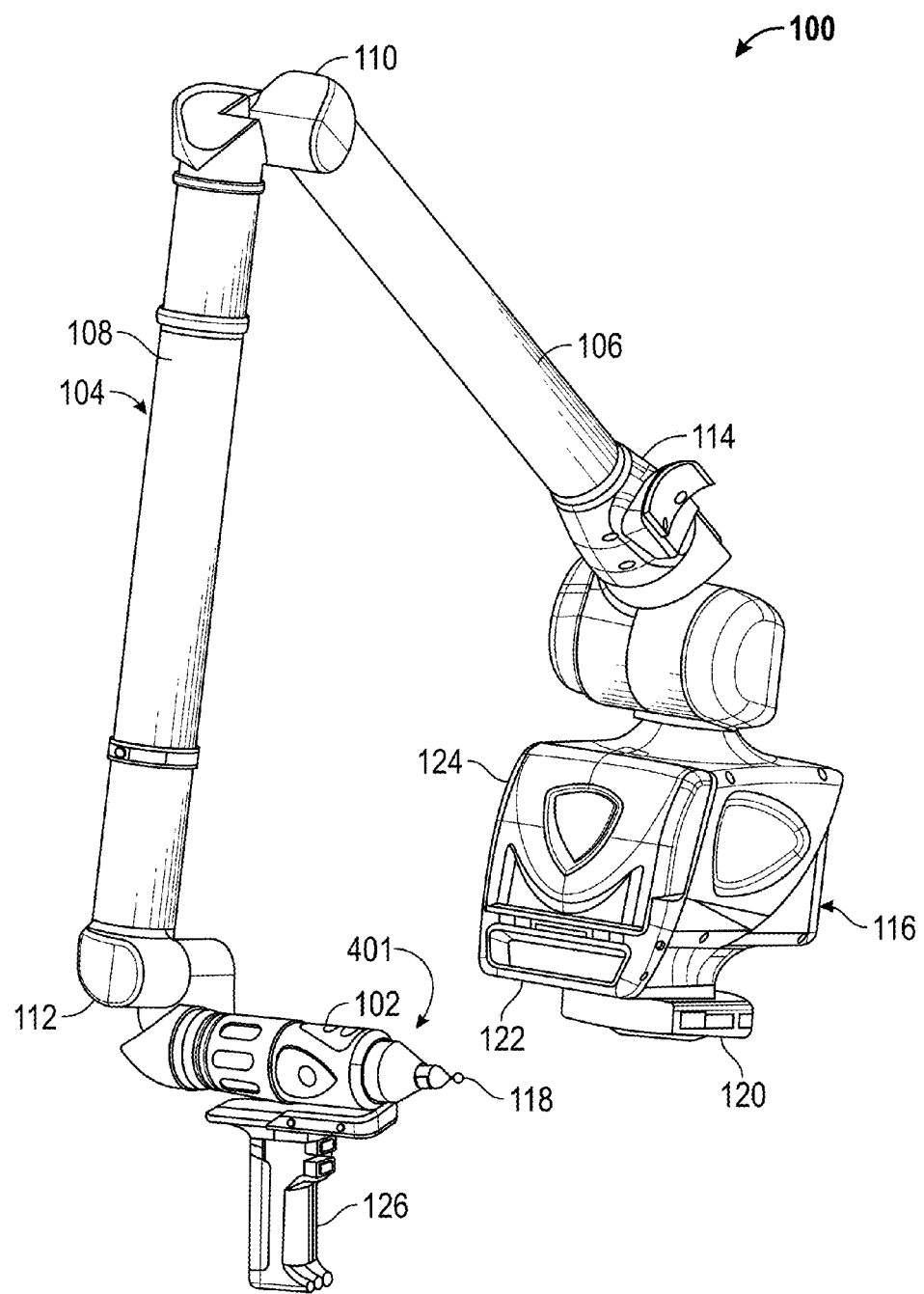
FIGS. 1A and 1B, are perspective views of a portable articulated arm coordinate measuring machine (AACMM) having embodiments of various aspects of the present invention therewithin.

Portable articulated arm coordinate measuring machines ("AACMM") are used in a variety of applications to obtain measurements of objects. Embodiments of the present invention provide advantages in allowing an operator to easily and quickly couple accessory devices to a probe end of the AACMM that use structured light to provide for the non-contact measuring of a three-dimensional object. Embodiments of the present invention provide further advantages in providing for communicating data representing a point cloud measured by the structured light device within the AACMM. Embodiments of the present invention provide advantages in greater uniformity in the distribution of measured points that may provide enhanced accuracy. Embodiments of the present invention provide still further advantages in providing power and data communications to a removable accessory without having external connections or wiring. Embodiments of the present invention provide still further advantages in sharpening edges of features in 3D representations.

As used herein, the term "structured light" refers to a two-dimensional pattern of light projected onto a continuous and enclosed area of an object that conveys information which may be used to determine coordinates of points on the object. A structured light pattern will contain at least three non-collinear pattern elements disposed within the contiguous and enclosed area. Each of the three non-collinear pattern elements conveys information that may be used to determine the point coordinates.

In general, there are two types of structured light, a coded light pattern and an uncoded light pattern. As used herein a coded light pattern is one in which the three dimensional coordinates of an illuminated surface of the object may be ascertained by the acquisition of a single image. In some cases, the projecting device may be moving relative to the object. In other words, for a coded light pattern there will be no significant temporal relationship between the projected pattern and the acquired image. Typically, a coded light pattern will contain a set of elements (e.g. geometric shapes) arranged so that at least three of the elements are non-collinear. In some cases, the set of elements may be arranged into collections of lines. Having at least three of the element be non-collinear ensures that the pattern is not a simple line pattern as would be projected, for example, by a laser line scanner. As a result, the pattern elements are recognizable because of the arrangement of the elements.

In contrast, an uncoded structured light pattern as used herein is a pattern that does not allow measurement through a single pattern when the projector is moving relative to the object. An example of an uncoded light pattern is one that requires a series of sequential patterns and thus the acquisition of a series of sequential images. Due to the temporal nature of the projection pattern and acquisition of the image, there should be no relative movement between the projector and the object.

It should be appreciated that structured light is different from light projected by a laser line probe or laser line scanner type device that generates a line of light. To the extent that laser line probes used with articulated arms today have irregularities or other aspects that may be regarded as features within the generated lines, these features are disposed in a collinear arrangement. Consequently, such features within a single generated line are not considered to make the projected light into structured light.

Figure 1B:
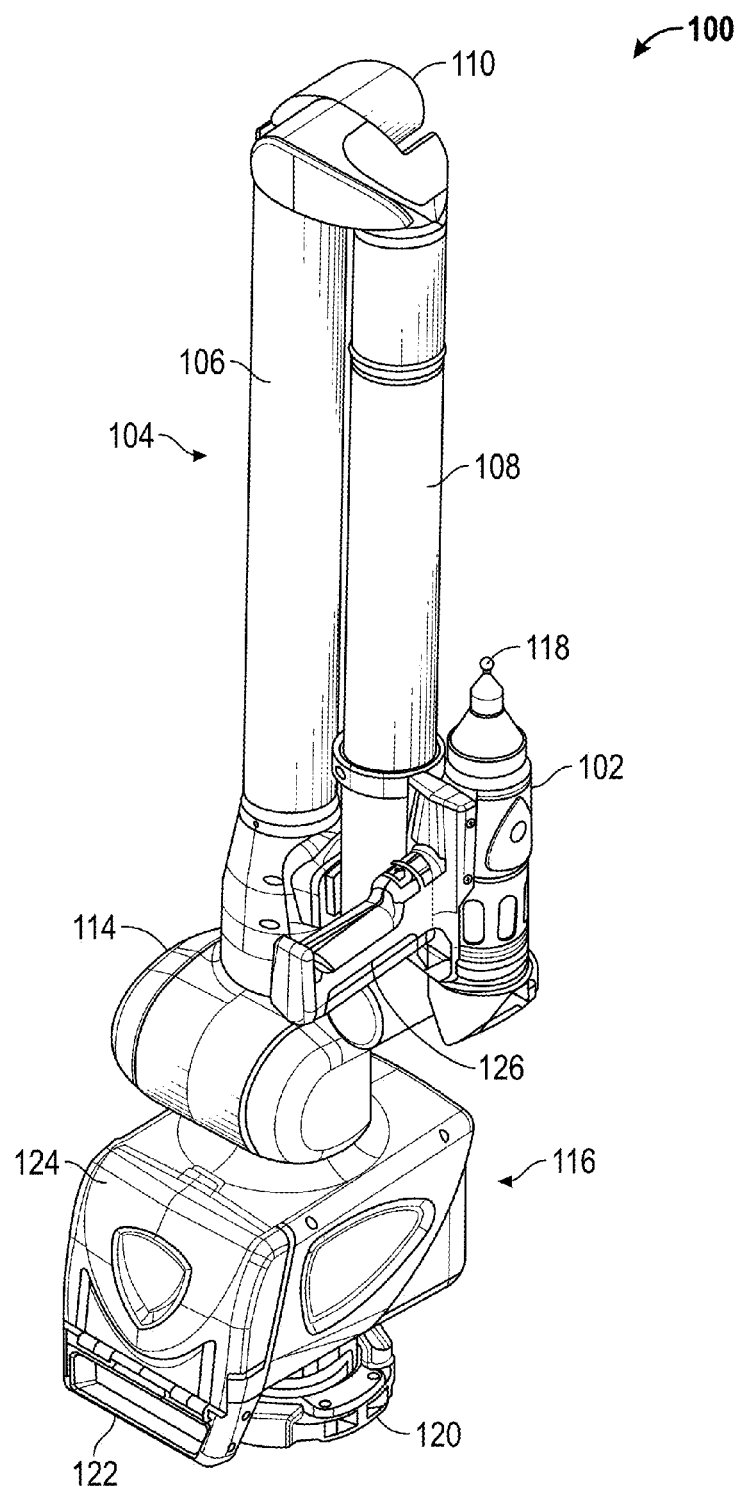

FIGS. 1A and 1B illustrate, in perspective, an AACMM 100 according to various embodiments of the present invention, an articulated arm being one type of coordinate measuring machine. As shown in FIGS. 1A and 1B, the exemplary AACMM 100 may comprise a six or seven axis articulated measurement device having a probe end 401 that includes a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end 401 may include a measurement probe housing 102 that comprises the shaft of the seventh axis portion of the AACMM 100 (e.g., a cartridge containing an encoder system that determines movement of the measurement device, for example a probe 118, in the seventh axis of the AACMM 100). In this embodiment, the probe end 401 may rotate about an axis extending through the center of measurement probe housing 102. In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. As will be discussed in more detail below, the handle 126 may be replaced with another device configured to emit a structured light to provide non-contact measurement of three-dimensional objects, thereby providing advantages in allowing the operator to make both contact and non-contact measurements with the same AACMM 100. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a coded structured light scanner device. In an embodiment, the handle 126 is replaced with the coded structured light scanner device using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2D, the removable handle 126 may also include an electrical connector that allows electrical power and data to be exchanged with the handle 126 and the corresponding electronics located in the probe end 401.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic circuit having an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a structured light device that can be mounted to the removable handle 126 on the AACMM 100). The electronics that support these peripheral hardware devices or features may be located in each of the bearing cartridge groupings 110, 112, 114 located within the portable AACMM 100.

Figure 2:
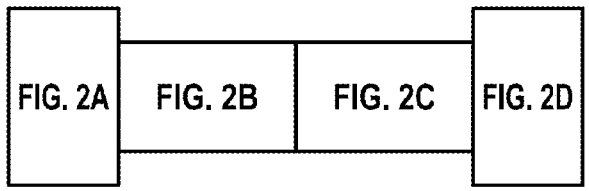
FIG. 2, including FIGS. 2A-2D taken together, is a block diagram of electronics utilized as part of the AACMM of FIG. 1 in accordance with an embodiment.

FIG. 2 is a block diagram of electronics utilized in an AACMM 100 in accordance with an embodiment. The embodiment shown in FIG. 2A includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

Figure 2A:
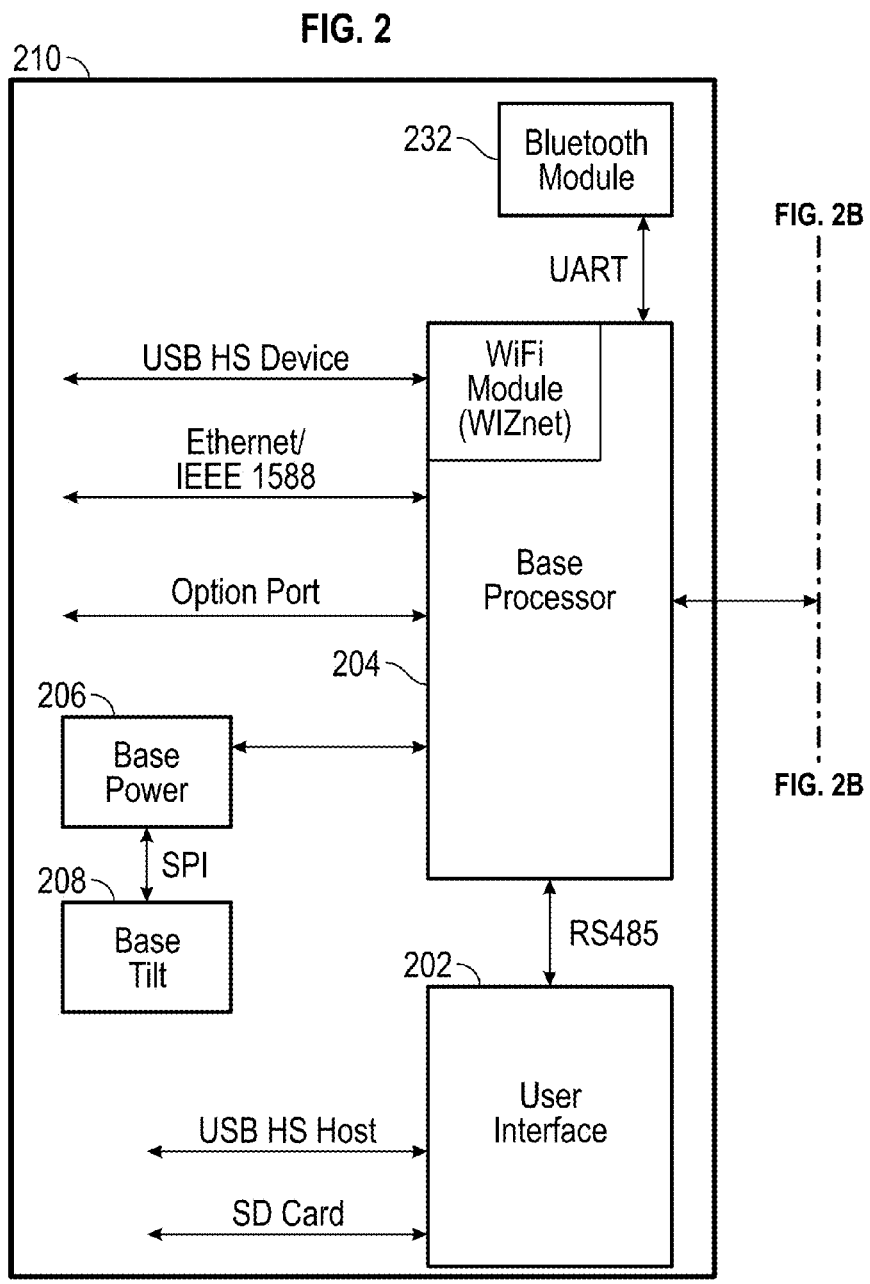
Figure 2B:
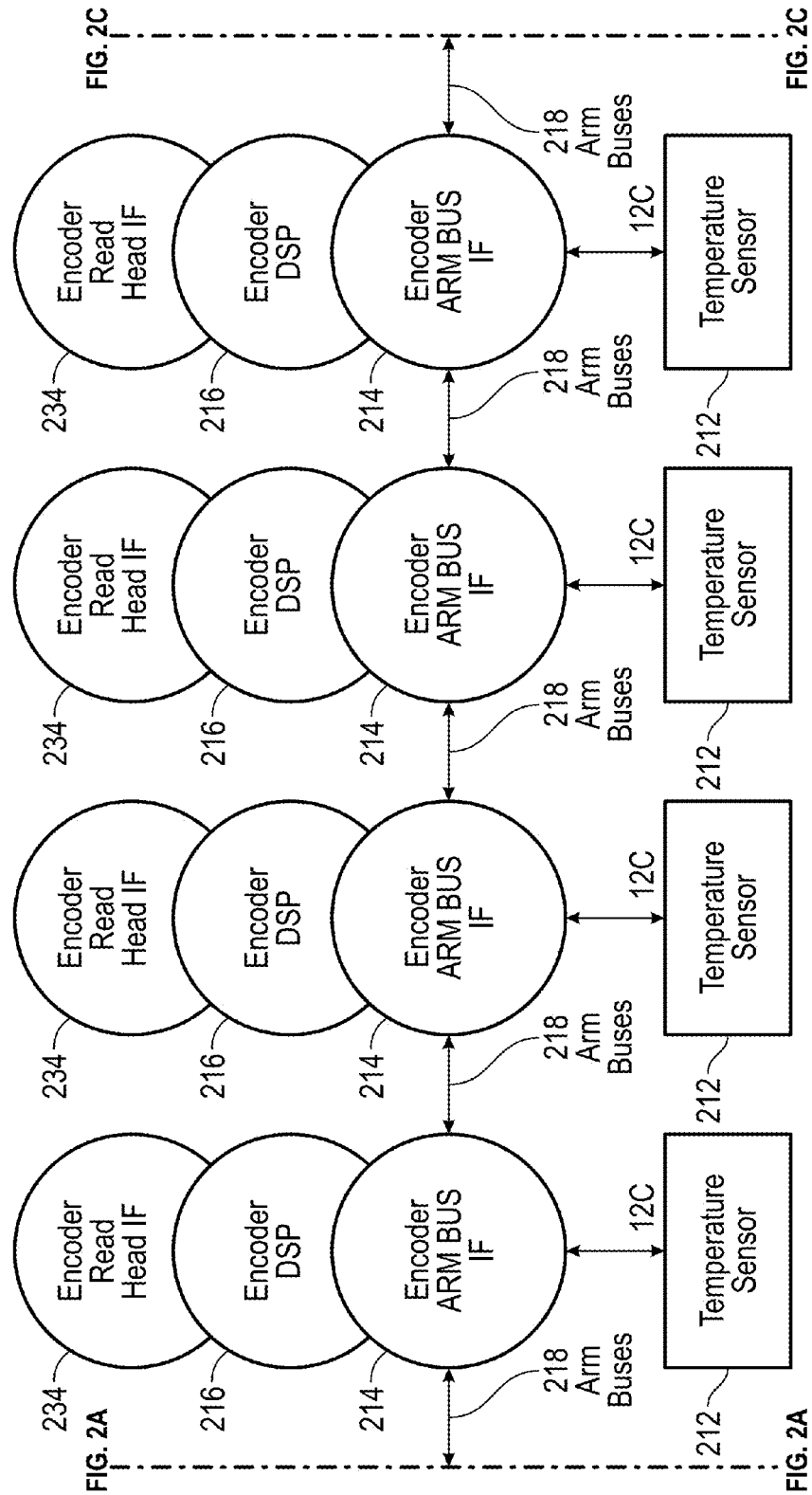
Figure 2C:
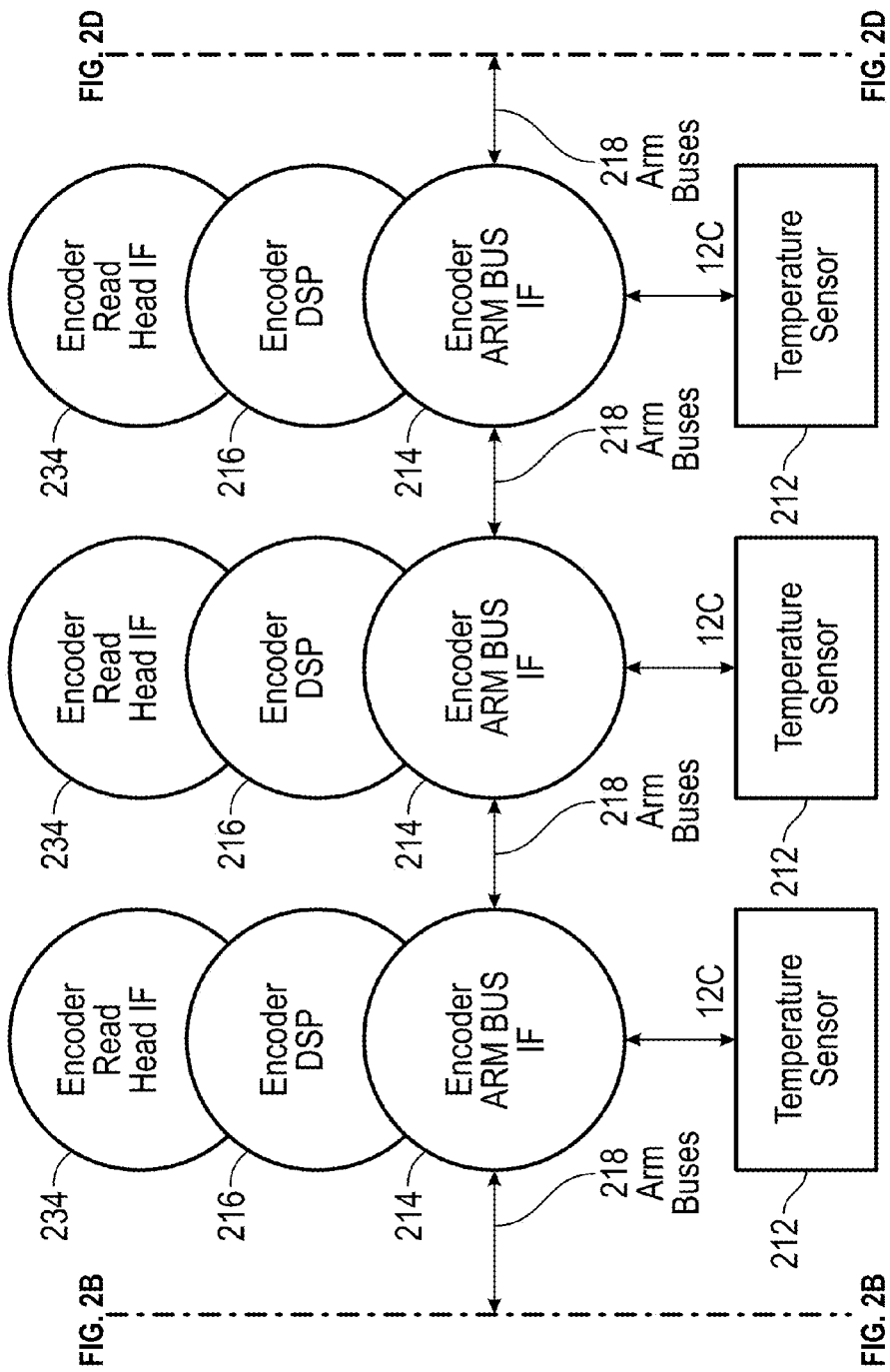

As shown in FIG. 2A and FIG. 2B, the electronic data processing system 210 is in communication with the aforementioned plurality of encoder systems via one or more arm buses 218. In the embodiment depicted in FIG. 2B and FIG. 2C, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Figure 2D:
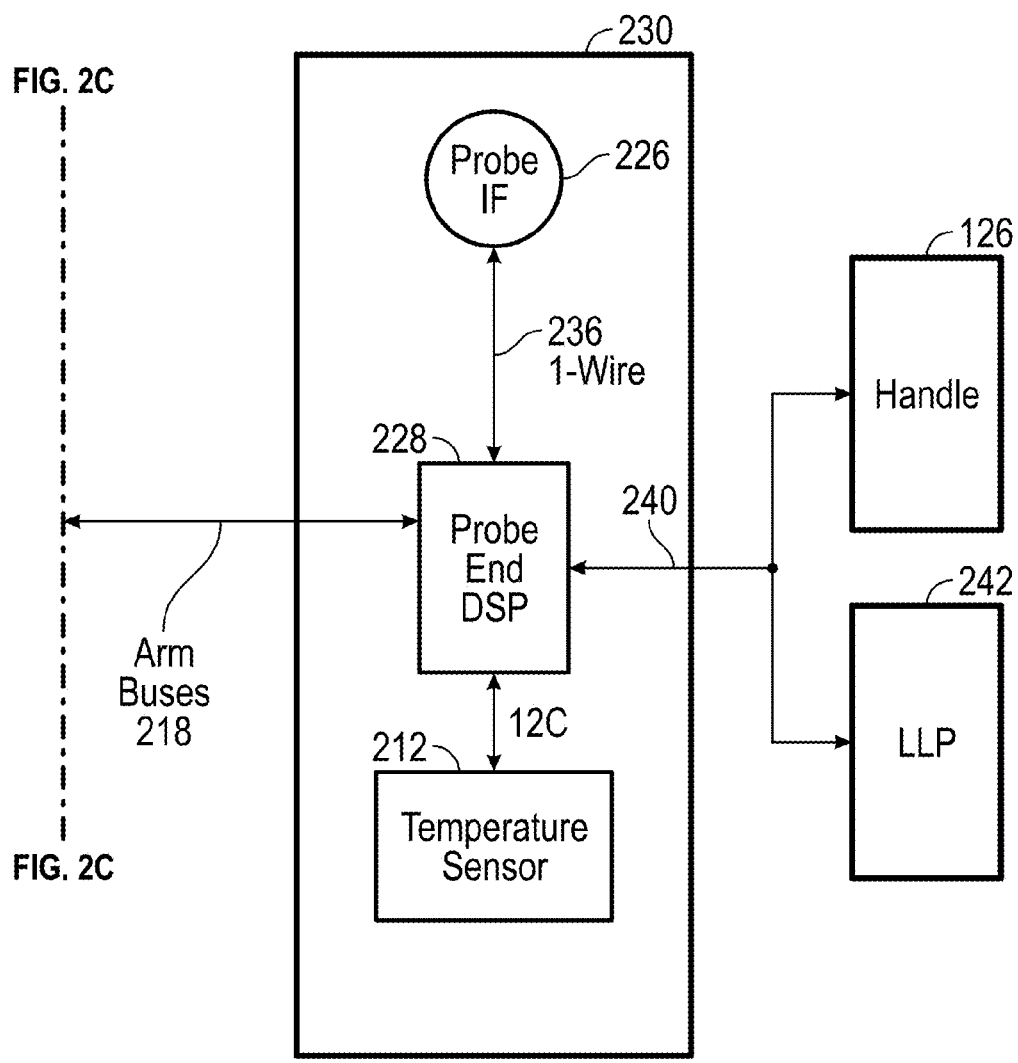

Also shown in FIG. 2D are probe end electronics 230 that are in communication with the arm bus 218. The probe end electronics 230 include a probe end DSP 228, a temperature sensor 212, a handle/device interface bus 240 that connects with the handle 126 or the coded structured light scanner device 242 via the quick-connect interface in an embodiment, and a probe interface 226. The quick-connect interface allows access by the handle 126 to the data bus, control lines, and power bus used by the coded structured light scanner device 242 and other accessories. In an embodiment, the probe end electronics 230 are located in the measurement probe housing 102 on the AACMM 100. In an embodiment, the handle 126 may be removed from the quick-connect interface and measurement may be performed by the structured light device 242 communicating with the probe end electronics 230 of the AACMM 100 via the interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-Wire® communications protocol 236.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3A, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as a coded structured light scanner device 242. A real time clock (RTC) and log 306, a battery pack interface (IF) 316, and a diagnostic port 318 are also included in the functionality in an embodiment of the base processor board 204 depicted in FIG. 3A.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Figure 3B:
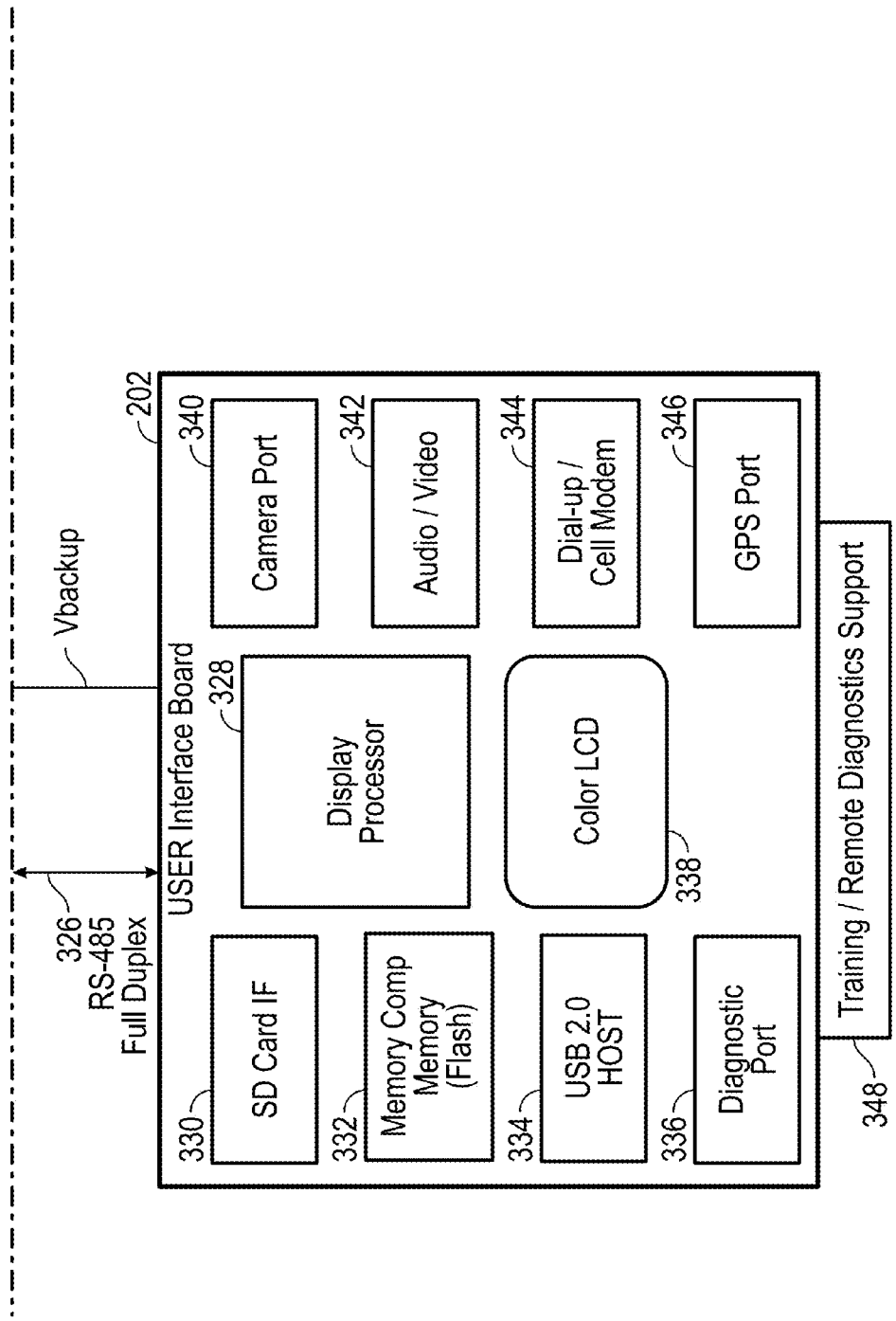
FIG. 3, including FIGS. 3A and 3B taken together, is a block diagram describing detailed features of the electronic data processing system of FIG. 2 in accordance with an embodiment.
Figure 4:
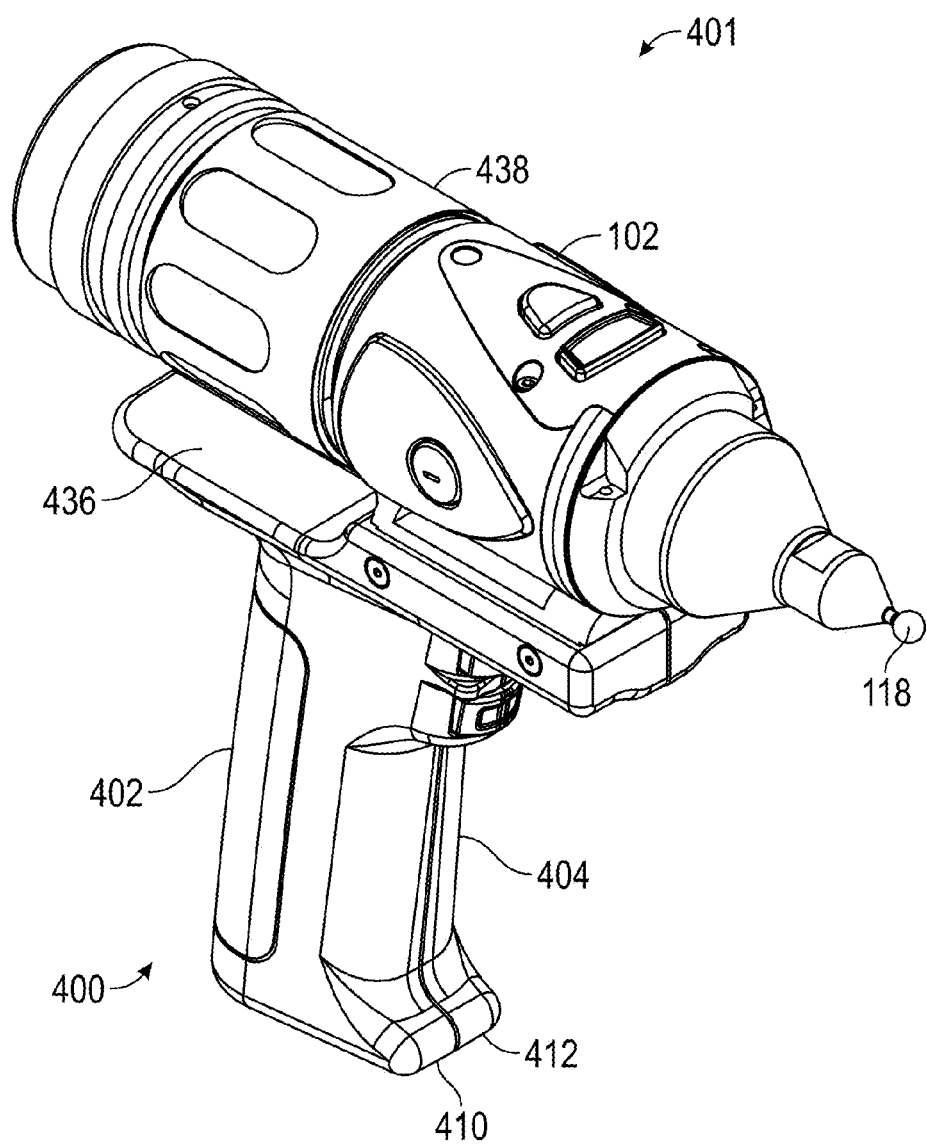
FIG. 4 is an isometric view of the probe end of the AACMM of FIG. 1.

Turning now to the user interface board 202 in FIG. 3B, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3A also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 357. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3A and FIG. 3B. For example, in one embodiment, the base processor board 204 and the user interface board 202 are combined into one physical board.

Figure 7:
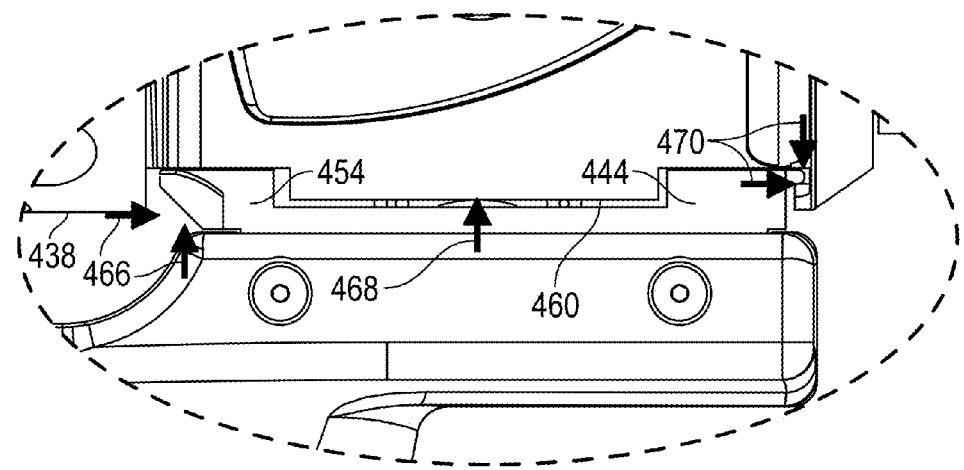
FIG. 7 is an enlarged partial side view of the interface portion of the probe end of FIG. 6.
Figure 8:
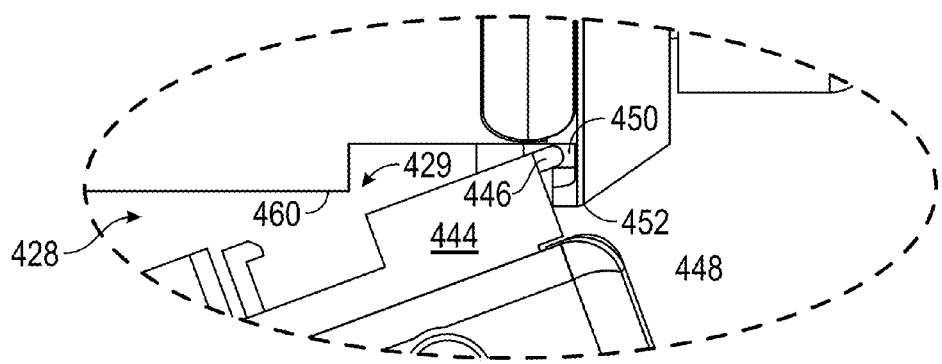
FIG. 8 is another enlarged partial side view of the interface portion of the probe end of FIG. 5.
Figure 9:
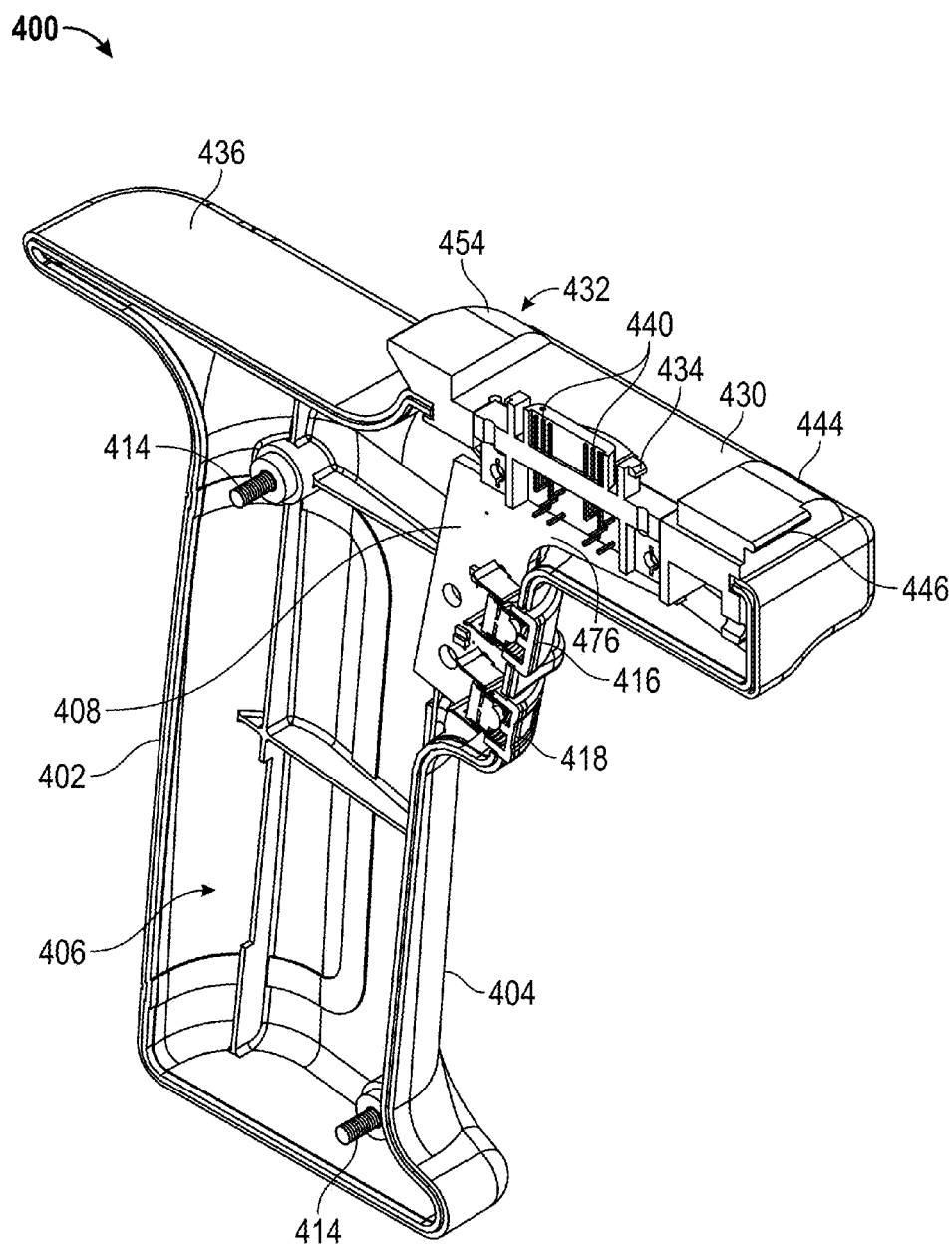
FIG. 9 is an isometric view partially in section of the handle of FIG. 4.
Figure 10:
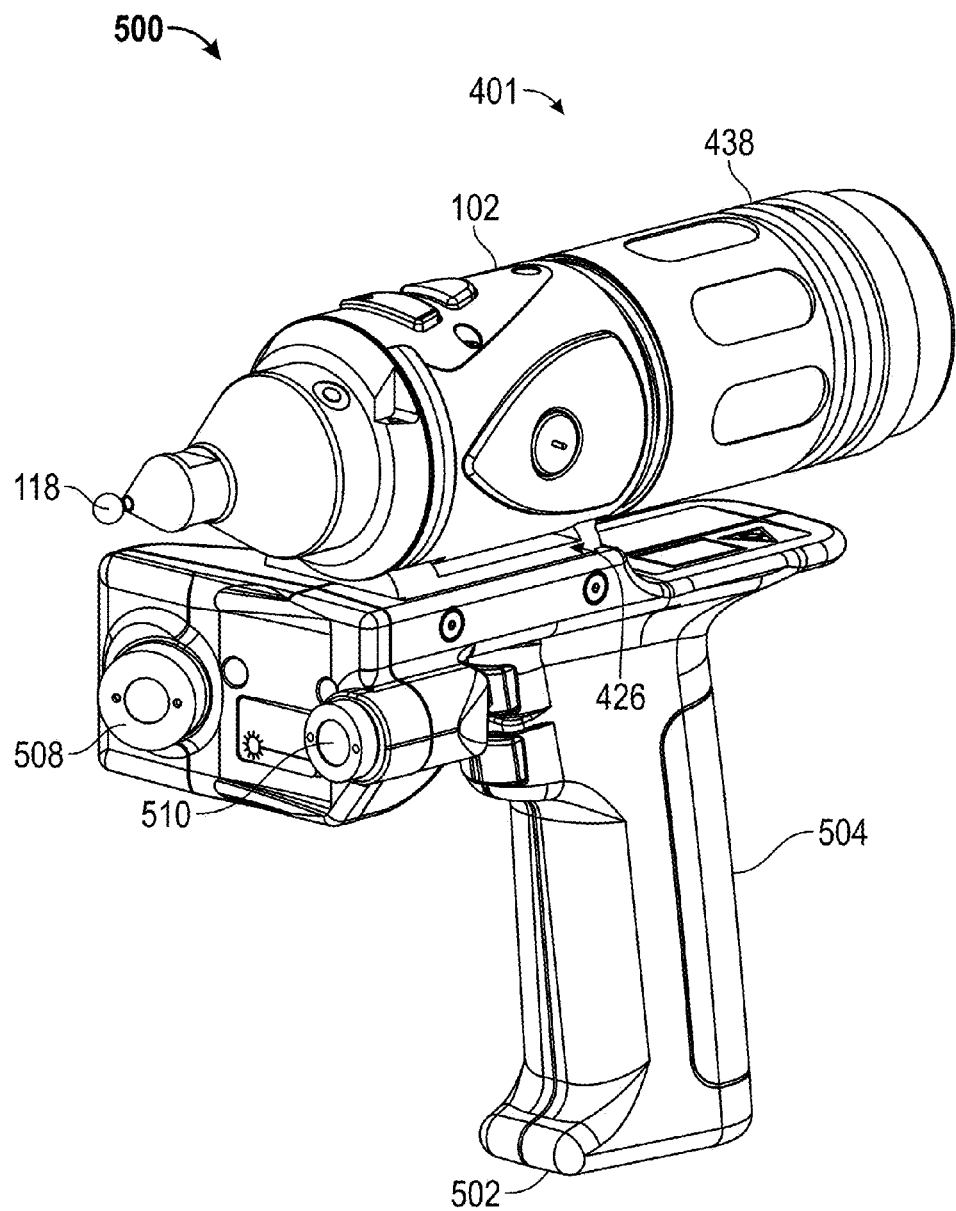
FIG. 10 is an isometric view of the probe end of the AACMM of FIG. 1 with a structured light device having a single camera attached.
Figure 11:
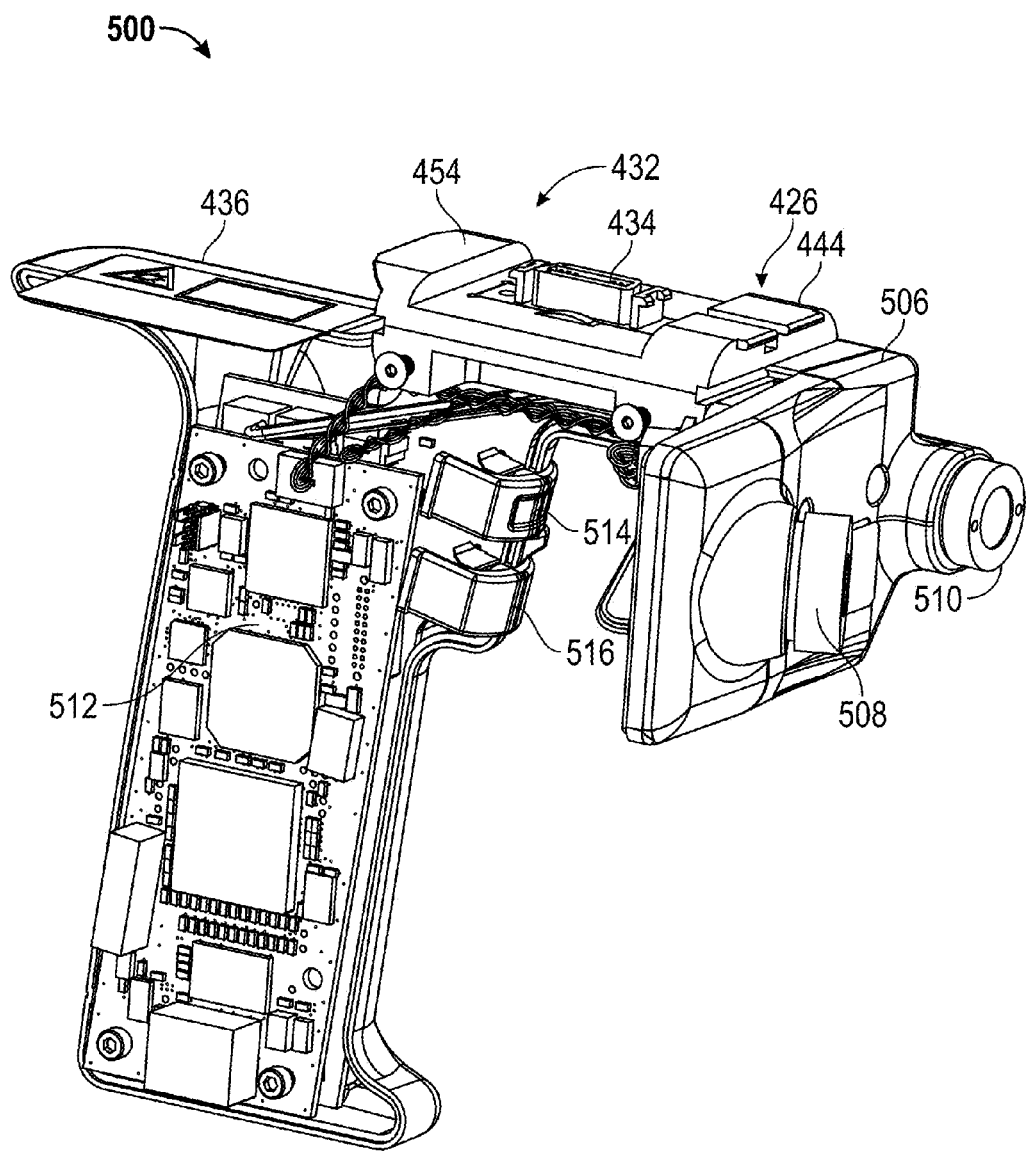
FIG. 11 is an isometric view partially in section of the device of FIG. 10.
Figure 12:
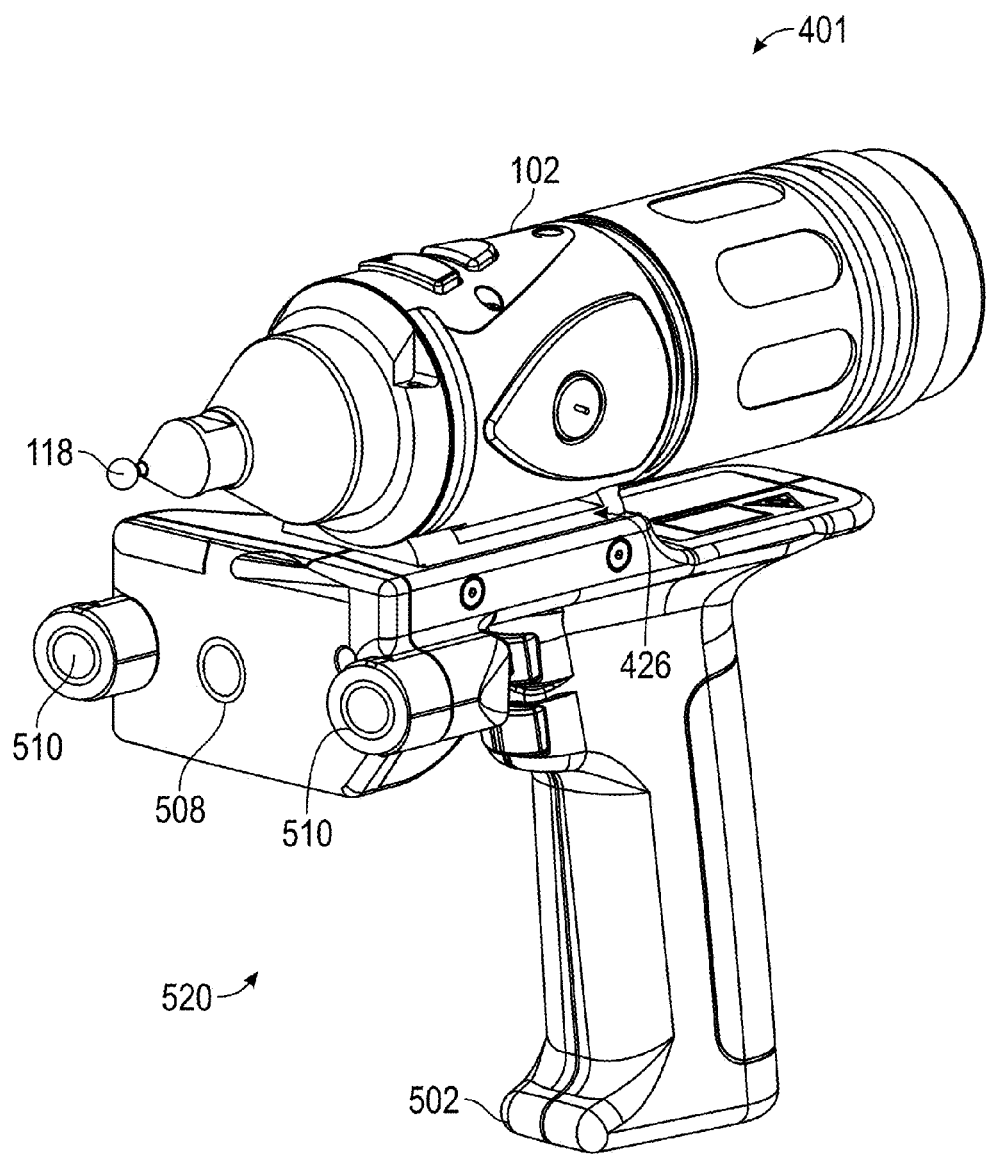
FIG. 12 is an isometric view of the probe end of the AACMM of FIG. 1 with another structured light device having dual cameras attached.

Referring now to FIGS. 4-9, an exemplary embodiment of a probe end 401 is illustrated having a measurement probe housing 102 with a quick-connect mechanical and electrical interface that allows removable and interchangeable device 400 to couple with AACMM 100. In the exemplary embodiment, the device 400 includes an enclosure 402 that includes a handle portion 404 that is sized and shaped to be held in an operator's hand, such as in a pistol grip for example. The enclosure 402 is a thin wall structure having a cavity 406 (FIG. 9). The cavity 406 is sized and configured to receive a controller 408. The controller 408 may be a digital circuit, having a microprocessor for example, or an analog circuit. In one embodiment, the controller 408 is in asynchronous bidirectional communication with the electronic data processing system 210 (FIGS. 2 and 3). The communication connection between the controller 408 and the electronic data processing system 210 may be wired (e.g. via controller 420) or may be a direct or indirect wireless connection (e.g. Bluetooth or IEEE 802.11) or a combination of wired and wireless connections. In the exemplary embodiment, the enclosure 402 is formed in two halves 410, 412, such as from an injection molded plastic material for example. The halves 410, 412 may be secured together by fasteners, such as screws 414 for example. In other embodiments, the enclosure halves 410, 412 may be secured together by adhesives or ultrasonic welding for example.

The handle portion 404 also includes buttons or actuators 416, 418 that may be manually activated by the operator. The actuators 416, 418 are coupled to the controller 408 that transmits a signal to a controller 420 within the probe housing 102. In the exemplary embodiments, the actuators 416, 418 perform the functions of actuators 422, 424 located on the probe housing 102 opposite the device 400. It should be appreciated that the device 400 may have additional switches, buttons or other actuators that may also be used to control the device 400, the AACMM 100 or vice versa. Also, the device 400 may include indicators, such as light emitting diodes (LEDs), sound generators, meters, displays or gauges for example. In one embodiment, the device 400 may include a digital voice recorder that allows for synchronization of verbal comments with a measured point. In yet another embodiment, the device 400 includes a microphone that allows the operator to transmit voice activated commands to the electronic data processing system 210.

In one embodiment, the handle portion 404 may be configured to be used with either operator hand or for a particular hand (e.g. left handed or right handed). The handle portion 404 may also be configured to facilitate operators with disabilities (e.g. operators with missing finders or operators with prosthetic arms). Further, the handle portion 404 may be removed and the probe housing 102 used by itself when clearance space is limited. As discussed above, the probe end 401 may also comprise the shaft of the seventh axis of AACMM 100. In this embodiment the device 400 may be arranged to rotate about the AACMM seventh axis.

The probe end 401 includes a mechanical and electrical interface 426 having a first connector 429 (FIG. 8) on the device 400 that cooperates with a second connector 428 on the probe housing 102. The connectors 428, 429 may include electrical and mechanical features that allow for coupling of the device 400 to the probe housing 102. In one embodiment, the interface 426 includes a first surface 430 having a mechanical coupler 432 and an electrical connector 434 thereon. The enclosure 402 also includes a second surface 436 positioned adjacent to and offset from the first surface 430. In the exemplary embodiment, the second surface 436 is a planar surface offset a distance of approximately 0.5 inches from the first surface 430. This offset provides a clearance for the operator's fingers when tightening or loosening a fastener such as collar 438. The interface 426 provides for a relatively quick and secure electronic connection between the device 400 and the probe housing 102 without the need to align connector pins, and without the need for separate cables or connectors.

The electrical connector 434 extends from the first surface 430 and includes one or more connector pins 440 that are electrically coupled in asynchronous bidirectional communication with the electronic data processing system 210 (FIGS. 2 and 3), such as via one or more arm buses 218 for example. The bidirectional communication connection may be wired (e.g. via arm bus 218), wireless (e.g. Bluetooth or IEEE 802.11), or a combination of wired and wireless connections. In one embodiment, the electrical connector 434 is electrically coupled to the controller 420. The controller 420 may be in asynchronous bidirectional communication with the electronic data processing system 210 such as via one or more arm buses 218 for example. The electrical connector 434 is positioned to provide a relatively quick and secure electronic connection with electrical connector 442 on probe housing 102. The electrical connectors 434, 442 connect with each other when the device 400 is attached to the probe housing 102. The electrical connectors 434, 442 may each comprise a metal encased connector housing that provides shielding from electromagnetic interference as well as protecting the connector pins and assisting with pin alignment during the process of attaching the device 400 to the probe housing 102.

The mechanical coupler 432 provides relatively rigid mechanical coupling between the device 400 and the probe housing 102 to support relatively precise applications in which the location of the device 400 on the end of the arm portion 104 of the AACMM 100 preferably does not shift or move. Any such movement may typically cause an undesirable degradation in the accuracy of the measurement result. These desired results are achieved using various structural features of the mechanical attachment configuration portion of the quick connect mechanical and electronic interface of an embodiment of the present invention.

In one embodiment, the mechanical coupler 432 includes a first projection 444 positioned on one end 448 (the leading edge or "front" of the device 400). The first projection 444 may include a keyed, notched or ramped interface that forms a lip 446 that extends from the first projection 444. The lip 446 is sized to be received in a slot 450 defined by a projection 452 extending from the probe housing 102 (FIG. 8). It should be appreciated that the first projection 444 and the slot 450 along with the collar 438 form a coupler arrangement such that when the lip 446 is positioned within the slot 450, the slot 450 may be used to restrict both the longitudinal and lateral movement of the device 400 when attached to the probe housing 102. As will be discussed in more detail below, the rotation of the collar 438 may be used to secure the lip 446 within the slot 450.

Figure 5:
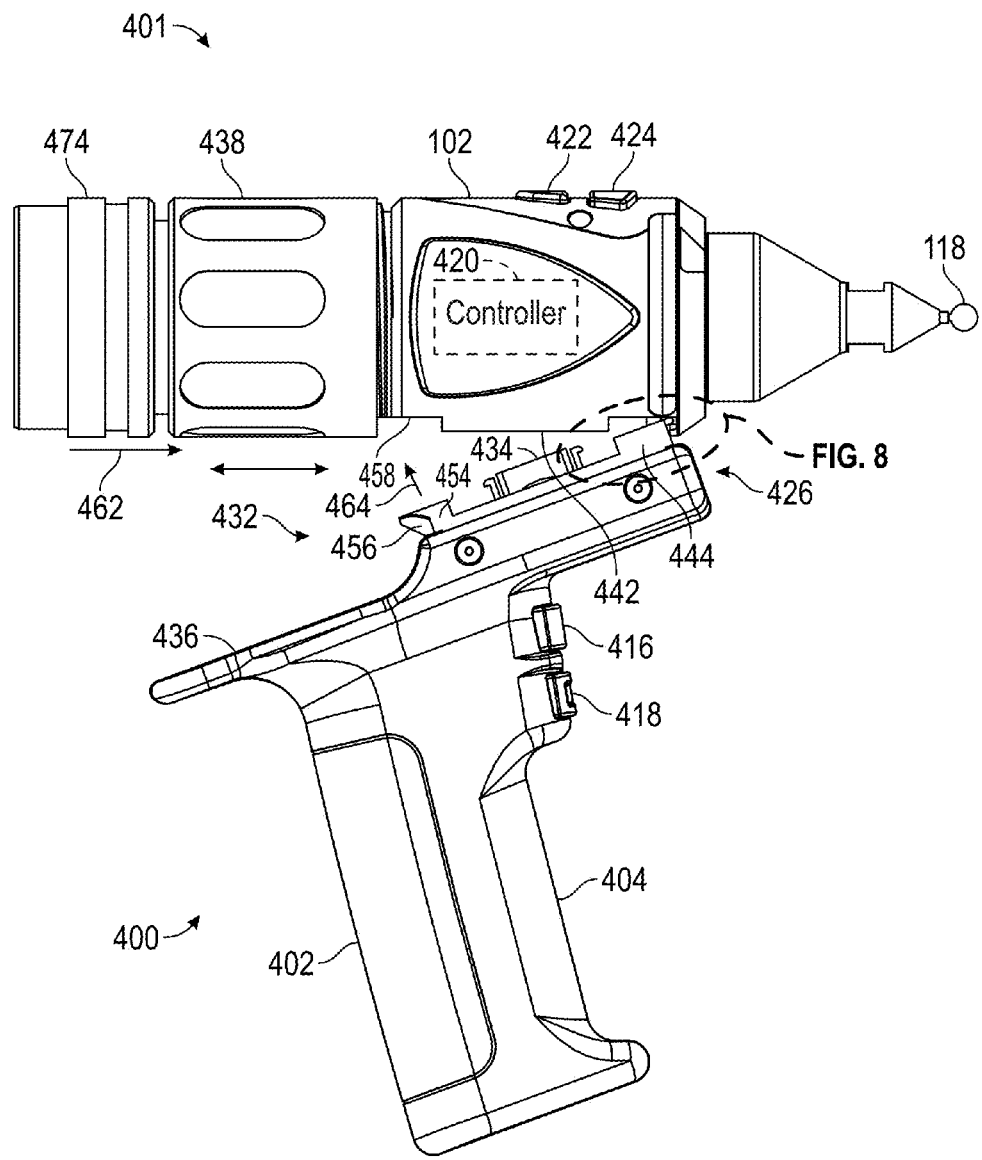
FIG. 5 is a side view of the probe end of FIG. 4 with the handle being coupled thereto.

Opposite the first projection 444, the mechanical coupler 432 may include a second projection 454. The second projection 454 may have a keyed, notched-lip or ramped interface surface 456 (FIG. 5). The second projection 454 is positioned to engage a fastener associated with the probe housing 102, such as collar 438 for example. As will be discussed in more detail below, the mechanical coupler 432 includes a raised surface projecting from surface 430 that adjacent to or disposed about the electrical connector 434 which provides a pivot point for the interface 426 (FIGS. 7 and 8). This serves as the third of three points of mechanical contact between the device 400 and the probe housing 102 when the device 400 is attached thereto.

The probe housing 102 includes a collar 438 arranged co-axially on one end. The collar 438 includes a threaded portion that is movable between a first position (FIG. 5) and a second position (FIG. 7). By rotating the collar 438, the collar 438 may be used to secure or remove the device 400 without the need for external tools. Rotation of the collar 438 moves the collar 438 along a relatively coarse, square-threaded cylinder 474. The use of such relatively large size, square-thread and contoured surfaces allows for significant clamping force with minimal rotational torque. The coarse pitch of the threads of the cylinder 474 further allows the collar 438 to be tightened or loosened with minimal rotation.

Figure 6:
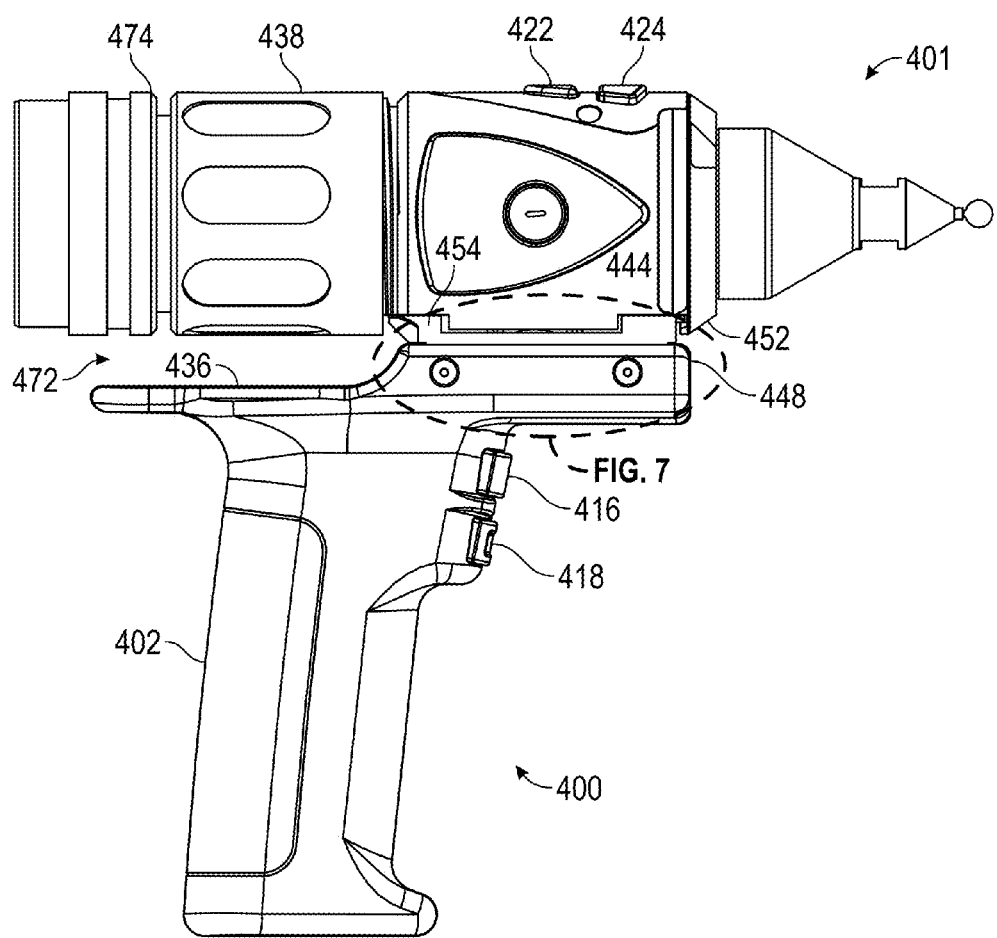
FIG. 6 is a side view of the probe end of FIG. 4 with the handle attached.

To couple the device 400 to the probe housing 102, the lip 446 is inserted into the slot 450 and the device is pivoted to rotate the second projection 454 toward surface 458 as indicated by arrow 464 (FIG. 5). The collar 438 is rotated causing the collar 438 to move or translate in the direction indicated by arrow 462 into engagement with surface 456. The movement of the collar 438 against the angled surface 456 drives the mechanical coupler 432 against the raised surface 460. This assists in overcoming potential issues with distortion of the interface or foreign objects on the surface of the interface that could interfere with the rigid seating of the device 400 to the probe housing 102. The application of force by the collar 438 on the second projection 454 causes the mechanical coupler 432 to move forward pressing the lip 446 into a seat on the probe housing 102. As the collar 438 continues to be tightened, the second projection 454 is pressed upward toward the probe housing 102 applying pressure on a pivot point. This provides a see-saw type arrangement, applying pressure to the second projection 454, the lip 446 and the center pivot point to reduce or eliminate shifting or rocking of the device 400. The pivot point presses directly against the bottom on the probe housing 102 while the lip 446 is applies a downward force on the end of probe housing 102. FIG. 5 includes arrows 462, 464 to show the direction of movement of the device 400 and the collar 438. FIG. 7 includes arrows 466, 468, 470 to show the direction of applied pressure within the interface 426 when the collar 438 is tightened. It should be appreciated that the offset distance of the surface 436 of device 400 provides a gap 472 between the collar 438 and the surface 436 (FIG. 6). The gap 472 allows the operator to obtain a firmer grip on the collar 438 while reducing the risk of pinching fingers as the collar 438 is rotated. In one embodiment, the probe housing 102 is of sufficient stiffness to reduce or prevent the distortion when the collar 438 is tightened.

Embodiments of the interface 426 allow for the proper alignment of the mechanical coupler 432 and electrical connector 434 and also protects the electronics interface from applied stresses that may otherwise arise due to the clamping action of the collar 438, the lip 446 and the surface 456. This provides advantages in reducing or eliminating stress damage to circuit board 476 mounted electrical connectors 434, 442 that may have soldered terminals. Also, embodiments provide advantages over known approaches in that no tools are required for a user to connect or disconnect the device 400 from the probe housing 102. This allows the operator to manually connect and disconnect the device 400 from the probe housing 102 with relative ease.

Due to the relatively large number of shielded electrical connections possible with the interface 426, a relatively large number of functions may be shared between the AACMM 100 and the device 400. For example, switches, buttons or other actuators located on the AACMM 100 may be used to control the device 400 or vice versa. Further, commands and data may be transmitted from electronic data processing system 210 to the device 400. In one embodiment, the device 400 is a video camera that transmits data of a recorded image to be stored in memory on the base processor 204 or displayed on the display 328. In another embodiment the device 400 is an image projector that receives data from the electronic data processing system 210. In addition, temperature sensors located in either the AACMM 100 or the device 400 may be shared by the other. It should be appreciated that embodiments of the present invention provide advantages in providing a flexible interface that allows a wide variety of accessory devices 400 to be quickly, easily and reliably coupled to the AACMM 100. Further, the capability of sharing functions between the AACMM 100 and the device 400 may allow a reduction in size, power consumption and complexity of the AACMM 100 by eliminating duplicity.

In one embodiment, the controller 408 may alter the operation or functionality of the probe end 401 of the AACMM 100. For example, the controller 408 may alter indicator lights on the probe housing 102 to either emit a different color light, a different intensity of light, or turn on/off at different times when the device 400 is attached versus when the probe housing 102 is used by itself. In one embodiment, the device 400 includes a range finding sensor (not shown) that measures the distance to an object. In this embodiment, the controller 408 may change indicator lights on the probe housing 102 in order to provide an indication to the operator how far away the object is from the probe tip 118. In another embodiment, the controller 408 may change the color of the indicator lights based on the quality of the image acquired by the coded structured light scanner device. This provides advantages in simplifying the requirements of controller 420 and allows for upgraded or increased functionality through the addition of accessory devices.

Referring to FIGS. 10-13, embodiments of the present invention provide advantages to projector, camera, signal processing, control and indicator interfaces for a non-contact three-dimensional measurement device 500. The device 500 includes a pair of optical devices, such as a light projector 508 and a camera 510, for example, that project a structured light pattern and receive a two-dimensional pattern that was reflected from an object 501. The device 500 uses triangulation-based methods based on the known emitted pattern and the acquired image to determine a point cloud representing the X, Y, Z coordinate data for the object 501 for each pixel of the received image. In an embodiment, the structured light pattern is coded so that a single image is sufficient to determine the three-dimensional coordinates of object points. Such a coded structured light pattern may also be said to measure three-dimensional coordinates in a single shot.

In the exemplary embodiment, the projector 508 uses a visible light source that illuminates a pattern generator. The visible light source may be a laser, a superluminescent diode, an incandescent light, a light emitting diode (LED), or other light emitting device. In the exemplary embodiment, the pattern generator is a chrome-on-glass slide having a structured light pattern etched thereon. The slide may have a single pattern or multiple patterns that move in and out of position as needed. The slide may be manually or automatically installed in the operating position. In other embodiments, the source pattern may be light reflected off or transmitted by a digital micro-mirror device (DMD) such as a digital light projector (DLP) manufactured by Texas Instruments Corporation, a liquid crystal device (LCD), a liquid crystal on silicon (LCOS) device, or a similar device used in transmission mode rather than reflection mode. The projector 508 may further include a lens system 515 that alters the outgoing light to have the desired focal characteristics.

The device 500 further includes an enclosure 502 with a handle portion 504. In one embodiment, the device 500 may further include an interface 426 on one end that mechanically and electrically couples the device 500 to the probe housing 102 as described herein above. In other embodiments, the device 500 may be integrated into the probe housing 102. The interface 426 provides advantages in allowing the device 500 to be coupled and removed from the AACMM 100 quickly and easily without requiring additional tools.

The camera 510 includes a photosensitive sensor which generates a digital image/representation of the area within the sensor's field of view. The sensor may be charged-coupled device (CCD) type sensor or a complementary metal-oxide-semiconductor (CMOS) type sensor for example having an array of pixels. The camera 510 may further include other components, such as but not limited to lens 503 and other optical devices for example. In the exemplary embodiment, the projector 508 and the camera 510 are arranged at an angle such that the sensor may receive light reflected from the surface of the object 501. In one embodiment, the projector 508 and camera 510 are positioned such that the device 500 may be operated with the probe tip 118 in place. Further, it should be appreciated that the device 500 is substantially fixed relative to the probe tip 118 and forces on the handle portion 504 may not influence the alignment of the device 500 relative to the probe tip 118. In one embodiment, the device 500 may have an additional actuator (not shown) that allows the operator to switch between acquiring data from the device 500 and the probe tip 118.

The projector 508 and camera 510 are electrically coupled to a controller 512 disposed within the enclosure 502. The controller 512 may include one or more microprocessors, digital signal processors, memory and signal conditioning circuits. Due to the digital signal processing and large data volume generated by the device 500, the controller 512 may be arranged within the handle portion 504. The controller 512 is electrically coupled to the arm buses 218 via electrical connector 434. The device 500 may further include actuators 514, 516 which may be manually activated by the operator to initiate operation and data capture by the device 500. In one embodiment, the image processing to determine the X, Y, Z coordinate data of the point cloud representing object 501 is performed by the controller 512 and the coordinate data is transmitted to the electronic data processing system 210 via bus 240. In another embodiment images are transmitted to the electronic data processing system 210 and the calculation of the coordinates is performed by the electronic data processing system 210.

In one embodiment, the controller 512 is configured to communicate with the electronic data processing system 210 to receive structured light pattern images from the electronic data processing system 210. In still another embodiment, the pattern emitted onto the object may be changed by the electronic data processing system 210 either automatically or in response to an input from the operator. This may provide advantages in obtaining higher accuracy measurements with less processing time by allowing the use of patterns that are simpler to decode when the conditions warrant, and use the more complex patterns where it is desired to achieve the desired level of accuracy or resolution.

In other embodiments of the present invention, the device 520 (FIG. 12) includes a pair of cameras 510. The cameras 510 are arranged on an angle relative to the projector 508 to receive reflected light from the object 501. The use of multiple cameras 510 may provide advantages in some applications by providing redundant images to increase the accuracy of the measurement. In still other embodiments, the redundant images may allow for sequential patterns to be quickly acquired by the device 500 by increasing the acquisition speed of images by alternately operating the cameras 510.

Figure 13A:
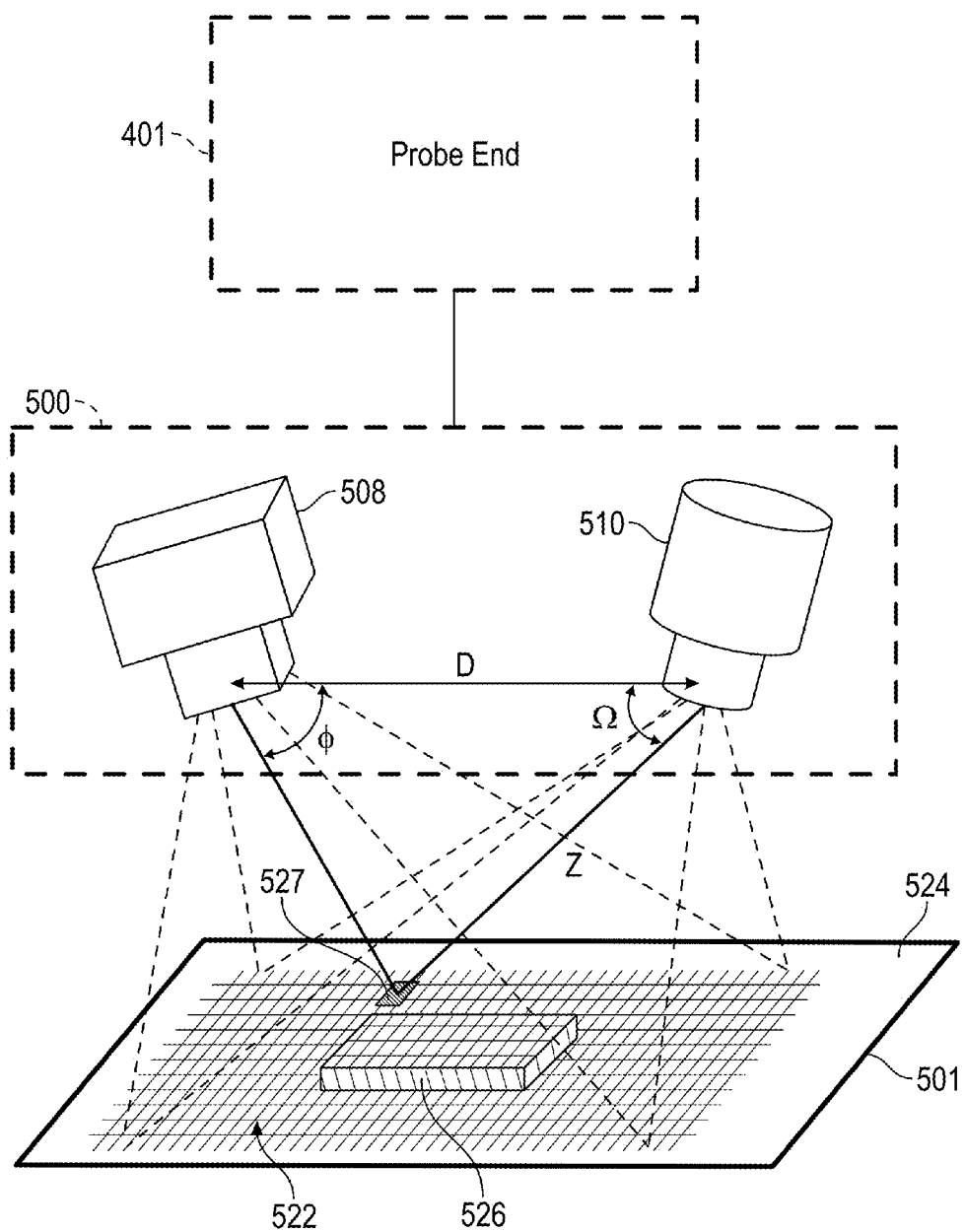
FIG. 13A and FIG. 13B are schematic views illustrating the operation of the device of FIG. 10 when attached to the probe end of the AACMM of FIG. 1.
Figure 13B:
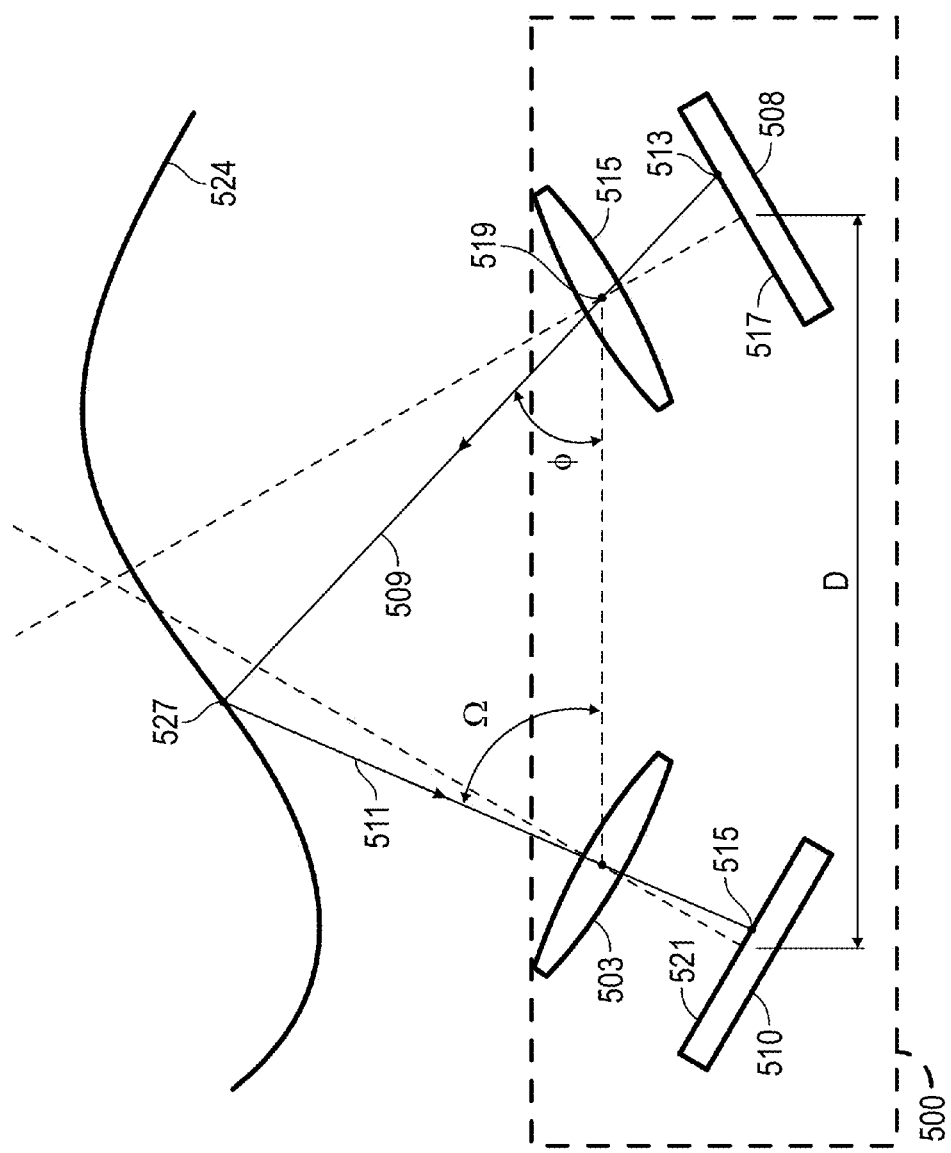
Figure 14A:
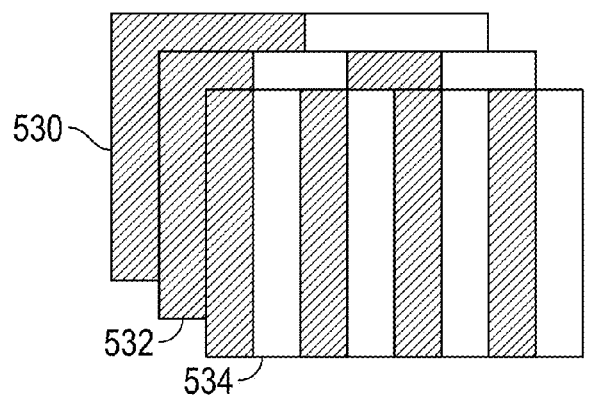
Figure 14B:
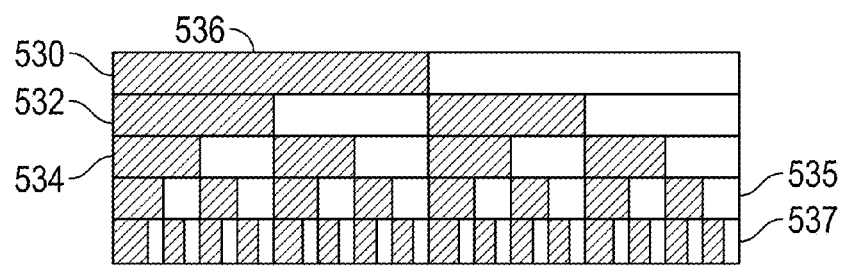
Figure 15:
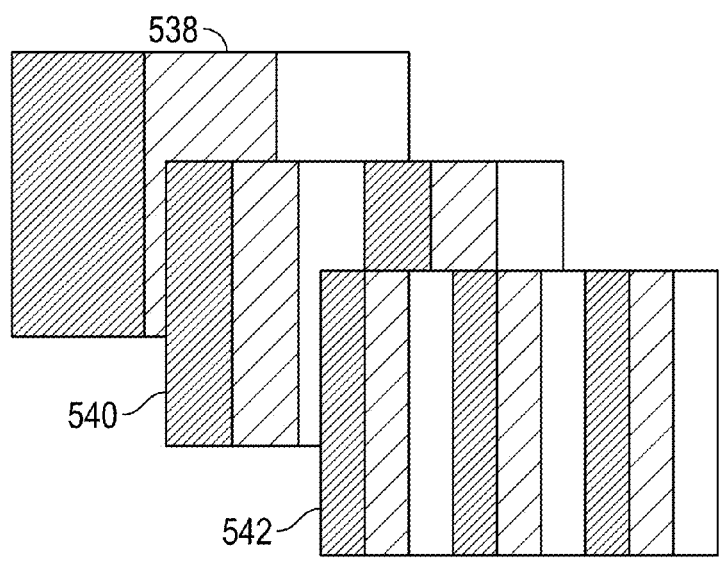

Referring now to FIG. 13A and FIG. 13B, the operation of the structured light device 500 will be described. The device 500 first emits a structured light pattern 522 with projector 508 onto surface 524 of the object 501. The structured light pattern 522 may include the patterns disclosed in the journal article "DLP-Based Structured Light 3D Imaging Technologies and Applications" by Jason Geng published in the Proceedings of SPIE, Vol. 7932, which is incorporated herein by reference. The structured light pattern 522 may further include, but is not limited to one of the patterns shown in FIGS. 14-32. The light 509 from projector 508 is reflected from the surface 524 and the reflected light 511 is received by the camera 510. It should be appreciated that variations in the surface 524, such as protrusion 526 for example, create distortions in the structured pattern when the image of the pattern is captured by the camera 510. Since the pattern is formed by structured light, it is possible in some instances for the controller 512 or the electronic data processing system 210 to determine a one to one correspondence between the pixels in the emitted pattern, such as pixel 513 for example, and the pixels in the imaged pattern, such as pixel 515 for example. This enables triangulation principals to be used to determine the coordinates of each pixel in the imaged pattern. The collection of three-dimensional coordinates of the surface 524 is sometimes referred to as a point cloud. By moving the device 500 over the surface 524, a point cloud may be created of the entire object 501. It should be appreciated that in some embodiments the coupling of the device 500 to the probe end provides advantages in that the position and orientation of the device 500 is known by the electronic data processing system 210, so that the location of the object 501 relative to the AACMM 100 may also be ascertained.

To determine the coordinates of the pixel, the angle of each projected ray of light 509 intersecting the object 522 in a point 527 is known to correspond to a projection angle phi (Φ), so that Φ information is encoded into the emitted pattern. In an embodiment, the system is configured to enable the Φ value corresponding to each pixel in the imaged pattern to be ascertained. Further, an angle omega (Ω) for each pixel in the camera is known, as is the baseline distance "D" between the projector 508 and the camera. Therefore, the distance "Z" from the camera 510 to the location that the pixel has imaged using the equation:

$$\frac{Z}{D} = \frac{\sin(\Phi)}{\sin(\Omega + \Phi)} \quad (1)$$

Thus three-dimensional coordinates may be calculated for each pixel in the acquired image.

In general, there are two categories of structured light, namely coded and uncoded structured light. A common form of uncoded structured light, such as that shown in FIGS. 14-17 and 28-30, relies on a striped pattern varying in a periodic manner along one dimension. These types of patterns are usually applied in a sequence to provide an approximate distance to the object. Some uncoded pattern embodiments, such as the sinusoidal patterns for example, may provide relatively highly accurate measurements. However, for these types of patterns to be effective, it is usually necessary for the scanner device and the object to be held stationary relative to each other. Where the scanner device or the object are in motion (relative to the other), then a coded pattern, such as that shown in FIGS. 18-27 may be preferable. A coded pattern allows the image to be analyzed using a single acquired image. Some coded patterns may be placed in a particular orientation on the projector pattern (for example, perpendicular to epipolar lines on the projector plane), thereby simplifying analysis of the three-dimensional surface coordinates based on a single image.

Epipolar lines are mathematical lines formed by the intersection of epipolar planes and the source plane 517 or the image plane 521 (the plane of the camera sensor) in FIG. 13B. An epipolar plane may be any plane that passes through the projector perspective center 519 and the camera perspective center. The epipolar lines on the source plane 517 and the image plane 521 may be parallel in some cases, but in general are not parallel. An aspect of epipolar lines is that a given epipolar line on the projector plane 517 has a corresponding epipolar line on the image plane 521. Therefore, any particular pattern known on an epipolar line in the projector plane 517 may be immediately observed and evaluated in the image plane 521. For example, if a coded pattern is placed along an epipolar line in the projector plane 517, the spacing between the coded elements in the image plane 521 may be determined using the values read out of the pixels of the camera sensor 510. This information may be used to determine the three-dimensional coordinates of a point 527 on the object 501. It is further possible to tilt coded patterns at a known angle with respect to an epipolar line and efficiently extract object surface coordinates. Examples of coded patterns are shown in FIGS. 20-29.

In embodiments having a periodic pattern, such as a sinusoidally repeating pattern, the sinusoidal period represents a plurality of pattern elements. Since there is a multiplicity of periodic patterns in two-dimensions, the pattern elements are non-collinear. In some cases, a striped pattern having stripes of varying width may represent a coded pattern.

Referring now to FIGS. 14-17, embodiments of uncoded structured light patterns are shown. Some of the patterns use simple on-off (or 1, 0) type pattern and are referred to as binary patterns. In some cases, the binary pattern is one known to have a particular sequence referred to as a gray code sequence. The term gray code as used in the field of three-dimensional metrology based on structured light is somewhat different than the term as used in the field of electrical engineering, where the term Gray code commonly means the sequential changing of a single bit at a time. The present application follows the use of the term gray code as is customary for the field of three-dimensional metrology where the gray code typically represents a sequence of binary black and white values. FIG. 14A shows an example of a binary pattern that includes a plurality of sequential images 530, 532, 534, each having a different stripped pattern thereon. Usually, the stripes alternate between bright (illuminated) and dark (non-illuminated) striped regions. Sometimes, the terms white and black are used to mean illuminated and non-illuminated, respectively. Thus, when the images 530, 532, 534 are projected sequentially onto the surface 524 as shown in FIG. 14B which shows a composite image 536. It should be noted that the bottom two patterns 535, 537 of FIG. 14B are not illustrated in FIG. 14A for clarity. For each point on the object 501 (represented by a camera pixel in the image) the composite pattern 536 has a unique binary value obtained through the sequential projection of patterns 530, 532, 534, 535, 537, which correspond to a relatively small range of possible projection angles Φ. By using these projection angles, together with the known pixel angle Ω for a given pixel and the known baseline distance D, Eq. (1) may be used to find the distance Z from the camera to the object point. A two-dimensional angle is known for each camera pixel. The two-dimensional angle corresponds generally to the one-dimensional angle Omega, which is used in the calculation of the distance Z according to Eq. (1). However, a line drawn from each camera pixel through the camera perspective center and intersecting the object in a point defines a two-dimensional angle in space. When combined with the calculated value Z, the two pixel angles provide three-dimensional coordinates corresponding to a point on the object surface.

Similarly, rather than a binary pattern, a sequential series of grey patterns having stripes with varying grey-scale values may be used. When used in this context, the term grey-scale usually refers to an amount of irradiance at a point on the object from white (maximum light), to various levels of gray (less light), to black (minimum light). This same nomenclature is used even if the light being projected has a color such as red, and the gray-scale values correspond to levels of red illumination. In an embodiment, the pattern (FIG. 15) has a plurality of images 538, 540, 542 with stripes having varying light power levels, such as black, grey and white for example, used to produce an emitted pattern on the object 501. The grey scale values may be used to determine the possible projection angles Φ to within a relatively small range of possible values. As discussed hereinabove, Eq. (1) may then be used to determine the distance Z.

In another embodiment, the distance Z to an object point may be found by measuring a phase shift observed in a plurality of images. For example, in an embodiment shown in FIG. 16, the gray-scale intensities 546, 548, 550 of a projector pattern 552 vary in a sinusoidal manner, but with the phase shifted between projected patterns. For example, in the first projector pattern, the sinusoid gray-scale intensity 546 (representing optical power per unit area) may have a phase of zero degrees at a particular point. In the second projector pattern, the sinusoid intensity 548 has a phase of 120 degrees at the same point. In the third projector pattern, the sinusoid intensity 550 may have a phase of 240 degrees at the same point. This is the same thing as saying that the sinusoidal pattern is shifted to the left (or right) by one-third of a period in each step. A phase shift method is used to determine a phase of the projected light at each camera pixel, which eliminates the need to consider information from adjacent pixels as in the coded-pattern single shot case. Many methods may be used to determine the phase of a camera pixel. One method involves performing a multiply and accumulate procedure and then taking an arctangent of a quotient. This method is well known to those of ordinary skill in the art and is not discussed further. In addition, with the phase shift method, the background light cancels out in the calculation of phase. For these reasons, the value Z calculated for a give pixel is usually more accurate than the value Z calculated using a coded-pattern single shot method. However, with a single collection of sinusoidal patterns such as those shown in FIG. 16, all of the calculated phases vary from 0 to 360 degrees. For a particular structured-light triangulation system, these calculated phases may be adequate if "thickness" of the object under test does not vary by too much because the angle for each projected stripe is known ahead of time. However, if the object is too thick, an ambiguity may arise between in the phase calculated for a particular pixel since that pixel may have been obtained from first projected ray of light striking the object at a first position or a second projected ray of light striking the object at a second position. In other words, if there is a possibility that the phase may vary by more than a radians for any pixel in the camera array, then the phases may not be properly decoded and the desired one to one correspondence not achieved.

FIG. 17A shows a sequence 1-4 of projected gray-code intensities 554 according to a method by which the ambiguity may be eliminated in the distance Z based on a calculated phase. A collection of gray code patterns is projected sequentially onto the object. In the example shown, there are four sequential patterns indicated by 1, 2, 3, 4 to the left side of 554 in FIG. 17A. The sequential pattern 1 has dark (black) on the left half of the pattern (elements 0-15) and bright (white) on the right half of the pattern (elements 16-31). The sequential pattern 2 has a dark band toward the center (elements 8-23) and bright bands toward the edges (elements 2-7, 24-31). The sequential pattern 3 has two separated bright bands near the center (elements 4-11, 20-27) and three bright bands (elements 0-3, 12-19, 28-31). The sequential pattern 4 has four separated dark bands (elements 2-5, 10-13, 18-21, 26-29) and five separated bright bands (elements 0-1, 6-9, 14-17, 22-25, 30-31). For any given pixel in the camera, this sequence of patterns enables the "object thickness region" of the object to be improved by a factor of 16 compared to an initial object thickness region corresponding to all the elements 0 to 31.

Figure 16:
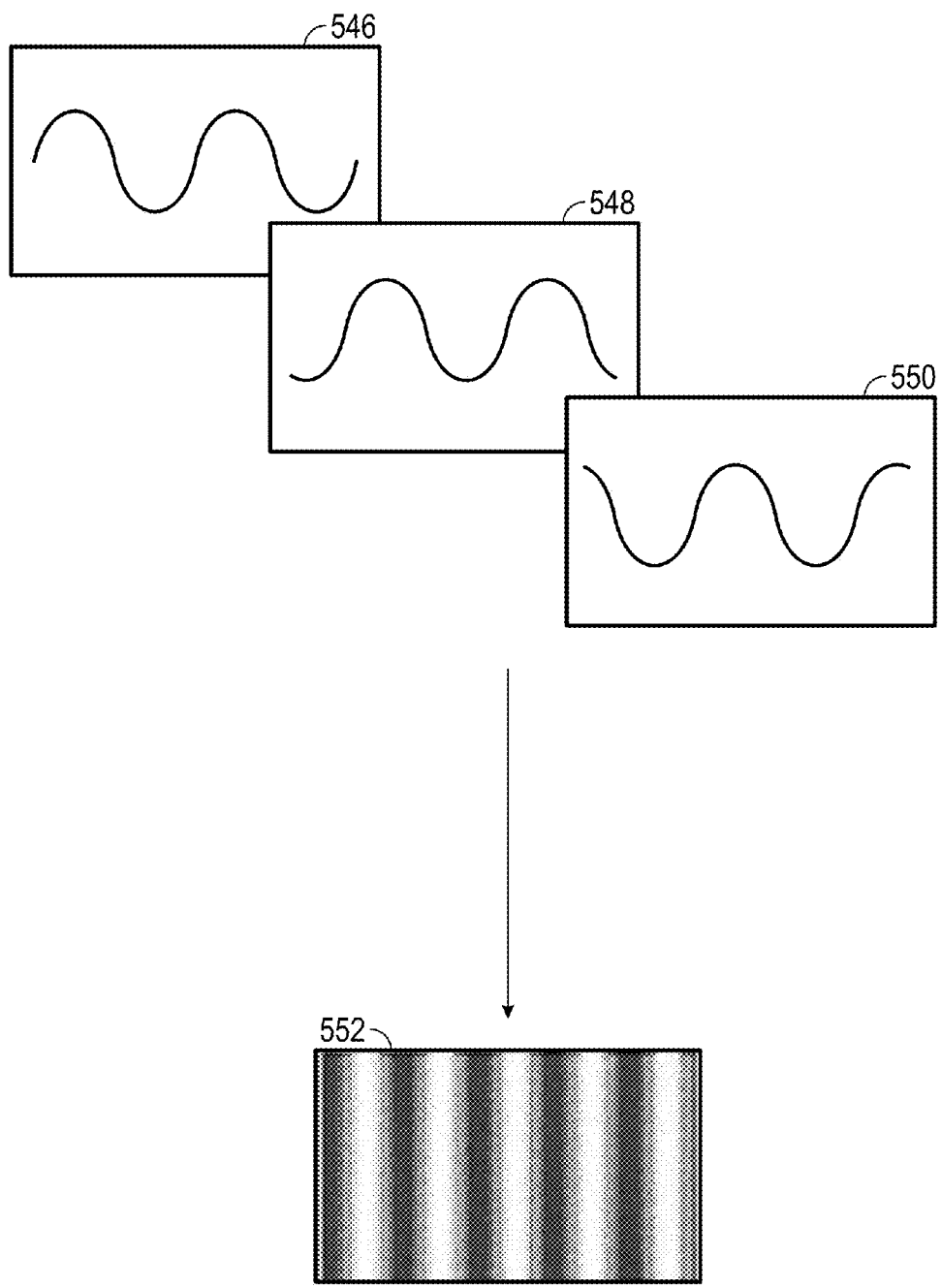

In another method 556 illustrated in FIG. 17C, a phase shift method, similar to the method of FIG. 16, is performed. In the embodiment shown in FIG. 17C, a pattern 556A four sinusoidal periods are projected onto an object. For reasons discussed hereinabove, there may be an ambiguity in a distance Z to an object using the pattern of FIG. 17C. One way to reduce or eliminate the ambiguity is to project one or more additional sinusoidal patterns 556B, 556C, each pattern having a different fringe period (pitch). So, for example, in FIG. 17B, a second sinusoidal pattern 555 having three fringe periods rather than four fringe periods is projected onto an object. In an embodiment, the difference in the phases for the two patterns 555, 556 may be used to help eliminate an ambiguity in the distance Z to the target.

Another method for eliminating ambiguity is to use a different type of method, such as the gray code method of FIG. 17A for example, to eliminate the ambiguity in the distances Z calculated using the sinusoidal phase shift method.

Figure 18:
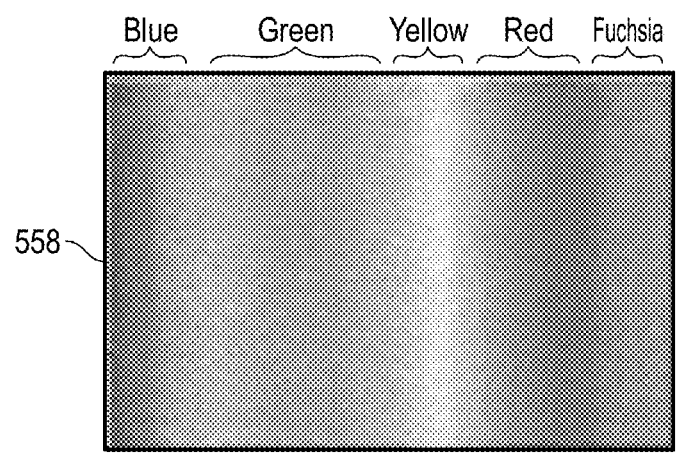
FIGS. 18-19 are spatially varying color coded patterns that may be emitted by the structured light device of FIG. 10 or FIG. 12, in accordance with an embodiment of the invention.
Figure 19:
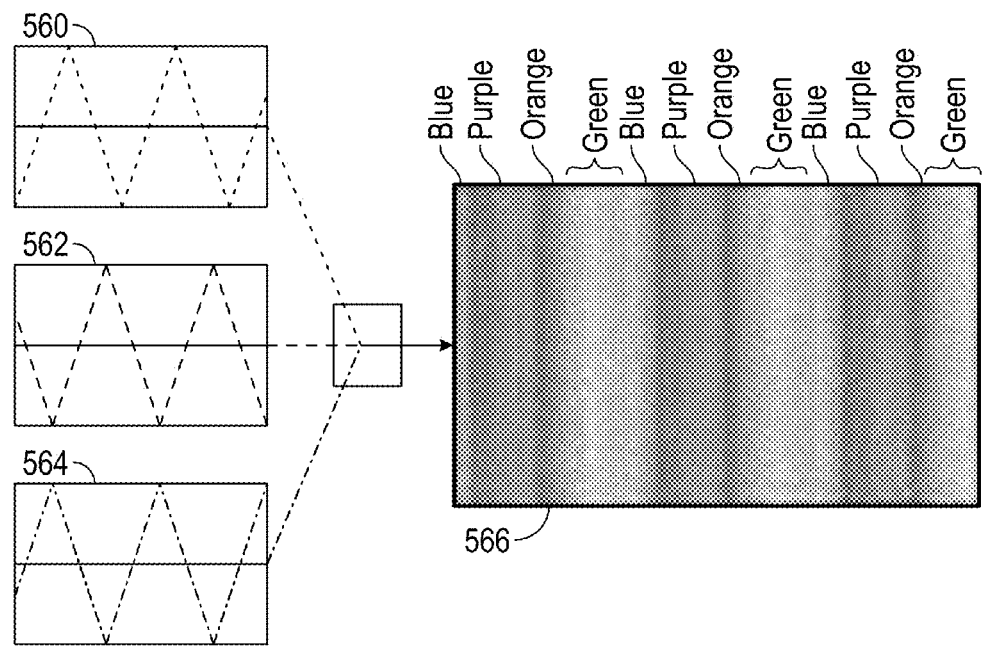

In applications where the object and device 500 are in relative motion, it may be desirable to use a single pattern that allows the camera 510 to capture an image that provides sufficient information to measure the three dimensional characteristics of the object 501 without having to project sequential images. Referring now to FIG. 18 and FIG. 19, patterns 558, 566 have a distribution of colors that may in some cases enable measurement of the object to be based on a single (coded) image. In the embodiment of FIG. 18, the pattern 558 uses lines having a continuously spatially varying wavelength of light to create a pattern where the color changes continuously from blue to green to yellow to red to fuchsia for example. Thus for each particular spectral wavelength, a one-to-one correspondence may be made between the emitted image and the imaged pattern. With the correspondence established, the three-dimensional coordinates of the object 501 may be determined from a single imaged pattern. In one embodiment, the stripes of the pattern 558 are oriented perpendicular to the epipolar lines on the projector plane. Since the epipolar lines on the projector plane map into epipolar lines on the camera image plane, it is possible to obtain an association between projector points and camera points by moving along the direction of epipolar lines in the camera image plane and noting the color of the line in each case. It should be appreciated that each pixel in the camera image plane corresponds to a two-dimensional angle. The color enables determination of the one-to-one correspondence between particular projection angles and particular camera angles. This correspondence information, combined with the distance between the camera and the projector (the baseline distance D) and the angles of the camera and projector relative to the baseline, is sufficient to enable determination of the distance Z from the camera to the object.

Another embodiment using color patterns is shown in FIG. 19. In this embodiment, a plurality of colored patterns having varying intensities 560, 562, 564 are combined to create a color pattern 566. In one embodiment, the plurality of colored patterns intensities 560, 562, 564 are primary colors, such that pattern 560 varies the intensity of the color red, pattern 562 varies the intensity of the color green and pattern 564 varies the intensity of the color blue. Since the ratios of colors are known, the resulting emitted image has a known relationship that may be decoded in the imaged pattern. As with the embodiment of FIG. 18, once the correspondence established, the three-dimensional coordinates of the object 501 may be determined. Unlike the pattern of FIG. 18, in which a single cycle of unique colors is projected, the pattern of FIG. 19 projects three complete cycles of nearly identical colors. With the pattern of FIG. 18, there is little possibility of ambiguity in the measured distance Z (at least for the case in which the projected lines are perpendicular to epipolar lines) since each camera pixel recognizes a particular color that corresponds uniquely to a particular projection direction. Since the camera angle and projection angles are known, triangulation may be used to determine the three-dimensional object coordinates at each pixel position using only a single camera image. Hence the method of FIG. 18 may be considered to be a coded, single-shot method. In contrast, in FIG. 19, there is a chance of ambiguity in the distance Z to an object point. For example, if the camera sees a color purple, the projector may have projected any of three different angles. Based on the triangulation geometry, three different distances Z are possible. If the thickness of the object is known ahead of time to be within a relatively small range of values, then it may be possible to eliminate two of the values, thereby obtaining three-dimensional coordinates in a single shot. In the general case, however, it would be necessary to use additional projected patterns to eliminate the ambiguity. For example, the spatial period of the colored pattern may be changed, and then used to illuminate the object a second time. In this instance, this method of projected structured light is considered to be a sequential method rather than a coded, single-shot method.

Figure 20:
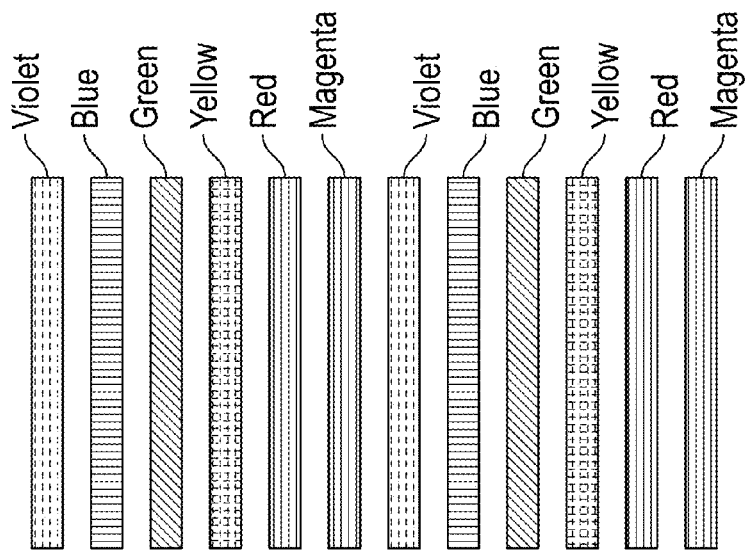
FIGS. 20-23 are strip index coded patterns that may be emitted by the structured light device of FIG. 10 or FIG. 12, in accordance with an embodiment of the invention.
Figure 21:
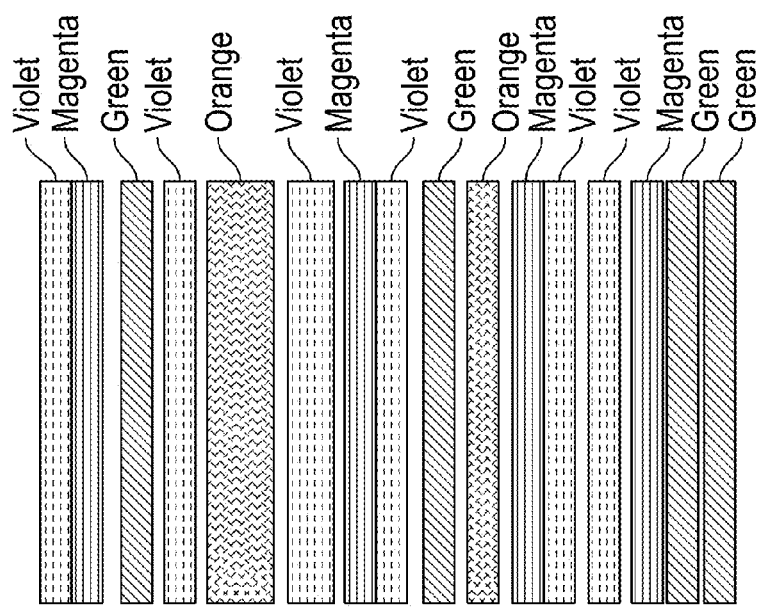

Referring now to FIGS. 20-23, coded structured light patterns for a single image acquisition are shown based on a stripe indexing technique. In the embodiments of FIG. 20 and FIG. 21, patterns having color stripes 568, 570 are emitted by the projector 508. This technique utilizes a characteristic of image sensors wherein the sensor has three independent color channels, such as red, green, blue or cyan, yellow, magenta for example. The combinations of the values generated by these sensor channels may produce a large number of colored patterns. As with the embodiment of FIG. 19, the ratio of the color distribution is known, therefore the relationship between the emitted pattern and the imaged pattern may be determined and the three-dimensional coordinates calculated. Still other types of colored patterns may be used, such as a pattern based on the De Bruijn sequence. The stripe indexing techniques and the De Bruijn sequence are well known to those of ordinary skill in the art and so are not discussed further.

Figure 22:
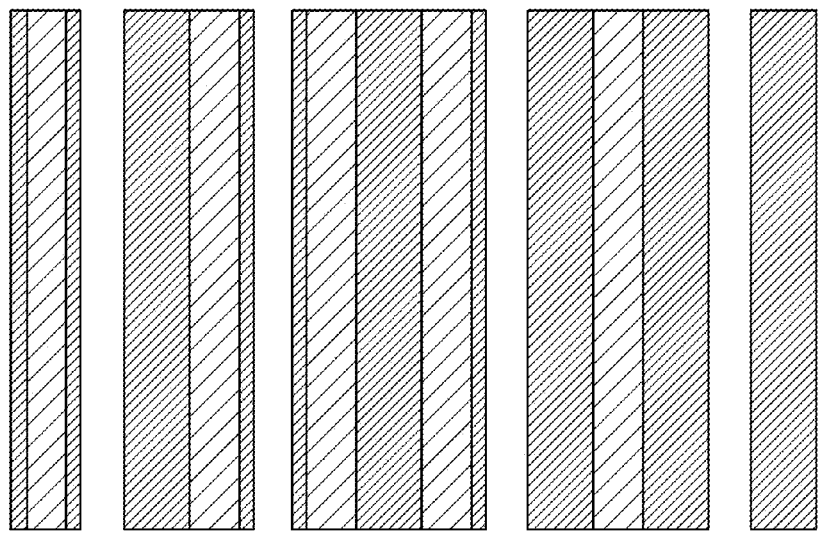
Figure 23:
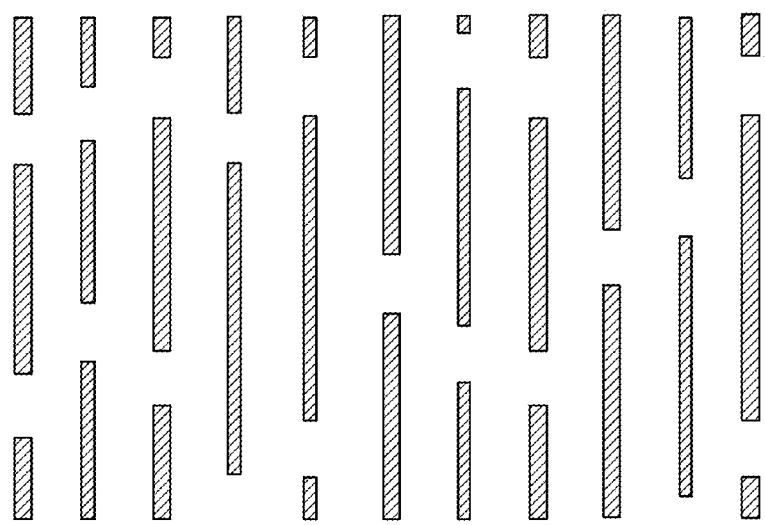

In the embodiments of FIG. 22 and FIG. 23, a non-color stripe indexing technique is used. In the embodiment of FIG. 22, the pattern 572 provides groups of stripes having multiple intensity (gray-scale) levels and different widths. As a result, a particular group of stripes within the overall image has a unique gray-scale pattern. Due to the uniqueness of the groups, a one-to-one correspondence may be determined between the emitted pattern and the imaged pattern to calculate the coordinates of the object 501. In the embodiment of FIG. 23, the pattern 574 provides a series of stripes having a segmented pattern. Since each line has unique segment design, the correspondence may be determined between the emitted pattern and the imaged pattern to calculate the coordinates of the object 501. In FIGS. 20-23, additional advantages may be gained by orienting the projected lines 572, 574 perpendicular to epipolar lines so that in the camera plane since this simplifies determination of a second dimension in finding the one-to-one correspondence between camera and projector patterns.

Figure 24:
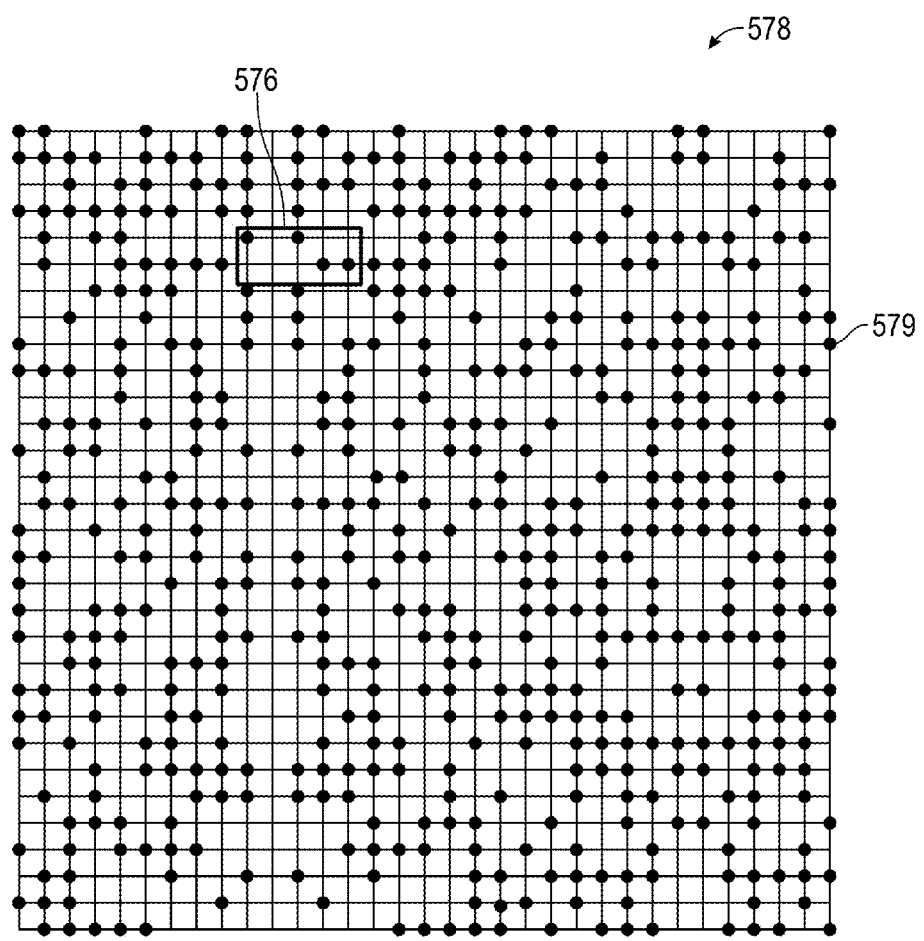
FIGS. 24-31 are two-dimensional grid patterns that may be emitted by the structured light device of FIG. 10 or FIG. 12, in accordance with an embodiment of the invention.
Figure 25A:
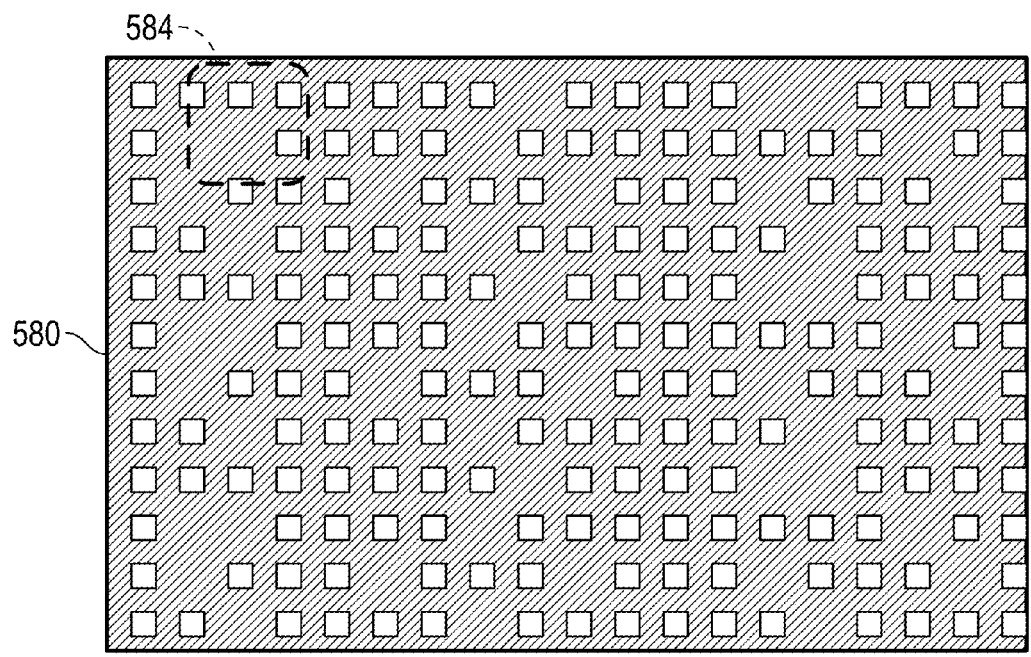
Figure 25B:
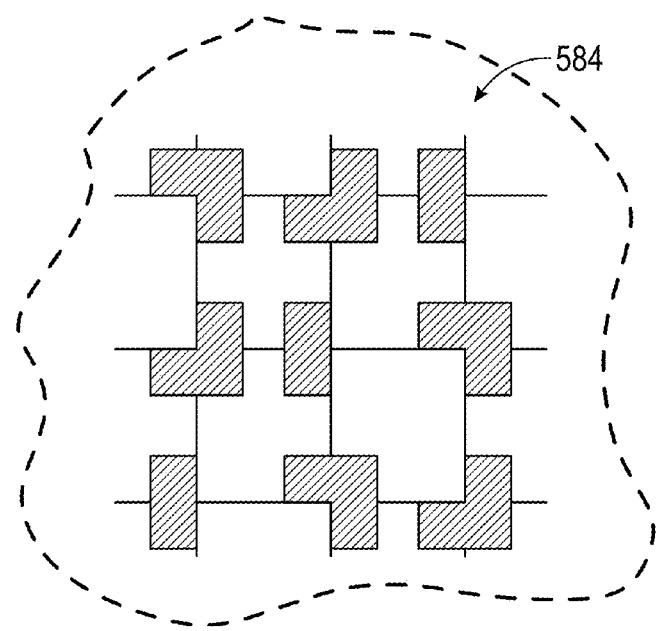
Figure 26:
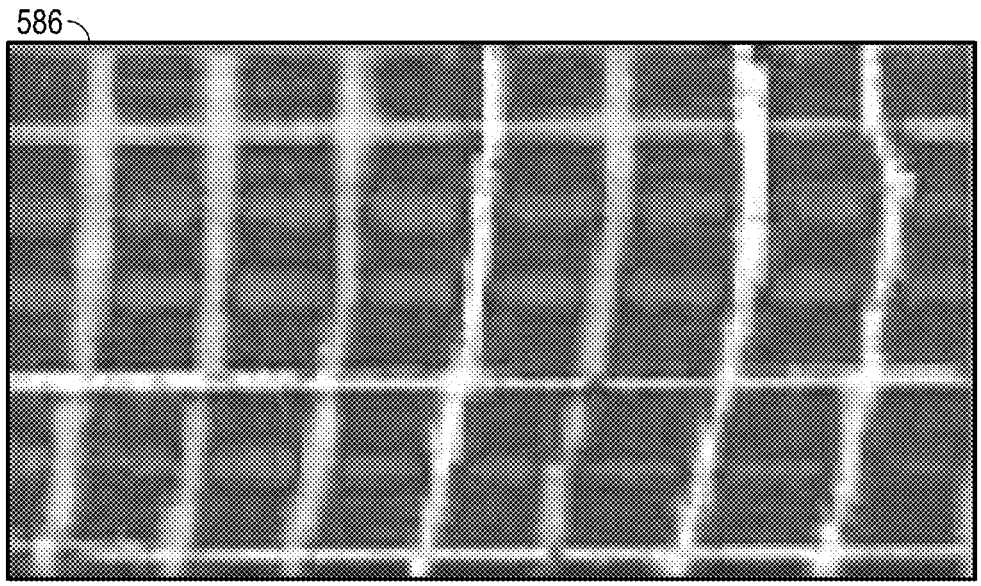
Figure 27:
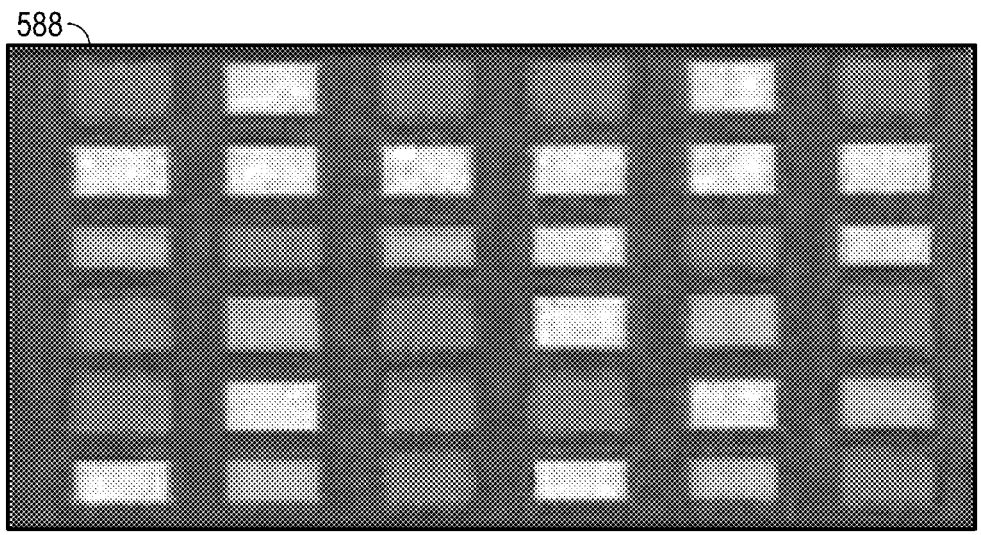

Referring now to FIGS. 24-27, coded structured light patterns are shown that use a two-dimensional spatial grid pattern technique. These types of patterns are arranged such that a sub window, such as window 576 on pattern 578 for example, is unique relative to other sub windows within the pattern. In the embodiment of FIG. 24, a pseudo random binary array pattern 578 is used. The pattern 578 uses a grid with elements, such as circles 579 for example, that form the coded pattern. It should be appreciated that elements having other geometric shapes may also be used, such as but not limited to squares, rectangles, and triangles for example. In the embodiment of FIG. 25, a pattern 580 is shown of a multi-valued pseudo random array wherein each of the numerical values has an assigned shape 582. These shapes 582 form a unique sub-window 584 that allows for correspondence between the emitted pattern and the imaged pattern to calculate the coordinates of the object 501. In the embodiment of FIG. 26, the grid 586 is color coded with stripes perpendicular to the projector plane. The pattern of FIG. 26 will not necessarily provide a pattern that can be decoded in a single shot, but the color information may help to simplify the analysis. In the embodiment of FIG. 27, an array 588 of colored shapes, such as squares or circles, for example, are used to form the pattern.

Figure 28A:
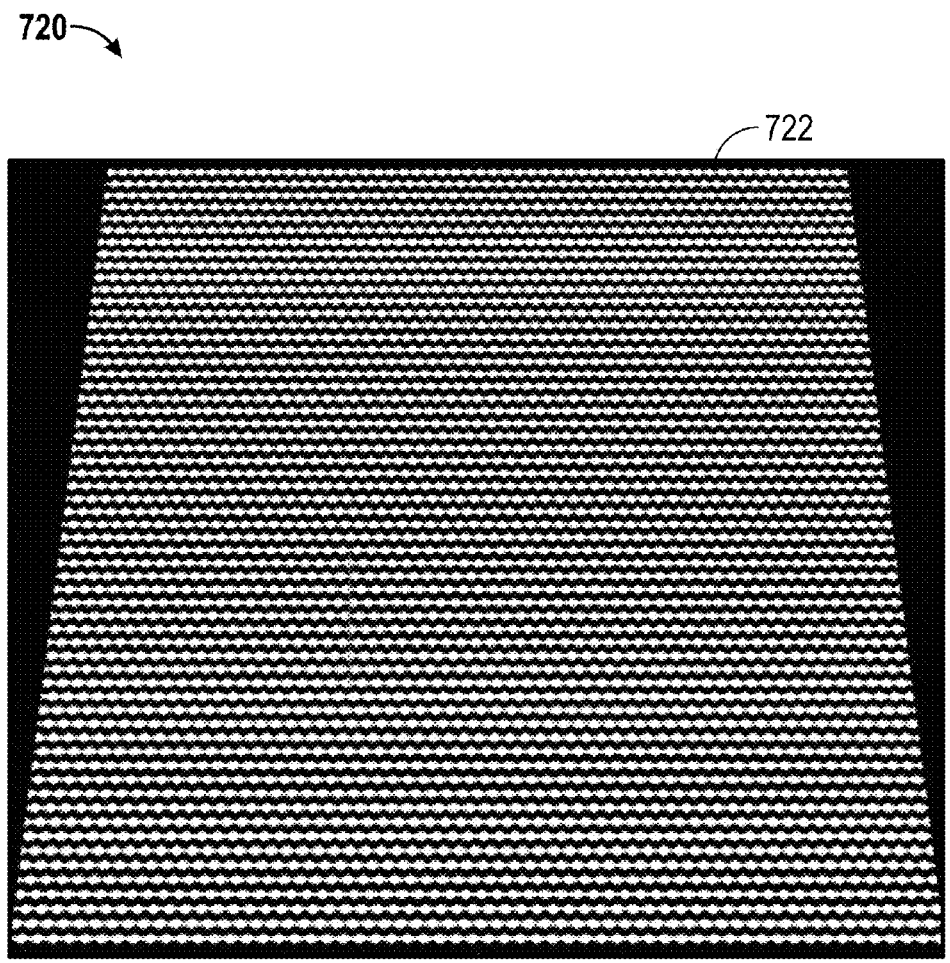
Figure 28B:
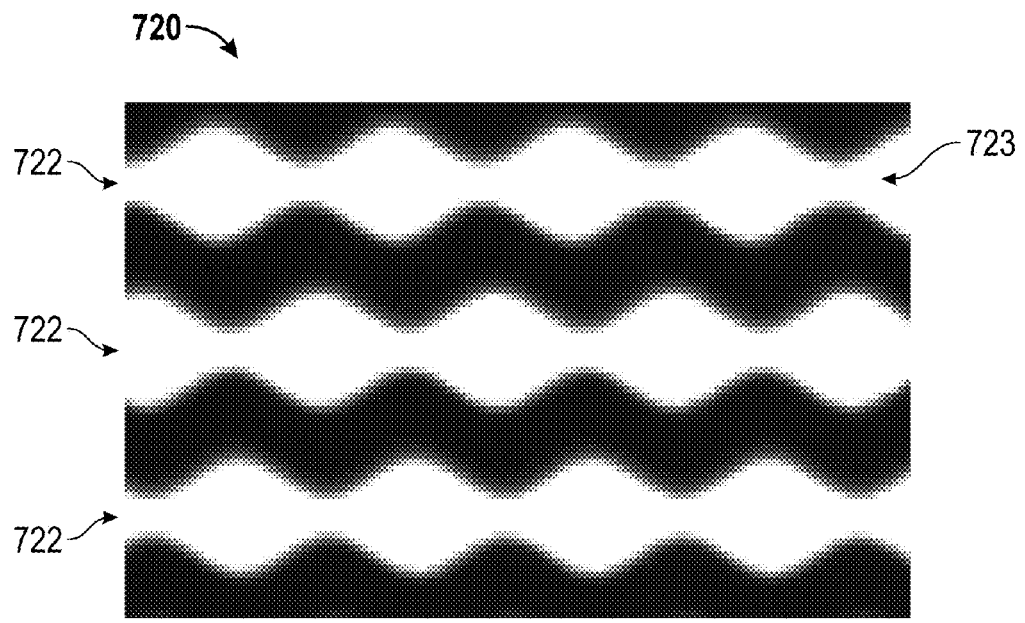

Referring now to FIGS. 28A-28B, an exemplary sinusoidal pattern 720 is shown. In an embodiment, the lines 734 are perpendicular to epipolar lines on the projector plane. The sinusoidal pattern 720 is made up of thirty lines 722 which are repeated once to give a total number of lines 722 of sixty. Each line 722 has a sinusoidal feature 723 that is approximately 180 degrees out of phase with the line above and the line below. This is to allow the lines 722 to be as close as possible and also allows a greater depth of field because the lines can blur on the projected surface or acquired image and still be recognized. Each single line 722 can be uniquely decoded using just the phase of that line where the line length must be at least one wavelength of the sinusoid.

Since the pattern 720 is repeated, it would generally cause ambiguities in the line identification. However, this is problem is resolved in this system through the geometry of the camera's field of view and depth of field. For a single view of the camera, i.e. a row of pixels, within the depth of field in which the lines can be optically resolved, no two lines with the same phase can be imaged. For example, the first row of pixels on the camera can only receive reflected light from lines 1-30 of the pattern. Whereas further down the camera sensor, another row will only receive reflected light from lines 2-31 of the pattern, and so on. In FIG. 28B an enlarged portion of the pattern 720 is shown of three lines where the phase between consecutive lines 722 is approximately 180 degrees. It also shows how the phase of each single line is enough to uniquely decode the lines.

Figure 29A:
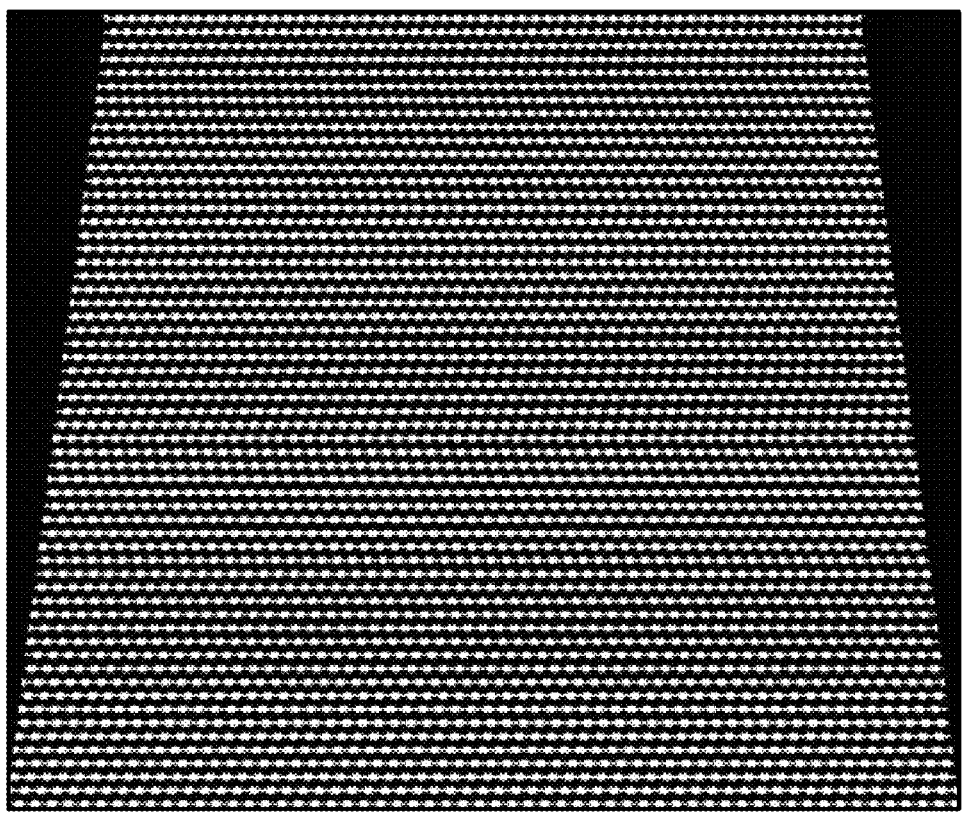
Figure 29B:
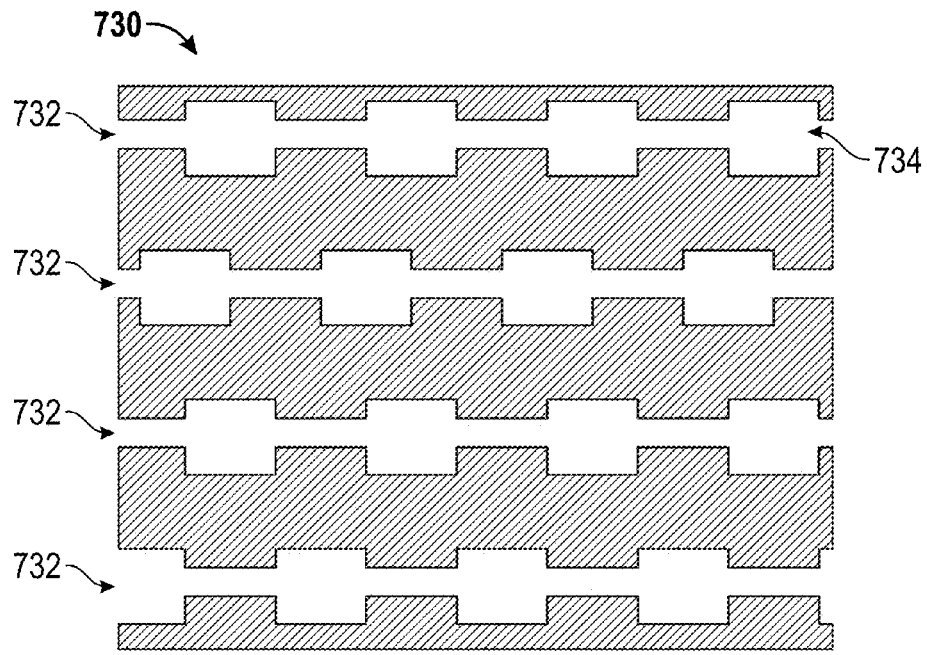

Referring now to FIGS. 29A-29B, another pattern 730 is shown having square pattern elements. In an embodiment, the lines 732 are perpendicular to epipolar lines on the projector plane. The square pattern 730 contains twenty-seven lines 732 before the pattern 730 is repeated and has a total number of lines of 59. The code elements 734 of pattern 730 are distinguished by the phase of the square wave from left to right in FIG. 29B. The pattern 730 is encoded such that a group of sequential lines 732 are distinguished by the relative phases of its members. Within the image, sequential lines are found by scanning vertically for the lines. In an embodiment, scanning vertically means scanning along epipolar lines in the camera image plane. Sequential lines within a camera vertical pixel column are paired together and their relative phases are determined. Four sequential paired lines are required to decode the group of lines and locate them within the pattern 730. There is also an ambiguity in this pattern 730 due to the repeat but this is also solved in the same manner as discussed above with respect to sinusoidal pattern 720. FIG. 29B shows an enlarged view of four lines 732 of the square pattern. This embodiment shows that the phase of a single line 732 alone is not able to uniquely decode a line because the first and third lines have the same absolute phase.

This approach to code the relative phases versus the absolute phases provides advantages in that there is a higher tolerance for the positions of the phases. Minor errors in the construction of the projector that may cause the phases of the lines to shift throughout the depth of field of the camera, as well as errors due to the projector and camera lenses make an absolute phase much more difficult to determine. This can be overcome in the absolute phase method by increasing the period such that it is sufficiently large enough to overcome the error in determining the phase.

It should be appreciated that for the case of a two-dimensional pattern that projects a coded pattern of light, the three non-collinear pattern elements are recognizable because of their codes, and since they are projected in two dimensions, the at least three pattern elements are non-collinear. For the case of the periodic pattern, such as the sinusoidally repeating pattern, each sinusoidal period represents a plurality of pattern elements. Since there is a multiplicity of periodic patterns in two dimensions, the pattern elements are non-collinear. In contrast, for the case of the laser line scanner that emits a line of light, all of the pattern elements lie on a straight line. Although the line has width and the tail of the line cross section may have less optical power than the peak of the signal, these aspects of the line are not evaluated separately in finding surface coordinates of an object and therefore do not represent separate pattern elements. Although the line may contain multiple pattern elements, these pattern elements are collinear.

Figure 30:
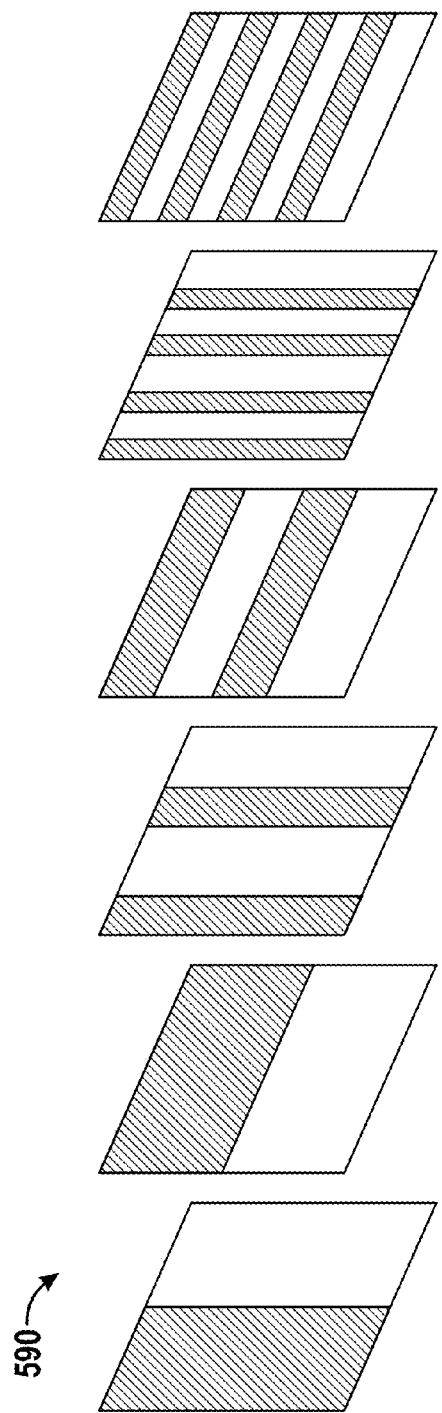
Figure 31:
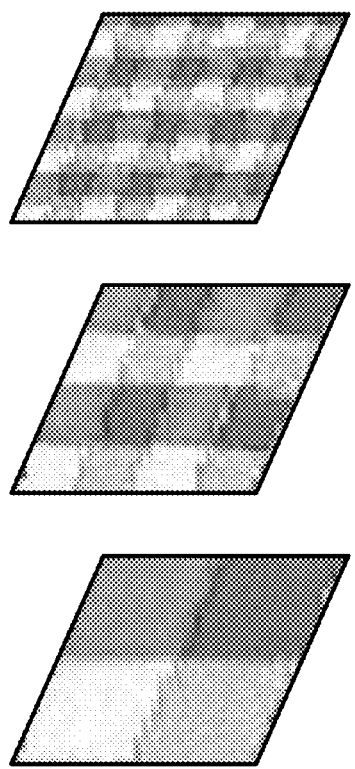
Figure 32:
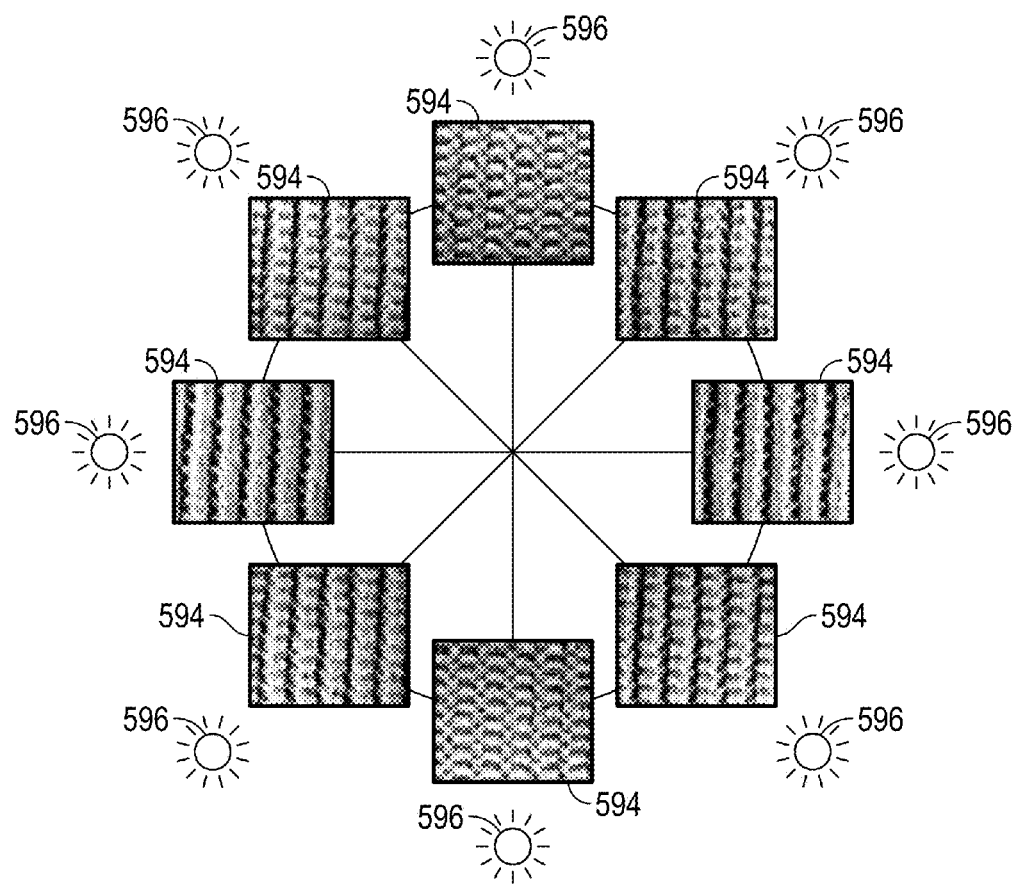
FIG. 32 is a schematic illustration of a photometric technique for acquiring patterns of structured light under a plurality of lighting conditions.

Further, the various pattern techniques may be combined as shown in FIGS. 30-31 to form either a binary (FIG. 30) checkerboard uncoded pattern 590 or a colored (FIG. 31) checkerboard uncoded pattern 592. In still another embodiment shown in FIG. 32, a photometric stereo technique may be used where a plurality of images 594 are taken on the object 501 where the light source 596 is moved to a plurality of locations.

Figure 33:
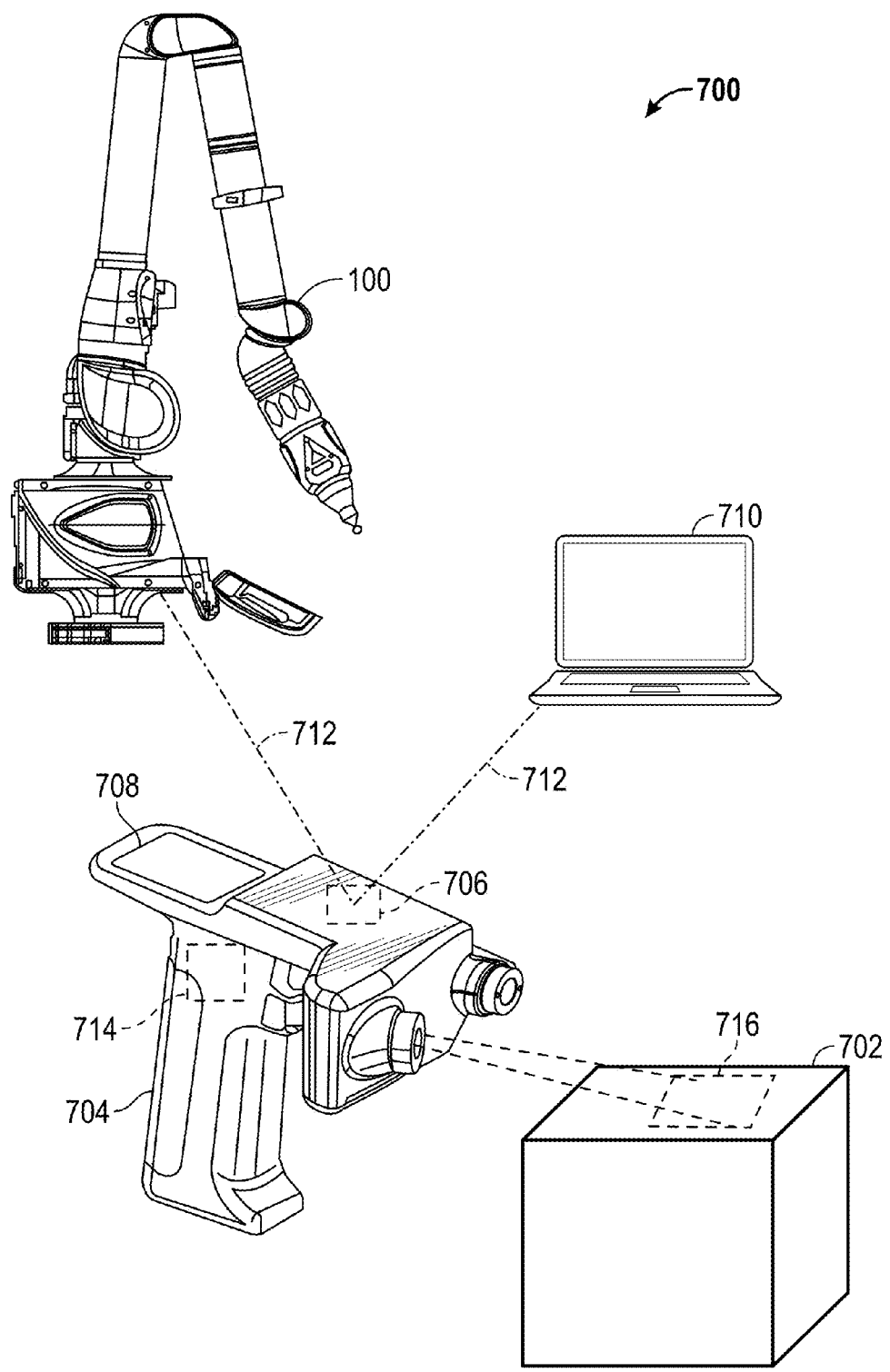
FIG. 33 is an illustration of a structured light scanner device independently operable from an AACMM in accordance with another embodiment of the invention.

Referring now to FIG. 33, another embodiment is shown of a system 700 for acquiring three-dimensional coordinates of an object 702. In this embodiment, the device 704 is independently operable when detached from the AACMM 100. The device 704 includes a controller 706 and an optional display 708. The display 708 may be integrated in the housing of the device 704 or may be a separate component that is coupled to the device 704 when it is used independently from the AACMM 100. In embodiments where the display 708 is separable from the device 704, the display 708 may include a controller (not shown) that provides additional functionality to facilitate to independent operation of the device 704. In one embodiment, the controller 706 is disposed within the separable display.

The controller 706 includes a communications circuit configured to wirelessly transmit data, such as images or coordinate data via a communications link 712 to the AACMM 100, to a separate computing device 710 or a combination of both. The computing device 710 may be, but is not limited to a computer, a laptop, a tablet computer, a personal digital assistant (PDA), or a cell phone for example. The display 708 may allow the operator see the acquired images, or the point cloud of acquired coordinates of the object 702. In one embodiment, the controller 706 decodes the patterns in the acquired image to determine the three-dimensional coordinates of the object. In another embodiment, the images are acquired by the device 704 and transmitted to either the AACMM 100, the computing device 710 or a combination of both.

The device 704 may further include a location device assembly 714. The location device assembly may include one or more of inertial navigation sensors, such as a Global Positioning System (GPS) sensor, a gyroscopic sensor, an accelerometer sensor. Such sensors may be electrically coupled to the controller 706. Gyroscopic and accelerometer sensors may be single-axis or multiple-axis devices. The location device assembly 714 is configured to allow the controller 706 to measure or maintain the orientation of the device 704 when detached from the AACMM 100. A gyroscope within the location device assembly 714 may be a MEMS gyroscopic device, a solid-state ring-laser device, a fiber optic device gyroscope, or other type.

When the device 704 is removed from the articulated arm CMM 100, a method is used to combine images obtained from multiple scans. In an embodiment the images are each obtained by using coded patterns so that only a single image is needed to obtain three-dimensional coordinates associated with a particular position and orientation of the device 704. One way to combine multiple images captured by the device 704 is to provide at least some overlap between adjacent images so that point cloud features may be matched. This matching function may be assisted by the inertial navigation devices described above.

Another method that can be used to assist in accurate registration of images collected by the device 704 is the use of reference markers. In an embodiment, the reference markers are small markers having an adhesive or sticky backing, for example, circular markers that are placed on an object or objects being measured. Even a relatively small number of such markers can be useful in registering multiple images, especially if the object being measured has a relatively small number of features to use for registration. In an embodiment, the reference markers may be projected as spots of light onto the object or objects under inspection. For example, a small portable projector capable of emitting a plurality of small dots may be placed in front of the object or objects to be measured. An advantage of projected dots over sticky dots is that the dots do not have to be attached and later removed.

In one embodiment, the device projects the structured light over a contiguous and enclosed area 716 and can acquire an image over the area 716 at a range of 100 mm to 300 mm with an accuracy of 35 microns. In an embodiment, the perpendicular area 716 of projection is approximately 150 to 200 mm². The camera or cameras 510 may be a digital camera having a 1.2-5.0 megapixel CMOS or CCD sensor.

Referring to FIG. 28 and FIG. 29, the process of decoding a coded pattern will be described. The first step in decoding an image of the pattern is to extract the centers of gravity (cog) 724 (FIG. 28C) of the projected pattern 720 features in the Y direction. This is carried out by calculating a moving average of the pixel grayscale values and moving downwards in the Y direction processing a single column at a time. When a pixel value in an image falls above the moving average value then a starting point for a feature is found. After a starting point is found the width of the feature continues to increase until a pixel value falls below the moving average value. A weighted average is then calculated using the pixel values and their Y positions between the start and end points to give the cog 724 of the pattern feature 723 in the image. The distances between the start and end points are also recorded for later use.

Figure 28C:
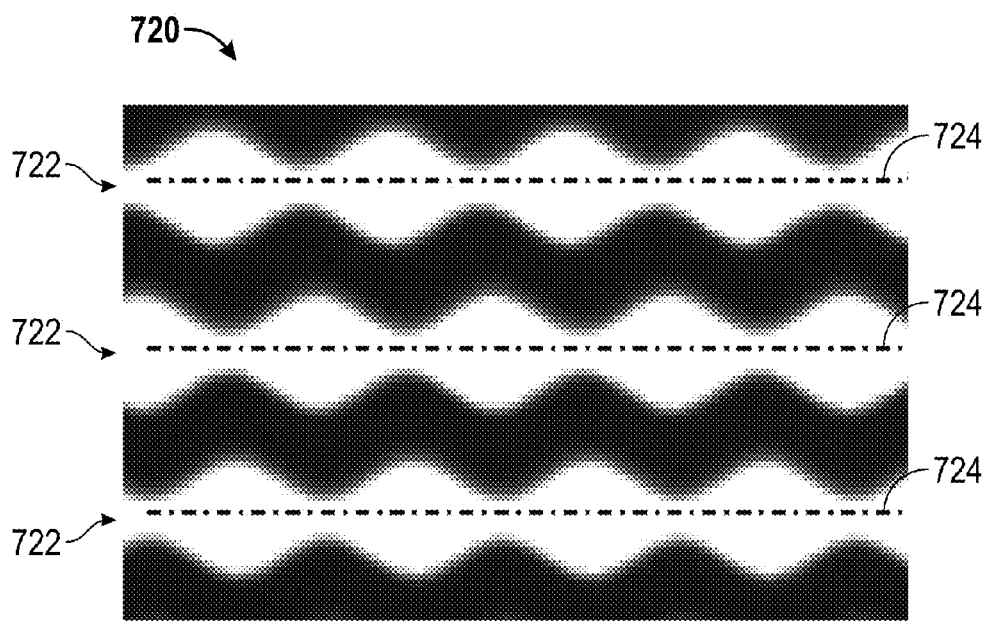
Figure 28D:
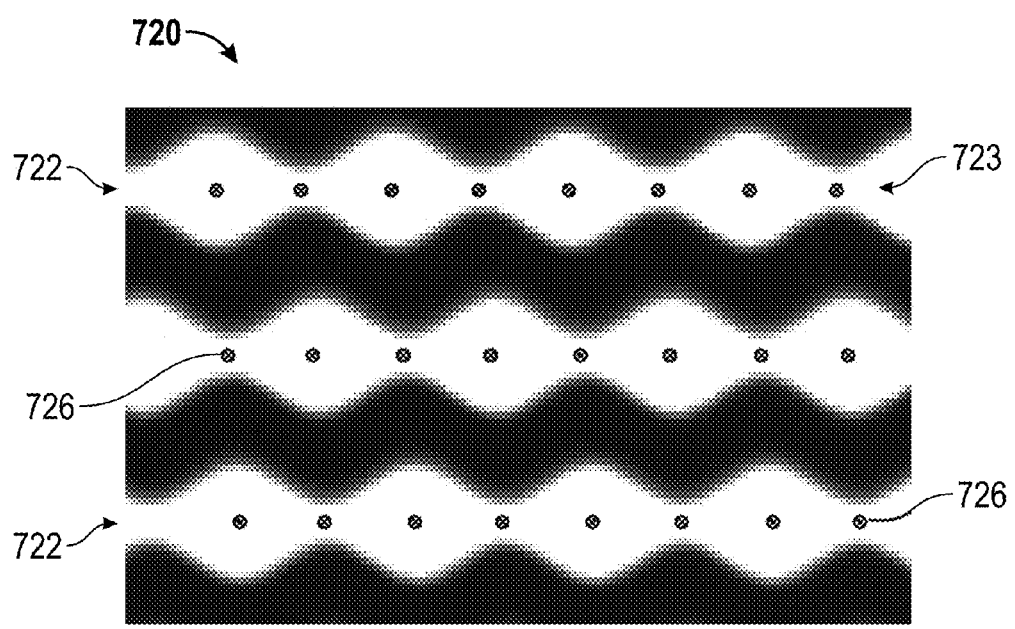

The resulting cogs 724 are used next to find the pattern lines 722. This is done by moving in a left to right direction (when viewed from the direction shown in the FIGS.) starting with the first column of the image. For each cog 724 in this column the neighboring column to the immediate right is searched for a cog 724 that is within a particular distance. If two matching cogs 724 are found, then a potential line has been determined. As the process moves across the image, more new lines are determined and other previously determined lines are extended in length as additional cogs 724 are detected within the tolerance. Once the entire image has been processed a filter is applied to the extracted lines to ensure only lines of a desired length, which is the wavelength of the pattern, are used in the remaining steps. FIG. 28C also shows the detected lines where they are all longer than a single wavelength of the pattern. In one embodiment there is no or a small delta between neighboring column's cogs.

The next step in the decoding process is to extract the projected pattern features along the lines in the X direction in the form of block centers. Each pattern contains both wide blocks and narrow blocks. In the sinusoidal pattern 720 this refers to the peaks and valleys of the wave and in the square pattern 730 this refers to the wide squares and the narrow squares. This process proceeds in a similar fashion to extracting the features in the Y direction, however the moving average is also calculated using the widths found in the first stage and the direction of movement is along the line. As described above, the features are extracted in the area where widths are above the moving average value but in this process, features are also extracted in the areas where the widths are below the moving average. The widths and X positions are used to calculate a weighted average to find the center of the block 726 in the X direction. The Y positions of the cogs 724 between moving average crossings are also used to calculate a center for the block 726 in the Y direction. This is carried out by taking the average of the Y coordinates of the cogs. The start and end points of each line are also modified based on the features extracted in this step to ensure that both points are where the crossing of the moving average occurs. In one embodiment, only complete blocks are used in later processing steps.

The lines and blocks are then processed further to ensure that the distance between the block centers 726 on each line are within a predetermined tolerance. This is accomplished by taking the delta between the X center positions between two neighboring blocks on a line and checking that the delta is below the tolerance. If the delta is above the tolerance, then the line is broken up into smaller lines. If the break is required between the last two blocks on a line, then the last block is removed and no additional line is created. If the break is required between the first and second or second and third blocks on a line, then the blocks to the left of the break are also discarded and no additional line is created. For situations where the break occurs in any other place along the line the line is broken into two and a new line is created and the appropriate blocks are transferred to it. After this stage of processing the two patterns require different steps to finish decoding.

The sinusoidal pattern 720 may now be decoded with one additional step of processing using the block centers on the lines. The modulus of each block X center and the wavelength of the pattern 720 on a line 722 are calculated and the average of these values gives the phase of the line 722. The phase of the line 722 may then be used to decode the line in the pattern 720 which in turn allows for the determination of an X, Y, Z coordinate position for all cogs 724 on that line 722.

Before the square pattern 730 is decoded, first lines 732 be connected vertically before any decoding can take place. This allows a group of lines to be identified and not just a single line like the sinusoidal pattern. Connections 736 are found between lines 732 by using the blocks 734 and the cogs contained in the block calculated in the first stage of processing. The first cog in each block on a line 732 is tested to see if there is another cog directly below it in the same column. If there is no cog below then there is no connection with another line at this point so processing continues. If there is a cog below then the Y distance between the two cogs is determined and compared to a desired maximum spacing between lines. If the distance is less than this value, the two lines are considered connected at that point and the connection 736 is stored and processing continues onto the next block. In one embodiment, a line connection 736 is unique such that no two lines will have more than one connection 736 between them.

Figure 29C:
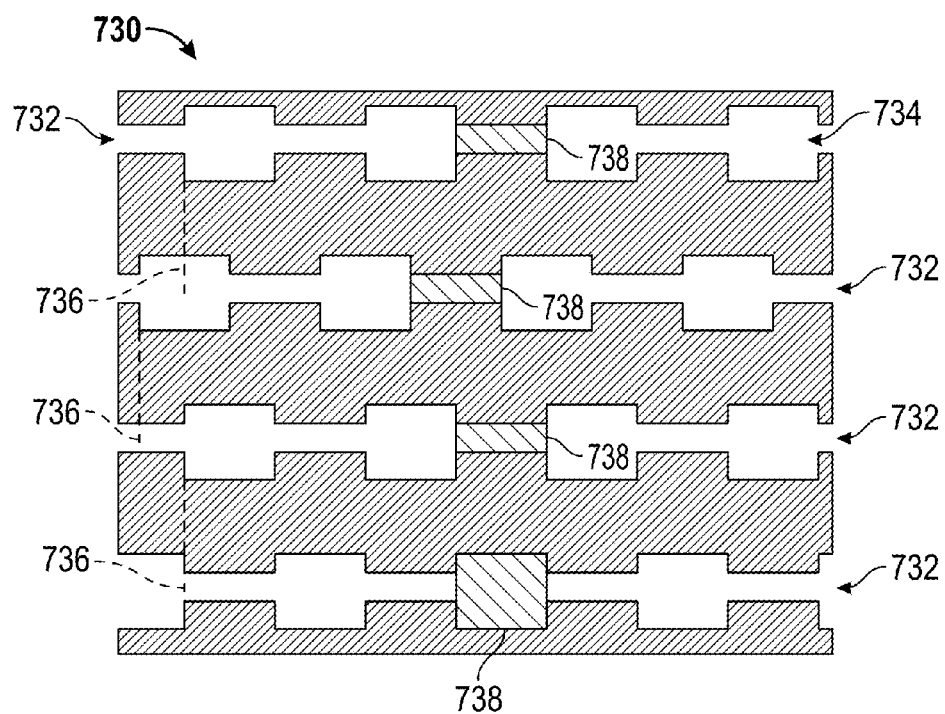

The next step of processing for the square pattern 730 is phase calculation between connected lines. Each pair of lines 732 is first processed to determine the length of overlap between them. In one embodiment there is at least one wavelength of overlap between the pair of lines to allow the calculation of the relative phase. If the lines have the desired overlap, then the cog at center of the area of overlap is found. The blocks 738 that contain the center cog and the cog directly below are determined and the relative phase between the block X centers is calculated for that line connection. This process is repeated for all connections between lines. In one embodiment, the process is repeated in only the downwards direction in the Y axis. This is because the code is based on connections below lines and not the other way round or both. FIG. 29C shows the blocks 738 that could be used for calculating the relative phase for this set of lines. The relative phases in embodiment of FIG. 29C are 3, 1 and 2 and these phases would be used in the final stage to decode the top line.

The next step in decoding the square pattern 730 is performing a look up using the relative phases calculated in the previous step. Each line 732 is processed by tracking down the line connections 736 until a connection depth of four is reached. This depth is used because this is the number of phases to decode the line. At each level of the connection a hash is determined using the relative phase between the lines 732. When the required connection depth is reached the hash is used to look up the line code. If the hash returns a valid code, then this is recorded and stored in a voting system. Every line 732 is processed in this way and all connections that are of the desired depth are used to generate a vote if they are a valid phase combination. The final step is then to find out which code received the most votes on each line 732 and assigned the code of the line 732 to this value. If there is not a unique code that received the most votes, then the line is not assigned a code. The lines 732 are identified once a code has been assigned and the X, Y, Z coordinate position for all cogs on that line 732 may now be found.

It should be noted that although the descriptions given above distinguish between line scanners and area (structured light) scanners based on whether three or more pattern elements are collinear, it should be noted that the intent of this criterion is to distinguish patterns projected as areas and as lines. Consequently, patterns projected in a linear fashion having information only along a single path are still line patterns even though the one-dimensional pattern may be curved.

A difficulty sometimes encountered in making measurements with a triangulation scanner attached to the end of an articulated arm CMM is that edges are not very sharp. In other words, the edge may have a radius or a chamfer. Such edges may be edges of parts, holes in parts, or sharp aspects of other features. Problems with fuzzy or inaccurately located edges may be seen with line scanners or area scanners. Although the edges viewed in the two-dimensional (2D) image of a triangulation scanner may be sharp, the exact distance to the edge may be less certain. Near an edge, a single pixel may have a distance that is not clearly defined. On one portion of light reflected into the pixel, the light may come from a flat surface. On another portion of the pixel, the distance may be that of neighboring pixels on the side or bottom of a hole, or it may be a faraway distance in the case of an edge of a part. In most cases, because of lens defocus, lens aberrations, and limited modulation transfer function (MTF), a plurality of pixels (rather than a single pixel) may correspond to a feature such as the edge of a hole. In this case, when the point in question is near an edge, the apparent distance to the pixel may not be determined to a single distance to a point on the object. Sometimes the term "mixed pixel" is used to refer to the case in which the distance ascribed to a single pixel on the final image is determined by a plurality of distances on the object. In such a case, the distance as determined by the triangulation scanner for the pixel in question may be a simple average of the distances over the extent of the pixel. In other cases, the distance as determined by the triangulation scanner may be a much different value, as for example when an "ambiguity range" is exceeded during a phase shift method of triangulation. In this case, the distance may be in error by an amount that is difficult to predict.

In accordance with one embodiment, a solution to this issue uses the sharp edges that appear in one or more 2D images of the feature being measured. In many cases, such edge features can be clearly identified in 2D images—for example, based on textural shadings. These sharp edges may be determined in coordination with those surface coordinates that are determined accurately using the triangulation methods. By intersecting the projected rays that pass through the perspective center of the lens in the triangulation scanner with the 3D coordinates of the portion of the surface determined to relatively high accuracy by triangulation methods, the 3D coordinates of the edge features may be accurately determined.

It should be further appreciated that edges seen in an image are never perfectly sharp and so an imperfect edge discontinuity (for example, a fillet) will have to be relatively wide to be seen clearly by a camera. A position of an imperfect edge may still be calculated using methods discussed herein (for example, taking a centroid) to obtain an edge value to a subpixel resolution. In other words, even though a camera will respond on a subpixel level to the width of an edge, the methods given here are still valid as there is generally less uncertainty in the position of an edge from a 2D image than from a 3D image, which is relatively higher amount of data noise when compared with 2D images. In some cases, the surfaces meet to form a substantially 90-degree angle. In other cases, the surfaces may meet with an intermediary surface that is angled less than 90 degrees (e.g. 45 degrees), such as a chamfer or a bevel for example. In other cases, there may be a curved intermediary surface, such as a fillet for example. In still other cases, the edge may be "broken," such as where the intersection of the surfaces is worked with a file or rasp for example. The methods disclosed herein will be valid for edges having these characteristics. In some embodiments, empirical data may be collected to understand how the edge contrast changes in the captured image under prescribed lighting conditions.

Figure 34:
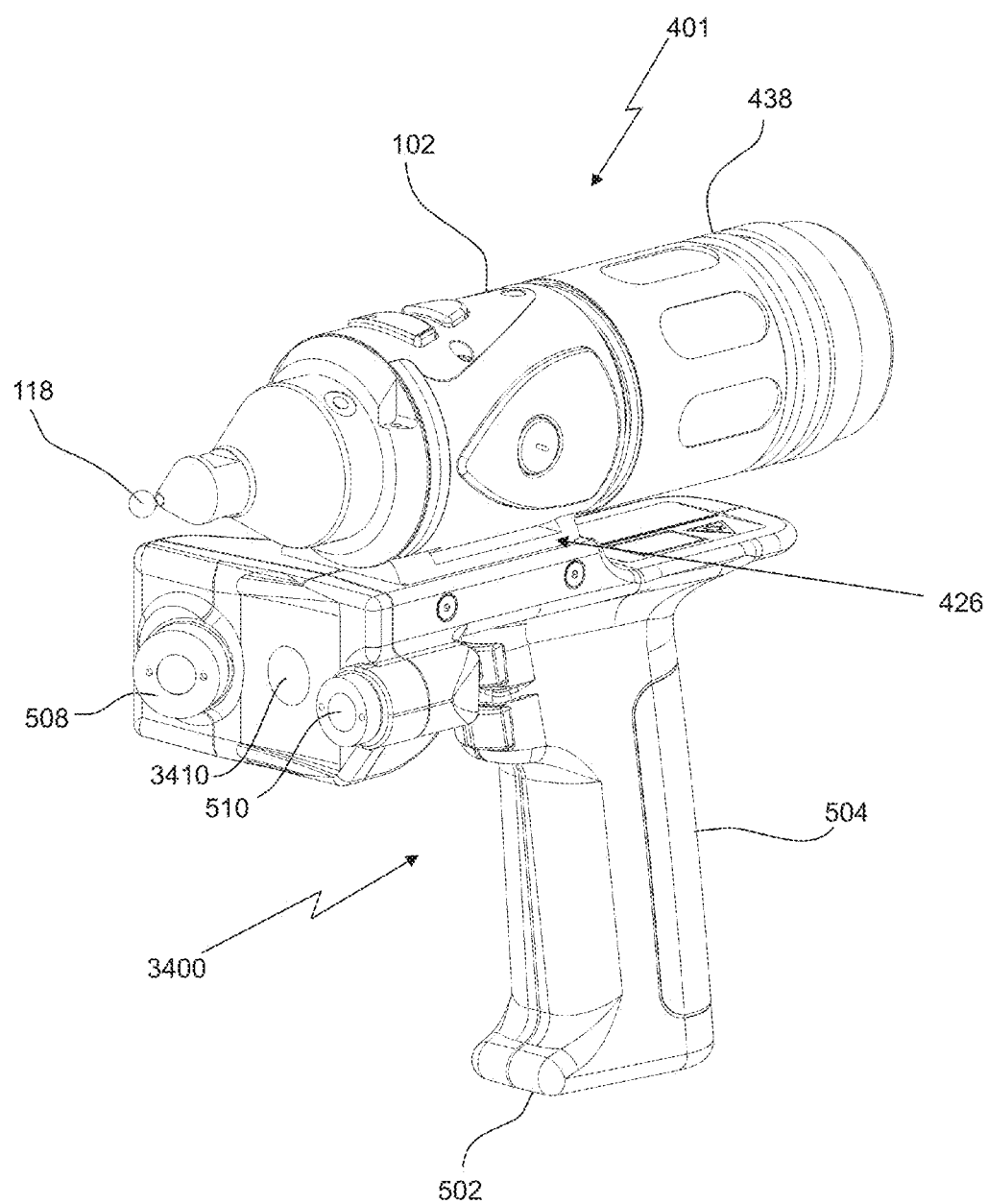
FIG. 34 is an isometric drawing of a probe end having a triangulation scanner and camera used together to produce sharp 3D representations.
Figure 35:
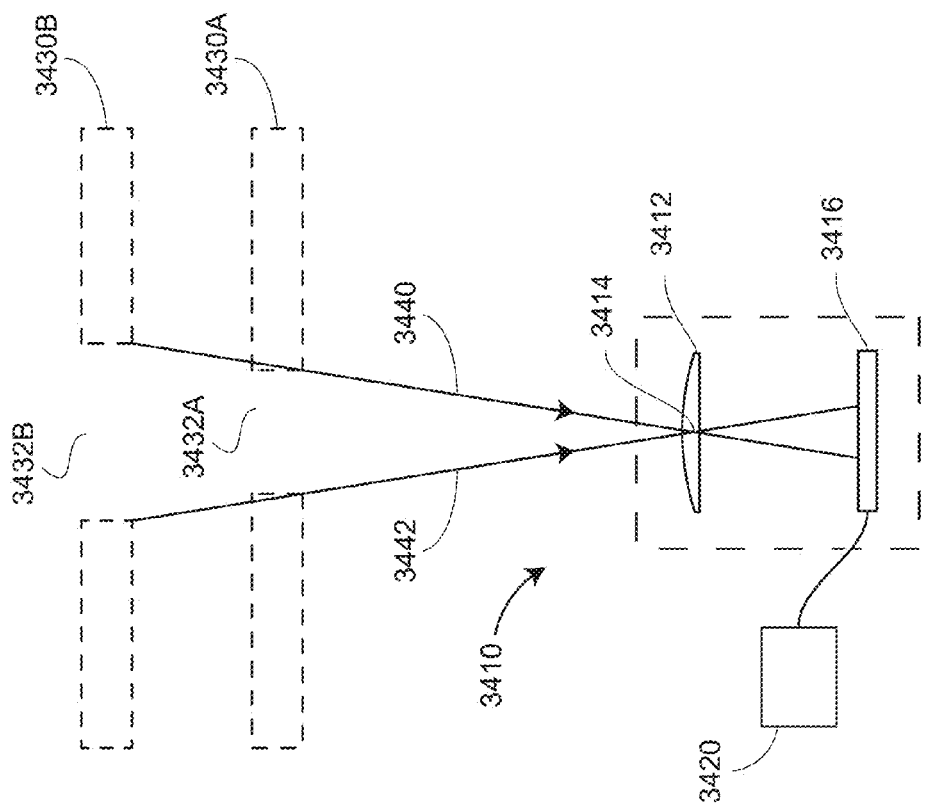
FIG. 35 is a schematic illustration of rays projected through a camera perspective center to provide sharp edges for 3D representations.
Figure 36:
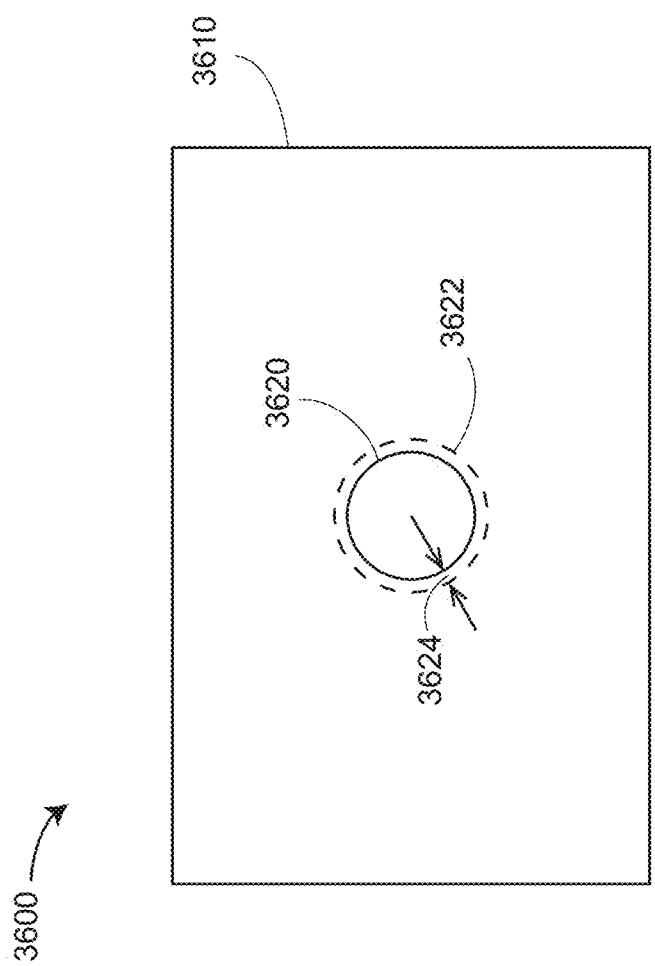
FIG. 36 is an illustration showing a hole having edges having a surrounding region having a "fuzzy"

With reference made to FIGS. 34-36, an example of the procedure described above is explained in more detail for the embodiment having an object with a hole. The camera 508 of triangulation scanner 3400 captures the image of light projected by projector 510 onto the surface of an object and reflected off the object surface. The reflected rays of light pass through the perspective center 3414 of the camera lens 3412 onto a photosensitive array 3416 within the camera. The photosensitive array sends an electrical signal to an electrical circuit board 3420 that includes a processor for processing digital image data. Using methods of triangulation described hereinabove, the processor determines the 3D coordinates to each point on the object surface. It should be appreciated that the projected light may cover an area in a single projected image, or it may cover a more limited region such as a stripe or a dot. The comments made herein apply to each of these cases.

The method of combining the 2D image captured by a camera, which may in some embodiments be the camera 508, but in other cases be a separate camera 3410, is to project the rays of light 3440, 3442 corresponding to the edges of the hole 3432A, 3432B captured by the photosensitive array 3416 from the corresponding points on the photosensitive array 3416 so that these rays intersect the edges of the surface 3430A, 3430B. This intersection determines the 3D edge coordinates.

This method may be more clearly understood by considering the example of an object 3600 having a flat region 3610 into which is drilled hole 3620. A region extends from the edge of hole 3620 to a peripheral boundary 3622 in which there is a relatively high level of uncertainty because of mixed pixel effects as discussed above. An assumption is made, based on a priori knowledge of the part being investigated that the edge (in this case of a hole) is sharp and the surface is generally flat. Therefore, by projecting the 2D image of hole through the lens perspective center onto the flat region having coordinates determined using triangulation, the 3D coordinates of the sharp edges of the hole may be determined to relatively high accuracy. In a similar manner, the 3D coordinates of any sorts of sharp edges may be determined.

In an embodiment, an uncertainty distance 3424 characteristic of the triangulation system is provided. In some cases, the uncertainty distance is based at least in part on the amount of noise observed in a region or a measure of the "smoothness" of edges. In regions of high noise or low smoothness, uncertainty distance may be increased. Other factors such as light level, which might be a level of ambient light or a level of illumination provided by the device 401, may also be considered in determining an appropriate uncertainty distance 3424.

Figure 37:
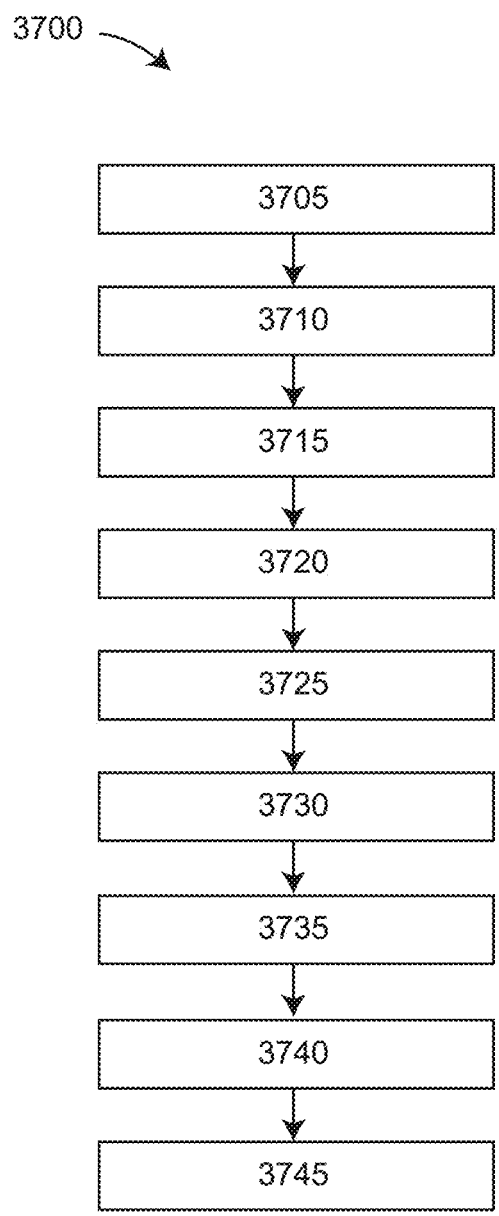
FIG. 37 is a flow diagram of a method in accordance with an embodiment of the invention.

A method 3700 is now described for determining 3D coordinates of an edge point located on an edge feature using a noncontact 3D measuring device that includes a combination of a projector, a scanner camera, and an edge-detection camera is now described with reference to FIG. 37. In a step 3705, an AACMM is provided that includes a projector, scanner camera, edge-detection scanner, and processor are provided. The articulated arm CMM further includes mechanical elements such as an arm portion that is rotationally coupled to a base. Each arm segment includes at least one position transducer, which in most cases, is an angular encoder. The position transducer produces a position signal, which is usually an angular reading. The position signal may be generated in response to an operator moving the arm portion. One end of the arm portion is attached to the base and the other end is attached to a probe end. The noncontact 3D measuring device (including the projector, scanner camera, and edge-detection scanner) is coupled to a probe end. It should be appreciated that the edge-detection camera may be the same camera as the scanner camera or a camera different than the scanner camera. The projector camera has a projector perspective center through which rays from a first pattern of light pass in traveling to an object. The first pattern of light may be structured light of the type described hereinabove, the first pattern possibly being a coded or sequential pattern. Alternatively, the first pattern may be projected as a line of light or as a spot of light. The rays of light may arise from a pattern of light reflected from a MEMS array or generated by an individual light source that sends the light through suitable optical elements.

In a step 3710, an electronic circuit within the AACMM receives a position signal from the position transducers in the arm segments and sends a first electrical signal to the processor. The position signal may be generated in response to the operator moving the noncontact 3D measurement device from a first position to a second position adjacent the object to be measured. As used herein, the second position is located such that the object is both within the operating range of the noncontact 3D measurement device's field of view and focal distance. In a step 3715, the operator activates the noncontact 3D measuring device, such as by depressing an actuator for example, and the projector emits a first pattern of light onto the object. In a step 3720, the scanner camera receives the first pattern of light reflected from the object. In response to receiving the reflected light, the scanner camera sends a second electrical signal to the processor.

In a step 3725, the edge-detecting camera receives a second light reflected from the object and sends a third electrical signal to the processor in response. A portion of the second light is reflected from an edge feature of the object, where the edge point is a point on the edge feature. The second light may come from a variety of sources. It may be an ambient light coming from background light sources in the environment. The second light may be intentionally emitted by a light source element coupled to the probe end. The light source may provide a uniform illumination over the surface. The second light may be sent to the object at a different time that the first light pattern.

In a step 3730, the processor determines first 3D coordinates of first points on a surface of the object. These first 3D points are based at least in part on the first pattern of light from the projector and the second electrical signal, which arises from the image captured by the scanner camera. Using triangulation methods, the 3D coordinates of the first points on the surface are determined in the local frame of reference of the projector and scanner camera. By further including the first electrical signals, the position of the object surface in an AACMM frame of reference may be determined.

In a step 3735, the processor further determines a first ray, the first ray going from the object to the object. The first ray is that ray that passes from the edge point through the perspective center of the edge-detecting camera. The processor determines the first ray based at least in part on the third electrical signal, which captures the edge in the image of a photosensitive array within the edge-detecting camera. In addition, the first ray is based on the first electrical signal, which is needed to determine the first ray within the AACMM frame of reference. The first ray may be represented as a vector within the AACMM frame of reference.

In a step 3740, the processor further determines 3D coordinates of the edge point based at least in part on an intersection of the first ray with the first 3D coordinates of the first surface. This may be done by determining a characteristic distance over which 3D data is considered of less accuracy than desired. The characteristic distance may be based on a rule associated with a given system, or it may be based on image quality—for example, jagged edges or noise in 3D points near the edge. The general approach is to mathematically project a smooth surface (characterized by 3D points) along a continuing path across the characteristic distance until the smooth surface intersects the first ray. In most cases, a large number of first rays along an edge points on an edge feature and projected to intersect a projection of a smooth surface, thereby enabling more accurate determination of 3D points on and near the edge feature. In a step 3745, the 3D coordinates of the edge point are stored.

It should be appreciated that the coupling of a noncontact 3D measuring device to an AACMM that is manually moved by an operator may have advantages over other systems, such as those that use robotic systems. In general, an AACMM will be able to determine the location of the noncontact 3D measuring device in space (relative to the local AACMM coordinate system) much more accurately than a robotic system. Further, an operator may move the AACMM articulated arm segments in an ad hoc manner to place the noncontact 3D measuring device in a position to measure a desired surface on any object within operating area of the AACMM. A robotic system on the other hand would require complex programming to define the movement of the robot which increases the time and cost to perform an equivalent scan of the object.

It is often the case that 3D coordinates of edge features of an object are of more importance than 3D coordinates of smooth regions of the object—for example, the smooth regions between edge features. A method is now described for determining 3D coordinates of points on edge features using a 2D camera coupled to a probe end 401 of an AACMM 100. Optionally, a scanner such as an LLP or a structured light scanner may further be used to obtain 3D coordinates of other regions (smooth regions) of an object, as described herein below.

Figure 38A:
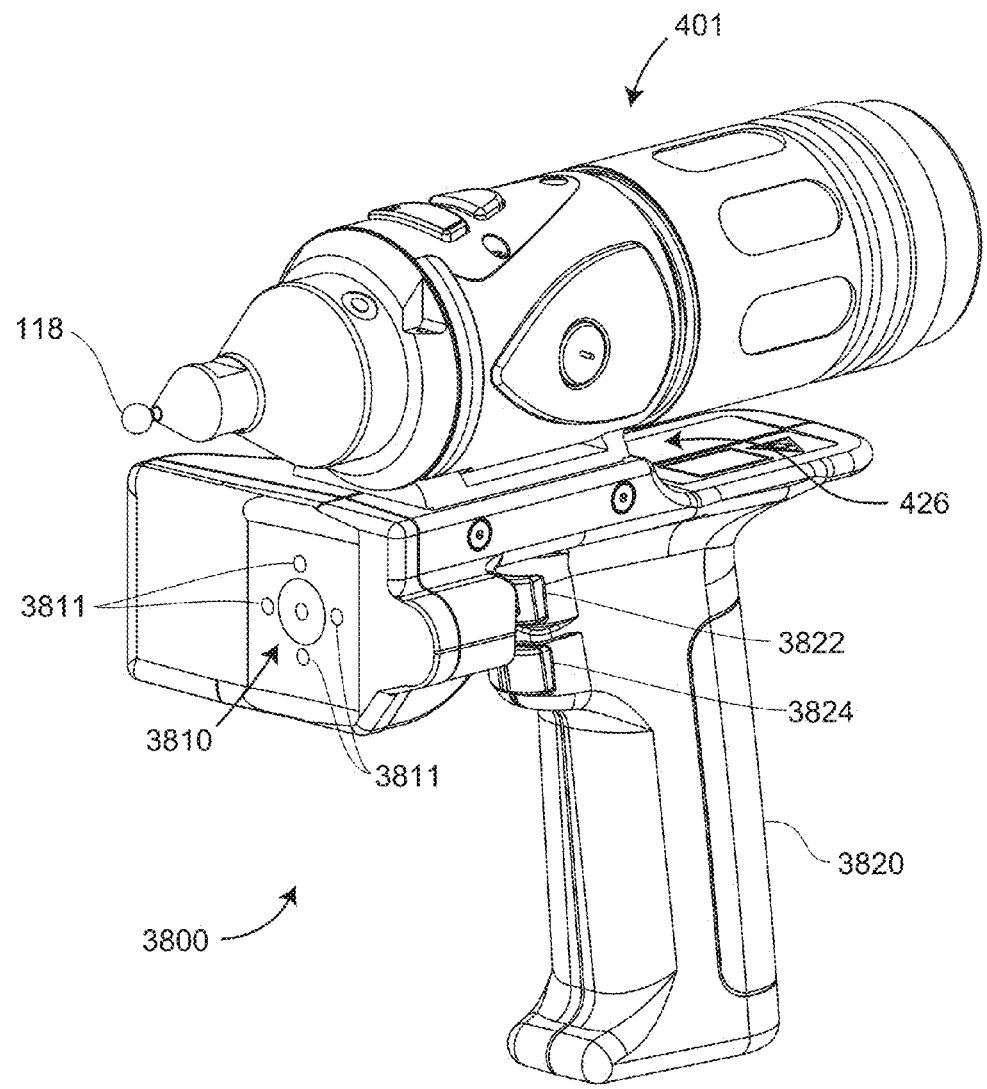
FIG. 38A is an isometric view of a probe end that includes a stand-alone camera according to an embodiment of the invention.

In an embodiment illustrated in FIG. 38A, the probe end 401 is attached through the interface 426 to an imaging assembly 3800 that includes a handle body 3820 to which are coupled a 2D camera assembly 3810, optional illuminators 3811, buttons or actuators 3822, 3824. In an embodiment, the probe end 401 further includes a probe tip 118. In an embodiment, the 2D camera assembly 3810 further includes a lens and a photosensitive array, the 2D camera assembly being operable to capture on the photosensitive array 2D images of objects in the environment. In an embodiment, the photosensitive array may be for example a CMOS or CCD array. In an embodiment, the optional illuminators 3811 are LED light sources, which might for example emit infrared light. In another embodiment, images captured by the 2D camera assembly 3810 are illuminated by background ambient light rather than by the illuminators 3811.

Figure 38B:
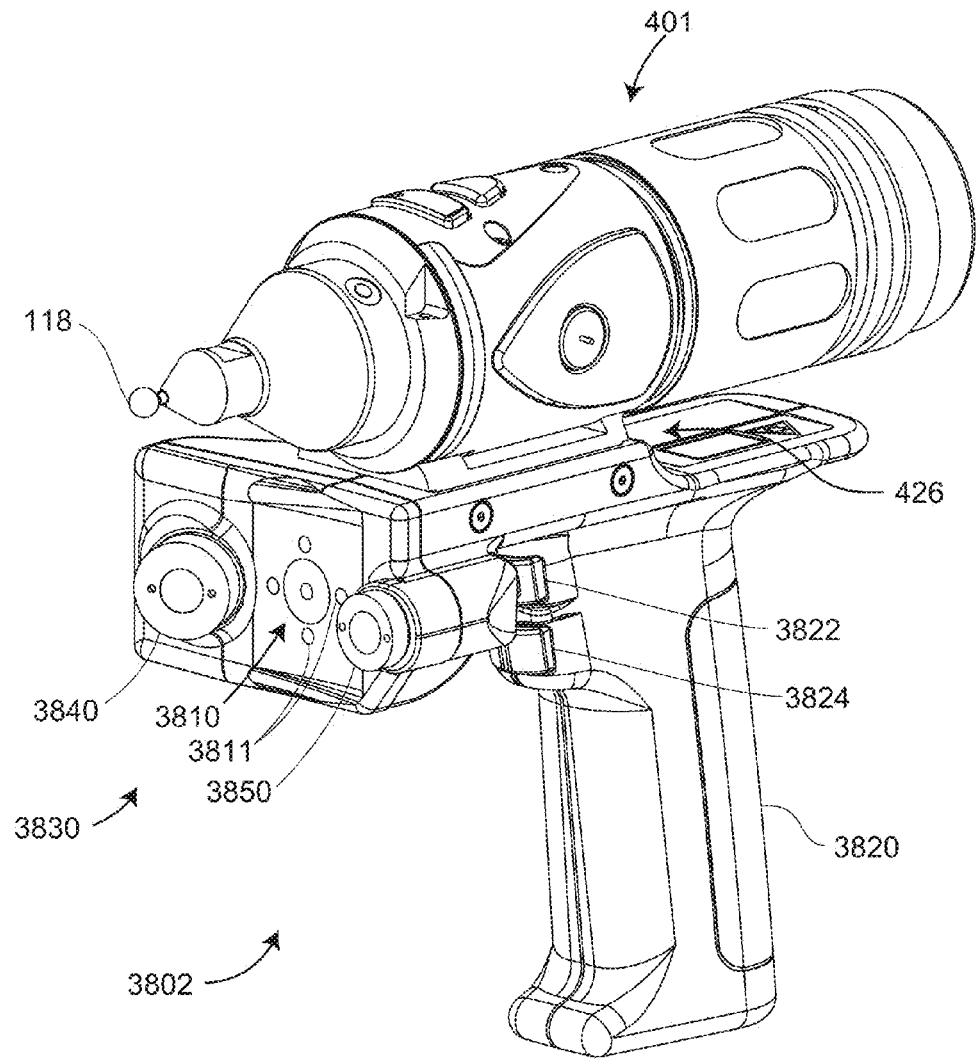
FIG. 38B is an isometric view of a probe end that includes a triangulation scanner having a two-dimensional (2D) camera according to an embodiment of the invention.

In an embodiment illustrated in FIG. 38B, the probe end 401 is attached through the interface 426 to another imaging assembly 3802 that includes a handle body 3820 to which are coupled a triangulation scanner assembly 3830 and buttons or actuators 3822, 3824. In an embodiment, the probe end further includes a probe tip 118. In an embodiment, the triangulation scanner assembly 3830 includes a 2D scanner camera 3840 and a projector 3850. In an embodiment, the 2D scanner camera 3840 further includes a lens and a photosensitive array, which might be for example a CMOS or CCD array. In an embodiment, the projector 3850 projects a line of light. In another embodiment, the projector 3850 projects a pattern of light over an area. In different embodiments, the light is emitted by a laser, a superluminescent diode, or an LED. In an embodiment, the projector includes a digital micromirror device (DMD) that creates the pattern of the laser light emitted from the projector 3850.

In an embodiment according to the inventive method now described, a single camera is used to determine 3D coordinates of edges. The camera may be the camera 3810 of FIG. 38A or it may be the camera 3840 of FIG. 38B. In other words, the camera 3840 may be used on its own (without the projector 3850) to obtain 2D images from which 3D coordinates of edge features are determined. In another embodiment, the camera assembly 3810 in FIG. 38B is used instead of the camera assembly 3840 to determine the 3D coordinates of edge features. In another embodiment, the cameras 3810, 3840 are used cooperatively to determine the 3D coordinates of edge features.

In an embodiment, the camera assembly, which might for example be the camera assembly 3810 or the camera assembly 3840, is moved to two different poses. The term "pose" as used herein refers to the six degrees of freedom of the camera assembly. The six degrees-of-freedom includes three translational degrees of freedom, for example (x, y, z), and three orientational degrees of freedom, for example (pitch angle, yaw angle, roll angle). The pose of the camera assembly specifies the position and orientation of the camera assembly in space.

Figure 39A:
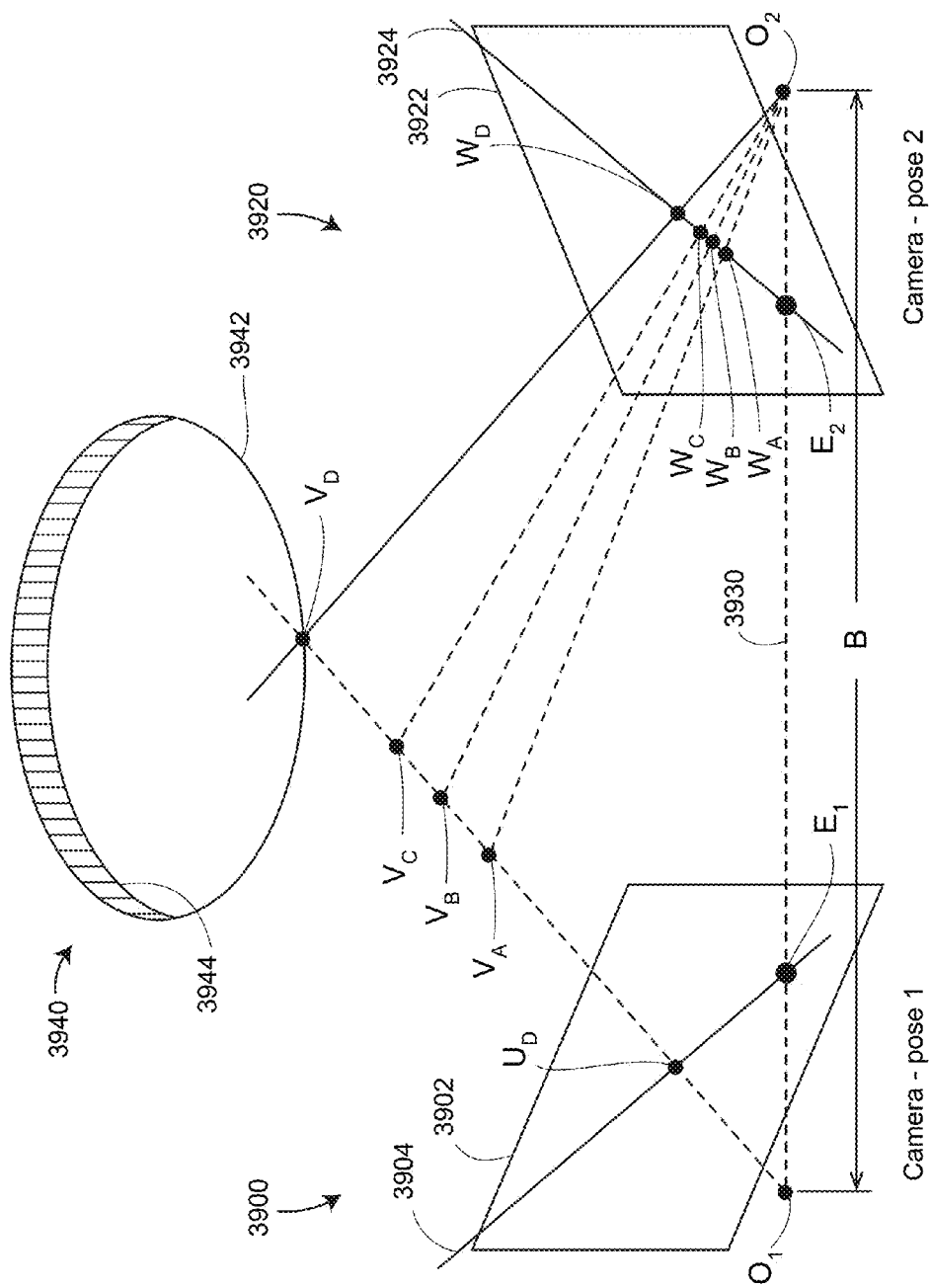
FIG. 39A is a schematic view illustrating the relationship between epipolar lines and measured points on a camera placed in two different poses.

In FIG. 39A, the camera assembly in its first pose is designated 3900 and in its second pose is designated 3920. In each pose the cameras view edges of an object feature 3940. In the example of FIG. 39A, the object feature 3940 is hole having an upper edge 3942 and a lower edge 3944. The camera in the first pose 3900 has a perspective center $O_1$, which is the point from which rays of light from the feature 3940 appear to pass before reaching the camera photosensitive array when the camera is in the first pose. An epipolar plane 3902 is established by projecting the plane of the camera photosensitive array symmetrically about the perspective center $O_1$. An epipolar plane is in general mathematically equivalent to the plane of the photosensitive array in the mathematical method that follows. Because the camera geometry is easier to visualize using epipolar planes than planes of photosensitive arrays, epipolar planes are used in the discussion that follows. For the camera in the first pose 3900, the epipolar plane is 3902.

The camera in the second pose 3920 has a perspective center $O_2$, which is the point from which rays of light from the feature 3940 appear to pass before reaching the camera photosensitive array when the camera is in the second pose. An epipolar plane 3922 is established by projecting the plane of the camera photosensitive array symmetrically about the perspective center $O_2$. The epipolar plane 3922 is in general mathematically equivalent to the plane of the photosensitive array in the method that follows. For the camera in the second pose, the epipolar plane is 3922.

A line drawn between the perspective center $O_1$ and the perspective center $O_2$ is referred to as the baseline 3930 between the camera in the first pose 3900 and the camera in the second pose 3920. The length of the baseline 3930 is B. The baseline intersects the epipolar plane 3902 at the epipole $E_1$, and it intersects the epipolar plane 3922 at the epipole $E_2$. Consider a point $V_D$ on the edge 3942. A ray from this point through the perspective center $O_1$ intersects the epipolar plane 3902 at the point $U_D$. A ray drawn from the point $V_D$ through the perspective center $O_2$ intersects the epipolar plane 3922 at the point $W_D$. A line that resides on an epipolar plane and that also passes through the epipole of that plane is referred to an epipolar line. The epipolar line 3904 includes the point $U_D$, and the epipolar line 3924 includes the point $W_D$. Because the points $O_1$, $O_2$, $E_1$, $E_2$, $W_D$, $U_D$, and $V_D$ all lie in a common plane, as do the epipolar lines 3904 and 3924, it follows that, if one epipolar line is known, there is sufficient information to determine the location of the other epipolar line. So if the epipolar line 3904 is known, the epipolar line 3924 may be drawn.

A processor determines that the edge point $V_D$ selected from an image captured by the photosensitive array of the camera in the first pose 3900. The camera in the first pose 3900 further determines that the same point $V_D$ lies on the epipolar line 3924. However, many such points on the epipolar lines satisfy this condition. For example, the points $W_A$, $W_B$, $W_C$, $W_D$ correspond to the matching points $V_A$, $V_B$, $V_C$, $V_D$. Hence, there is insufficient information for the processor to determine a one-to-one correspondence between points $W_D$ and $U_D$ based on epipolar analysis alone. Thus, if the edge 1942 is smoothly continuous over a portion of the edge 3942 that includes the point $V_D$, then a one-to-one correspondence between the points $W_D$ and $U_D$ cannot be obtained from the epipolar analysis alone.

Figure 39B:
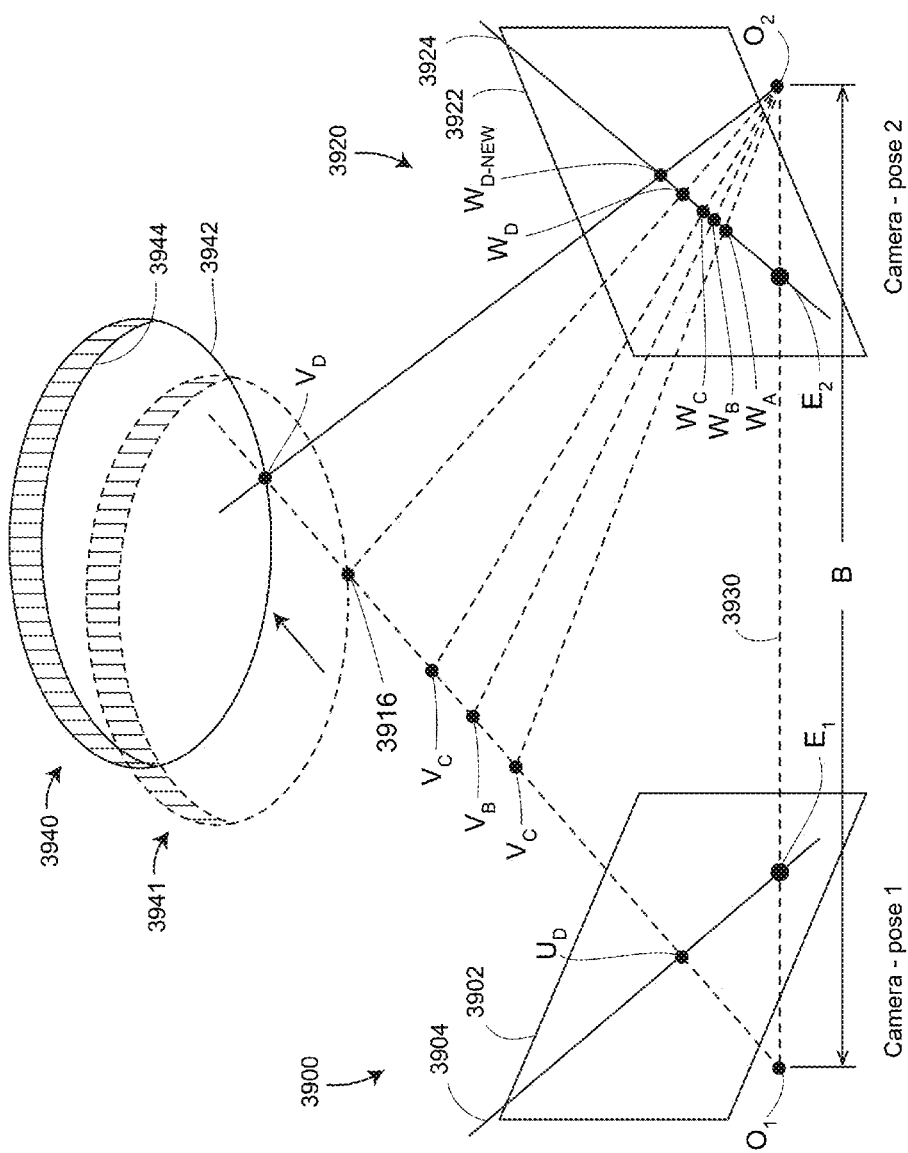
FIG. 39B is a schematic view illustrating an embodiment in which epipolar geometry is insufficient to determine 3D coordinates of an edge point based on 2D camera images obtained from two different poses.

FIG. 39B shows an embodiment in which the point $U_D$ projected onto the epipolar plane 3902 from the point $V_D$ does not uniquely define the position of the point $V_D$ on the epipolar line 3924. For example, the point $V_D$ on the actual edge 3942 of the actual hole 3940 may have been mistakenly thought to lie on the edge of the hole 3941 at the position 3916. Because the edge 3942 is smoothly continuous at the position of $V_D$, there is no way to make a direct matching of image points on the epipolar planes 3902 and 3922 unless some additional visual clues are present in the captured 2D images. In FIG. 39A, the point $W_D$ on the epipolar line 3924 was assumed to correspond to the point $V_D$ on the actual hole 3940, whereas in the embodiment of FIG. 39B, the point $W_D$ corresponds to the point 3916 in FIG. 39B rather than the point $V_D$, which is matched by the point $W_{D\text{-}NEW}$ on the epipolar line 3924. In the embodiment illustrated in FIGS. 39A, 39B, a different method is used to determine the true position in space of the edges 3942, 3944 of the object feature 3940.

Figure 40:
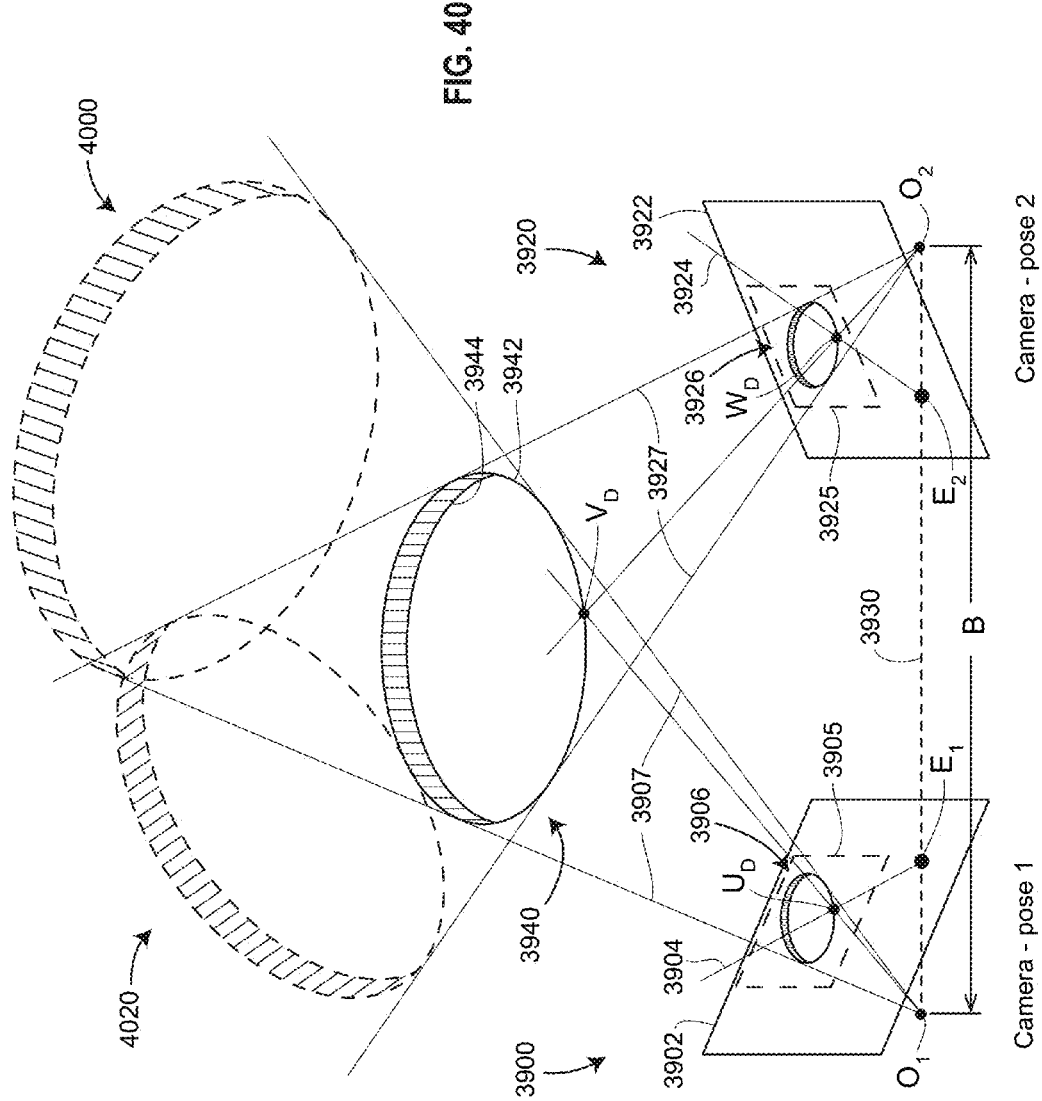
FIG. 40 is a schematic view illustrating a method for using two 2D images obtained from different poses to determine 3D coordinates of object edge points according to an embodiment of the present invention.

FIG. 40 illustrates a method for determining the 3D coordinates of edge points on an object feature. The embodiment shown in FIG. 40 is for the case in which the edge features reside on a plane, but methods described herein below generalize the method to extract 3D coordinates of edge points for objects having edge points that are not coplanar.

In an embodiment, a camera assembly is attached to an AACMM, such as AACMM 100 for example, which determines the pose of the camera assembly. The camera in the first pose 3900 has a perspective center $O_1$ and an epipolar plane 3902. The photosensitive array of the camera captures an image 3906 over an area corresponding to the region 3905 of the epipolar plane 3902. The image 3906 of the object 3940 appears on the photosensitive array of the camera and correspondingly on the epipolar plane 3902. The camera in the second pose 3920 has a perspective center $O_2$ and an epipolar plane 3922. The photosensitive array of the camera captures an image 3926 over an area corresponding to the region 3925 of the epipolar plane 3922. The image 3926 appears on the photosensitive array of the camera and correspondingly on the epipolar plane 3922. A point $V_D$ on the edge 3942 projects an image point $U_D$ on the epipolar plane 3902 and an image point $W_D$ on the epipolar plane 3922. Epipoles $E_1$ and $E_2$ are obtained as described herein above with respect to FIGS. 39A, 39B. An epipolar line 3904 may be drawn from $O_1$ through the image point $U_D$ and a corresponding epipolar line 3924 may be drawn, but the location of the image point $W_D$ on the epipolar line 3924 may not be determined without further information since the edge point $V_D$ is not a cardinal point that enables direct determination of the correspondence between the points $U_D$ and $W_D$.

The image 3906 is bounded by lines 3907 that pass from the perspective center $O_1$ to tangential points on the object 3940. Likewise, the image 3926 is bounded by lines 3927 that pass from the perspective center $O_2$ to tangential points on the object 3940. In general, the edges captured in the image 3906 and the edges captured in the image 3926 may not fully match. In other words, each view may capture some edge points not visible in the other view.

The image 3906 is obtained from the projection of light rays from the object 3940, but this image could instead be obtained from the projection of light rays from other possible objects 4000. Likewise, the image 3926 is obtained from the projection of light rays from the object 3940 but could instead be obtained of other possible objects 4020. Each of the objects 4000, 4020 may be shifted in position (x, y, z) or in orientation (pitch angle, yaw angle, roll angle) and still produce the same images 3906, 3926, respectively.

An optimization procedure may be performed to adjust the six degrees-of-freedom of each of the possible objects 4000 and 4020 to place the objects at the same position and orientation, which is the position and orientation of the actual object 3940. The accuracy of the procedure is enhanced if certain of the features are known to be coplanar. For example, the 3D coordinates of the points on the edges 3942 may be accurately determined using this method because the edge points 3942 lie on a single plane. If it is further known that some of the points, for example, the points 3944 lie on a separate plane, the optimization procedure may be used to determine the 3D coordinates of those edge points 3944.

Figure 41:
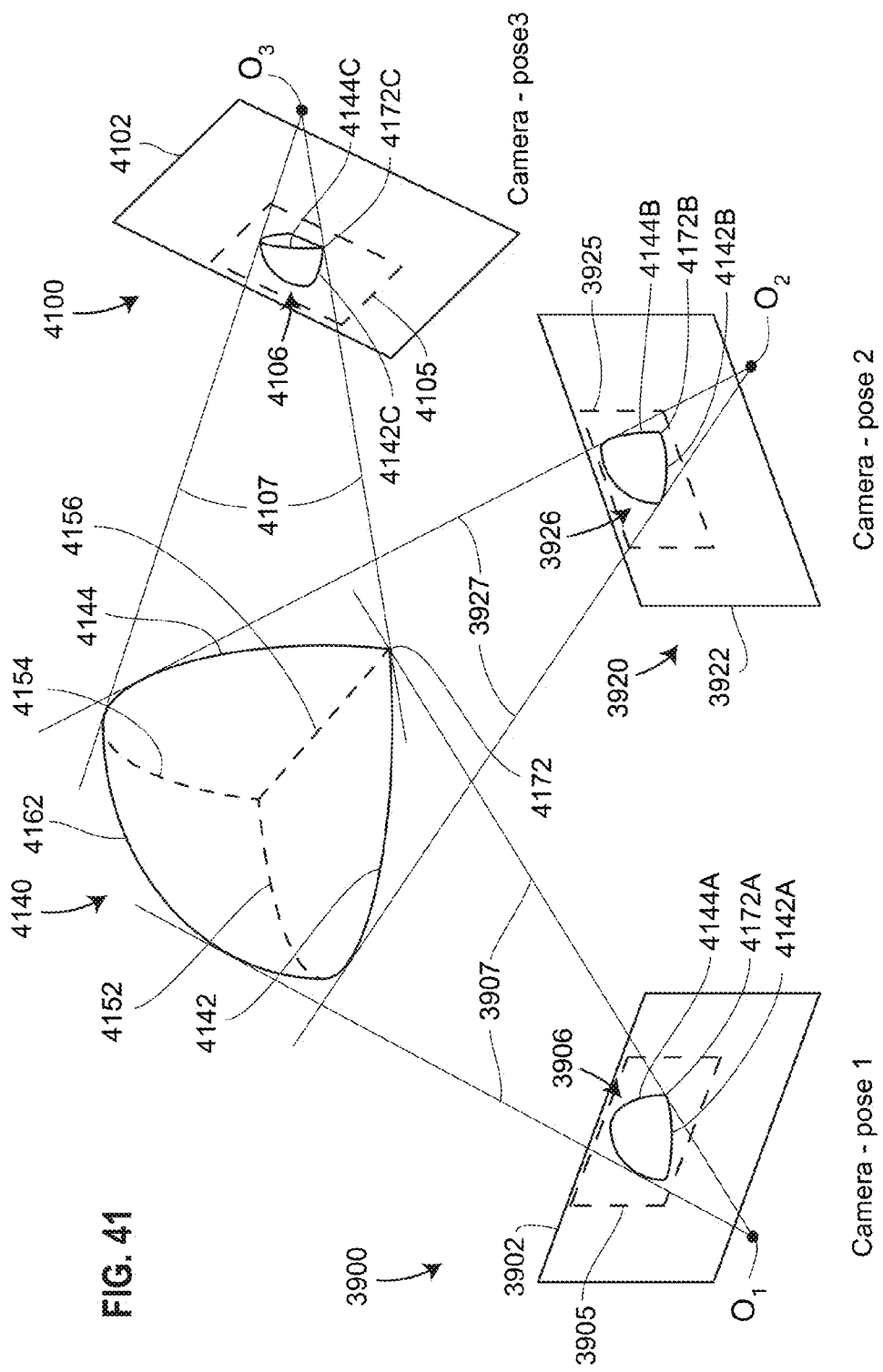
FIG. 41 is a schematic view illustrating a method for using three 2D images obtained from three of more different poses to determine 3D coordinates of edge points of a relatively complex 3D object according to an embodiment of the present invention.

For the general case in which edge features do not necessarily lie on a plane, the 3D coordinates of the edge features may be determined by further adding the camera assembly at a third pose 4100 as shown in FIG. 41. In other words, the camera assembly on the AACMM is moved to a third pose having six degrees-of-freedom determined by the AACMM. The camera assembly at the third pose 4100 has a perspective center $O_3$ and an epipolar plane 4102. The photosensitive array of the camera captures an image over an area corresponding to the region 4105 of the epipolar plane 4102. An image 4106 of the object 4140 appears on the photosensitive array of the camera and correspondingly on the epipolar plane 4102.

In the example of FIG. 41, the 3D object 4140 is one quarter of a sphere. Edges of the object 4140 include edges 4142, 4144, 4152, 4154, 4156. Of these edges, the edge 4142 is visible on the images 3906, 3926, 4106 as 4142A, 4142B, 4142C, respectively. Likewise, the edge 4144 is visible on the images 3906, 3926, 4106 as 4144A, 4144B, 4144C respectively. The edges 4152, 4154, 4156 appear only on the image 4106 and hence are not used to reconstruct 3D coordinates of edge points. The portion 4162 of the object 4140 is not an edge but rather a curved surface that forms a curved projection in 3D space. The point 4172 is a cardinal point formed by the intersection of two edges. The cardinal point 4172 may be recognized in each of the images 3906, 3926, and 4106 and may be used to further simplify analysis of the 3D coordinates of the edges 4142 and 4144. However, the 3D coordinates of the edges 4142 and 4144 may be determined even if the edge point 4172 is not visible as points 4172A, 4172B, 4172C in the images 3906, 3926, 4106, respectively.

In the methods described herein to determine 3D coordinates of edge points using 2D cameras, a preliminary step is to identify those parts of the images that are edges. There are several methods that may be used to determine which image portions are edges and then to locate the edges on the captured images 3906, 3926, 4106. In an embodiment, a method of edge detection based on a partial area effect is used. This method is described in "Accurate subpixel edge location based on partial area effect" in Image and Vision Computing 31 (2013) 72-90 by Trujillo-Pino, et al., hereafter referred to as Trujillo-Pino [2013], the contents of which are incorporated herein by reference. In other embodiments, other techniques such as moment-based techniques, least-squared-error-based techniques, or interpolation techniques, may be used. The effect of noise inherent in 2D images may be reduced by reconstructing smooth lines where appropriate. Examples of constructions that assume the presence of straight lines, circular curves, and polynomial curves are described in the Trujillo-Pino [2013]. Such smoothing methods are examples of noise-reducing filtering techniques that are used in embodiments described herein.

When a third 2D image 4106 is captured with the AACMM assembly in the third pose 4100, it becomes possible to determine 3D coordinates of smoothly continuous edge points such as the point 4142 on the object 4140. A method of determining smoothly continuous edge points on a point-by-point basis is now described.

Figure 42:
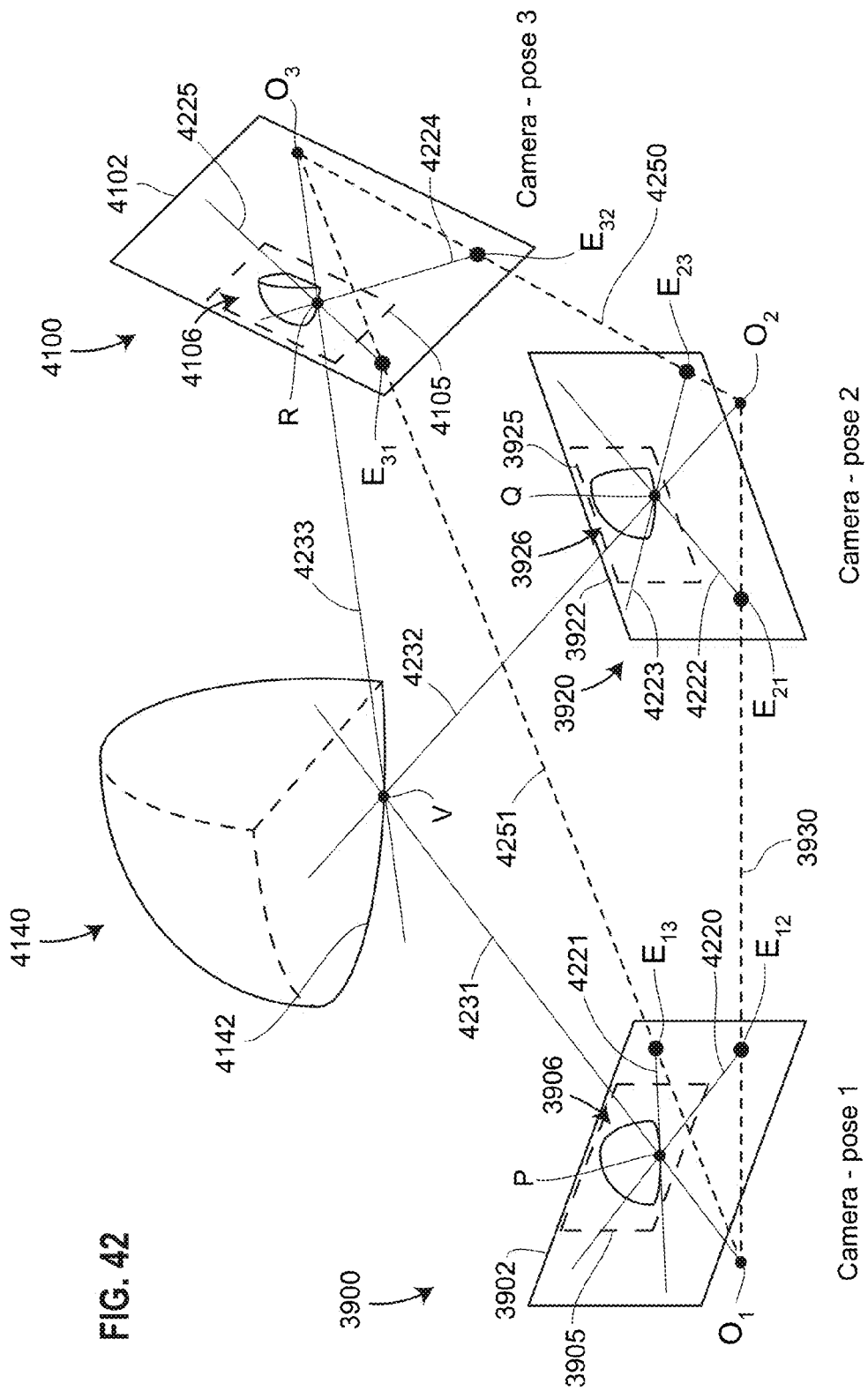
FIG. 42 is a schematic view illustrating a method of applying epipolar geometry to 2D images obtained from three or more different poses to determine 3D coordinates of a smoothly continuous edge point of a 3D object according to an embodiment of the present invention.

In an embodiment illustrated in FIG. 42, a 3D object 4140 includes a point V on an edge 4142 of the object 4140. The method described herein below works even to find the 3D coordinates of a point V in a region for which the edge points are smoothly and continuously varying. As used herein, the expression "smoothly and continuously varying" means that there are substantially no discontinuities in the 3D edge coordinates or in the slope of the 3D edge coordinates. In general, such a point is not a cardinal point—that is, a point that, when viewed in multiple camera images obtained from different camera poses, is recognized as being same point in 3D space (e.g. a corner point of a feature on the object). The point V is projected as a ray 4231 to the perspective center $O_1$ of the camera in the first pose 3900, intersecting the epipolar plane 3902 at the point P. The point V is projected as a ray 4232 to the perspective center $O_2$ of the camera in the second pose 3920, intersecting the epipolar plane 3922 at the point Q. The point V is projected as a ray 4233 to the perspective center $O_3$ of the camera in the third pose 4100, intersecting the epipolar plane 4102 at the point R.

The epipoles of the three epipolar planes are the points of intersection of the epipolar planes with the lines connecting the perspective centers of the cameras in the three poses. The epipolar plane 3902 includes two epipoles. The epipole $E_{12}$ is the point at which the epipolar plane 3902 is intersected by the line 3930 that connects the perspective centers $O_1$ and $O_2$. Likewise, the epipole $E_{13}$ is the point at which the epipolar plane 3902 is intersected by the line 4251 that connects the perspective centers $O_1$ and $O_3$. The epipoles $E_{21}$, $E_{23}$ are the points at which the epipolar plane 3922 is intersected by the lines 3930, 4250, respectively. The epipoles $E_{31}$, $E_{32}$ are the points at which the epipolar plane 4102 is intersected by the lines 4251, 4250, respectively.

The epipolar lines are lines that pass through the epipoles and through a point of interest on the epipolar plane. Because the points $E_{12}$, $E_{21}$, and P lie on a common plane, the epipolar line 4220 drawn from $E_{12}$ to the point P can be used to draw the corresponding epipolar line 4222 on the epipolar plane 3922. Any one epipolar line can be used to generate a corresponding epipolar line on an adjacent epipolar plane.

Consider the embodiment illustrated in FIG. 42 in which an edge point P is selected on the image 3906. An epipolar line 4220 is found that passes through the point P and the epipole $E_{12}$. As explained herein above, the epipolar line 4222 that corresponds to the epipolar line 4220 can immediately be drawn. If the points P and Q faithfully represent the point V, for example, without excessive noise, then the epipolar line 4222 passes through the point Q on the epipolar plane 3922. However, as explained herein above with respect to FIG. 39B, without further information, it is not known where the point Q lies on the epipolar line 4222. Without this information, it is not possible to perform a triangulation calculation to determine the 3D coordinates of the point V. This problem can be overcome by further adding the epipolar line 4223 that passes through point Q and epipole $E_{23}$ to the epipolar plane 3922. The intersection of the epipolar lines $E_{21}$, $E_{23}$ on the epipolar plane 3922 locates the position of the point Q on the epipolar plane 3922 and enables determination of the 3D coordinates of the point V. In like manner, the point R can be identified as the intersection of the epipolar lines 4224, 4225. The point P is crossed by the epipolar lines 4221, 4220.

For the embodiment in which the edge points are noisy or perhaps not clearly visible, there may be some discrepancy in the intersection of the epipolar lines, as determined from the geometry of the adjacent planes and as determined from the intersection of the epipolar lines with an edge point. If such a discrepancy is observed with respect to the edge point V, several actions may taken in other embodiments. In one embodiment, the point V is dropped or removed from the collection of calculated 3D coordinates for the edge 4142. In another embodiment, edge filtering techniques such as those described in Trujillo-Pino [2013] to reduce noise, as explained herein above. In another embodiment, a 2D image is further obtained with the camera assembly on the AACMM in a fourth pose. In this case, if the 3D coordinates agree for three of the four poses, the outlier points may be dropped or removed from consideration. Additional poses beyond four poses may further be used to increase accuracy of determined 3D coordinates of edge points.

In an embodiment, 2D images of an object may be obtained from a relatively large number of directions around the object, with edges having been captured or acquired by the AACMM camera assembly with relatively high quality images in at least three poses from each direction. In this case, the 3D coordinates of edge features can be reconstructed. In other embodiments, images are captured or acquired only for those edge features of interest.

In some embodiments an AACMM may include more than one camera assembly. An example is shown in FIG. 38B, where a first camera assembly 3840 is used with a second camera assembly 3810. In an embodiment, the first camera assembly 3840 and the second camera assembly 3810 each obtain an image of object edge points for the AACMM fixed in a first position. For the AACMM fixed in the first position, each of the two cameras 3840, 3810 has a different pose. In the embodiment, the first camera assembly 3840 and the second camera assembly 3810 each obtain an image of an object for the AACMM fixed in a second position different than the first position. The result of these actions is to obtain four images, each having a different pose. These four images may be analyzed using the methods described herein above with respect to FIGS. 41 and 42 to obtain 3D coordinates of object edge points.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of determining three-dimensional (3D) coordinates of an edge point of an object, comprising:
   providing an articulated arm coordinate measuring machine (AACMM) that includes a base, a manually positionable arm portion having an opposed first end and second end, the arm portion being rotationally coupled to the base, the arm portion including a plurality of connected arm segments, each arm segment including at least one position transducer for producing a position signal, a first camera assembly coupled to the first end, an electronic circuit that receives the position signal from each of the at least one position transducer and provides data corresponding to a pose of the first camera assembly;
   providing a processor;
   in a first instance:
   capturing with the first camera assembly in a first pose a first image of the object;

obtaining from the electronic circuit first data corresponding to the first pose;
in a second instance:
capturing with the first camera assembly in a second pose a second image of the object;
obtaining from the electronic circuit second data corresponding to the second pose;
in a third instance:
capturing with the first camera assembly in a third pose a third image of the object;
obtaining from the electronic circuit third data corresponding to the third pose;
determining with the processor the 3D coordinates of a first edge point, the first edge point being smoothly continuous within an interval of edge points, the 3D coordinates of the first edge point determined based at least in part on the first data, the second data, the third data, the first image, the second image, and the third image; and
storing the determine 3D coordinates of the first edge point.

2. The method of claim 1 wherein the first edge point is identified by the processor as an edge point based at least in part on pixel light levels in the first image.

3. The method of claim 2 wherein the first edge point is determined by an identification method selected from the group consisting of: subpixel-edge-location-based-on-partial-area-effect technique, moment-based technique, least-squared-error-based technique, and interpolation technique.

4. The method of claim 2 wherein the 3D coordinates of the first edge point are further determined based on a smoothing of a first edge portion that contains the first edge point, the smoothing filter selected from the group that filters the first edge portion to more closely match a shape selected from the group consisting of: a straight line, a circular curve, and a polynomial curve.

5. The method of claim 2 further including determining a position of the first edge point in each of the first image, the second image, and the third image based at least in part on epipolar geometry relating the first pose, the second pose, and the third pose of the first camera assembly.

6. The method of claim 5 further including checking whether the first edge point in the first image, the first edge point in the second image, and the first edge point in the third image, as determined based at least in part on epipolar geometry, are self-consistently determined to be edge points when evaluated based on pixel light levels in the first image, the second image, and the third image, respectively.

7. The method of claim 6 wherein, in response to a determined lack of self-consistency in the 3D coordinates of the first edge point, an action is selected from the group consisting of: eliminating the first edge point from a list of determined edge points, filtering or smoothing the first edge to obtain consistency in the first edge point, and performing an optimization of the pose of the object in 3D space to obtain self-consistency in the first edge point.

8. The method of claim 2 further including adjusting with the processor the pose of a first object in 3D space to match edges in the first image, the second image, and the third image, wherein at least one of the matched edges includes the first edge point.

9. A method of determining three-dimensional (3D) coordinates of an edge point of an object, comprising:
providing an articulated arm coordinate measuring machine (AACMM) that includes a base, a manually positionable arm portion having an opposed first end and second end, the arm portion being rotationally coupled to the base, the arm portion including a plurality of connected arm segments, each arm segment including at least one position transducer for producing a position signal, a first camera assembly and a second camera assembly coupled to the first end, an electronic circuit that receives the position signal from each of the at least one position transducer and provides data corresponding to a pose of the first camera assembly and the second camera assembly;
providing a processor;
in a first instance:
capturing with the first camera assembly in a first pose a first image of the object;
obtaining from the electronic circuit first data corresponding to the first pose;
capturing with the second camera assembly in a second pose a second image of the object;
obtaining from the electronic circuit second data corresponding to the second pose;
in a second instance:
capturing with the first camera assembly in a third pose a third image of the object;
obtaining from the electronic circuit third data corresponding to the third pose;
determining with the processor the 3D coordinates of a first edge point, the first edge point being smoothly continuous within an interval of edge points, the 3D coordinates of the first edge point determined based at least in part on the first data, the second data, the third data, the first image, the second image, and the third image; and
storing the determine 3D coordinates of the first edge point.

10. The method of claim 9 wherein the first edge point is identified by the processor as an edge point based at least in part on pixel light levels in the first image.

11. The method of claim 10 wherein the first edge point is determined by an identification method selected from the group consisting of: subpixel-edge-location-based-on-partial-area-effect technique, moment-based technique, least-squared-error-based technique, and interpolation technique.

12. The method of claim 10 further including determining a position of the first edge point in each of the first image, the second image, and the third image based at least in part on epipolar geometry relating the first pose, the second pose, and the third pose of the first camera assembly.

13. The method of claim 12 further including determining a position of the first edge point in each of the first image, the second image, and the third image based at least in part on epipolar geometry relating the first pose, the second pose, and the third pose of the first camera assembly.

14. The method of claim 13 further including checking whether the first edge point in the first image, the first edge point in the second image, and the first edge point in the third image, as determined based at least in part on epipolar geometry, are self-consistently determined to be edge points when evaluated based on pixel light levels in the first image, the second image, and the third image, respectively.

15. The method of claim 14 wherein, in response to a determined lack of self-consistency in the 3D coordinates of the first edge point, an action is selected from the group consisting of: eliminating the first edge point from a list of determined edge points, filtering or smoothing the first edge to obtain consistency in the first edge point, and performing an optimization of the pose of the object in 3D space to obtain self-consistency in the first edge point.

16. The method of claim 10 further including adjusting with the processor the pose of a first object in 3D space to match edges in the first image, the second image, and the third image, wherein at least one of the matched edges includes the first edge point.

\* \* \* \* \*